US012792984B2

(12) United States Patent
Turpin et al.

(10) Patent No.: US 12,792,984 B2
(45) Date of Patent: Nov. 10, 2026

(54) ENHANCED NETWORK CAPABILITIES FOR A HANDHELD TWO-WAY RADIO TRANSCEIVER DEVICE

(71) Applicant: Weavix, Inc., Wichita, KS (US)

(72) Inventors: Kevin Turpin, Wichita, KS (US); Benjamin Burrus, Wichita, KS (US)

(73) Assignee: Weavix, Inc., Wichita, KS (US)

( * ) Notice: Subject to any disclaimer, the term of this patent is extended or adjusted under 35 U.S.C. 154(b) by 479 days.

(21) Appl. No.: 18/325,887

(22) Filed: May 30, 2023

(65) Prior Publication Data

US 2023/0388742 A1 Nov. 30, 2023

Related U.S. Application Data

(60) Provisional application No. 63/371,293, filed on Aug. 12, 2022, provisional application No. 63/347,490, filed on May 31, 2022.

(51) Int. Cl.
*G06Q 10/0631* (2023.01)
*H04B 1/3827* (2015.01)
(Continued)

(52) U.S. Cl.
CPC ... *G06Q 10/063114* (2013.01); *H04B 1/3833* (2013.01); *H04W 4/021* (2013.01);
(Continued)

(58) Field of Classification Search
CPC ..... H04W 88/06; H04W 4/021; H04W 4/029; H04W 48/18; H04W 24/08; H04W 4/02;
(Continued)

(56) References Cited

U.S. PATENT DOCUMENTS

D479,235 S 9/2003 Tanaka et al.
D517,088 S 3/2006 Chong et al.
(Continued)

FOREIGN PATENT DOCUMENTS

JP 7300533 B1 * 6/2023
JP 2023119142 A * 8/2023
(Continued)

OTHER PUBLICATIONS

Amazon.com, Cobra Performa 400 Business Walkie Talkie, first available Mar. 12, 2025 [online], retrieved Jun. 13, 2025, available at URL: https://a.co/d/3u20iv7 (Year: 2025)—6 pages.
(Continued)

*Primary Examiner* — Matthew C Sams
(74) *Attorney, Agent, or Firm* — ASHURST PERKINS COIE US LLP; Colin Fowler

(57) ABSTRACT

Smart walkie-talkies are configured with multiple subscriber identity module (SIM) components that enable wireless connections with private and public networks. A private network for a facility is associated with geofences defining areas in which access to and communication via the private network is permitted for authorized subscribers. The smart walkie-talkie device uses a first SIM component while within a geofence to connect to the private network. When exiting the geofence, the smart walkie-talkie device uses a second SIM component instead to connect to another network (e.g., a commercial cellular network) and is not permitted to connect to the private network. A smart walkie-talkie device further relies upon peer-to-peer communication as a back-up when private networks, public networks, and other mediums are unavailable. With peer-to-peer communication, a smart walkie-talkie device broadcasts radio signals that indicate a destination device and re-broadcasts
(Continued)

received radio signals if an indicated destination device is not itself.

12 Claims, 25 Drawing Sheets

(51) Int. Cl.
*H04W 4/021* (2018.01)
*H04W 4/029* (2018.01)
*H04W 4/10* (2009.01)
*H04W 8/18* (2009.01)

(52) U.S. Cl.
CPC ............. *H04W 4/029* (2018.02); *H04W 4/10* (2013.01); *H04W 8/18* (2013.01)

(58) Field of Classification Search
CPC ....... H04W 4/50; H04W 8/005; H04W 8/183; H04W 12/088; H04W 88/04; H04W 12/04; H04W 12/35; H04W 16/14; H04W 24/00; H04W 36/00; H04W 36/0069; H04W 36/0088; H04W 36/326; H04W 4/023; H04W 4/10; H04W 4/16; H04W 4/24; H04W 40/02; H04W 40/246; H04W 40/30; H04W 48/04; H04W 48/16; H04W 60/00; H04W 72/563; H04W 72/569; H04W 76/10; H04W 76/14; H04W 76/20; H04W 76/27; H04W 76/30; H04W 8/08; H04W 8/18; H04W 8/205; H04W 8/245; H04W 8/26; H04W 84/042; H04W 84/12; H04W 84/18; H04W 88/02; H04B 1/3833; H04L 45/00; H04L 63/0853; H04M 15/49; H04M 15/8011; H04M 17/02; H04M 17/026; H04M 17/103; H04M 2203/2072; H04M 2207/18; H04M 2242/28; H04M 2250/66; H04M 3/58
See application file for complete search history.

(56) References Cited

U.S. PATENT DOCUMENTS

D520,020 S 5/2006 Senda et al.
D562,288 S 2/2008 Suk et al.
D635,120 S 3/2011 Sakai
8,054,987 B2 * 11/2011 Seydoux ............... H04W 8/005 381/79
D700,158 S 2/2014 Kang et al.
8,781,475 B1 * 7/2014 McKeeman .......... H04W 24/02 455/437
D752,006 S 3/2016 Plaschke
9,451,098 B2 * 9/2016 Zhu .................... H04M 15/8011
9,654,948 B1 * 5/2017 Belser ..................... H04M 3/58
10,044,985 B1 8/2018 Parker
D851,615 S 6/2019 Lee
D857,642 S 8/2019 Nilsen
10,433,107 B1 * 10/2019 Zhao ..................... H04W 4/021
D875,699 S 2/2020 Hong
D896,197 S 9/2020 Lee
D911,995 S 3/2021 Suzuki
D922,346 S 6/2021 Hu
D923,597 S 6/2021 Nishikawa
D929,954 S 9/2021 Bicudo
D940,091 S 1/2022 Liu
D983,766 S 4/2023 Liang
11,625,410 B2 * 4/2023 Kim ........................ G06F 16/29 707/722
D996,388 S 8/2023 Duman
D1,001,758 S 10/2023 Hong
D1,005,977 S 11/2023 Zheng
D1,023,992 S 4/2024 Seelenfreund
12,082,088 B2 * 9/2024 Etuke .................. H04W 12/088
D1,065,124 S 3/2025 Huang
12,411,212 B1 9/2025 Pandya et al.
2002/0006806 A1 1/2002 Kinnunen et al.
2002/0158812 A1 10/2002 Pallakoff
2004/0121790 A1 6/2004 Wolff et al.
2004/0242240 A1 * 12/2004 Lin ....................... H04W 8/245 455/456.3
2005/0111422 A1 * 5/2005 Nakanishi ............... H04L 45/00 370/338
2006/0217159 A1 9/2006 Watson
2008/0002668 A1 1/2008 Asokan et al.
2011/0081951 A1 * 4/2011 Hwang ................. H04W 8/183 455/558
2013/0315108 A1 11/2013 Lindner et al.
2014/0112244 A1 4/2014 Lindner et al.
2014/0221039 A1 8/2014 Liao et al.
2016/0227384 A1 8/2016 Mazzarella et al.
2016/0374014 A1 * 12/2016 Anyuru ................. H04W 4/023
2017/0185721 A1 6/2017 Schuck
2018/0176746 A1 6/2018 Kapatralla et al.
2019/0347332 A1 11/2019 Hiraoka et al.
2020/0008007 A1 * 1/2020 Belghoul ................ H04W 4/50
2020/0202472 A1 6/2020 Barak et al.
2021/0264764 A1 8/2021 Glynn et al.
2022/0053607 A1 * 2/2022 Rice .................... H04W 72/569
2022/0322058 A1 * 10/2022 Etuke .................. H04W 12/088
2022/0394492 A1 * 12/2022 Chaugule .............. H04W 4/021
2023/0179983 A1 6/2023 Decrop et al.
2023/0388742 A1 * 11/2023 Turpin .................... H04W 8/18
2024/0015498 A1 * 1/2024 Juneja ...................... H04B 1/12
2024/0031913 A1 * 1/2024 Grießbach ............ H04W 48/04
2024/0373190 A1 * 11/2024 Tao ....................... H04W 4/021

FOREIGN PATENT DOCUMENTS

KR 20210105476 A 8/2021
WO 2016179377 A1 11/2016

OTHER PUBLICATIONS

Amazon.com, Global-PTT G9 4G LTE Walkie Talkies, first available Apr. 28, 2025 [online], retrieved Jun. 13, 2025, available at URL:https://a.co/d/9xF2qfo (Year: 2025)—7 pages.
Amazon.com, New Inrico S200 4G Network Radio, first available Jul. 30, 2020 [online], retrieved Jun. 13, 2025, available at URL: https://a.co/d/8HX6CVv (Year: 2020)—6 pages.
D. Prabha, et al. "IoT application for Safety and Health Monitoring System for Construction Workers," 2021 5th International Conference on Trends in Electronics and Informatics (ICOEI), Tirunelveli, India, 2021, pp. 453-457 <https://ieeexplore.ieee.org/document/9452911?source=IQplus> (Year: 2021)—5 pages.
Trademarks.justia.com, WEAVIX Trademark Application of PK Solutions, LLC—U.S. Appl. No. 97/461,158, first available Mar. 20, 2019 [online], retrieved Jun. 13, 2025, available at URL:, https://trademarks.justia.com/974/61/weavix-97461158.html (Year: 2019)—7 pages.
YouTube.com, weavix, wait Smart Radio—Purpose Built for the Frontline Worker,, first available Aug. 4, 2022 [online], retrieved Jun. 13, 2025, available at URL: https://youtu.be/o-20lioDDjl (Year: 2022)—4 pages.

* cited by examiner

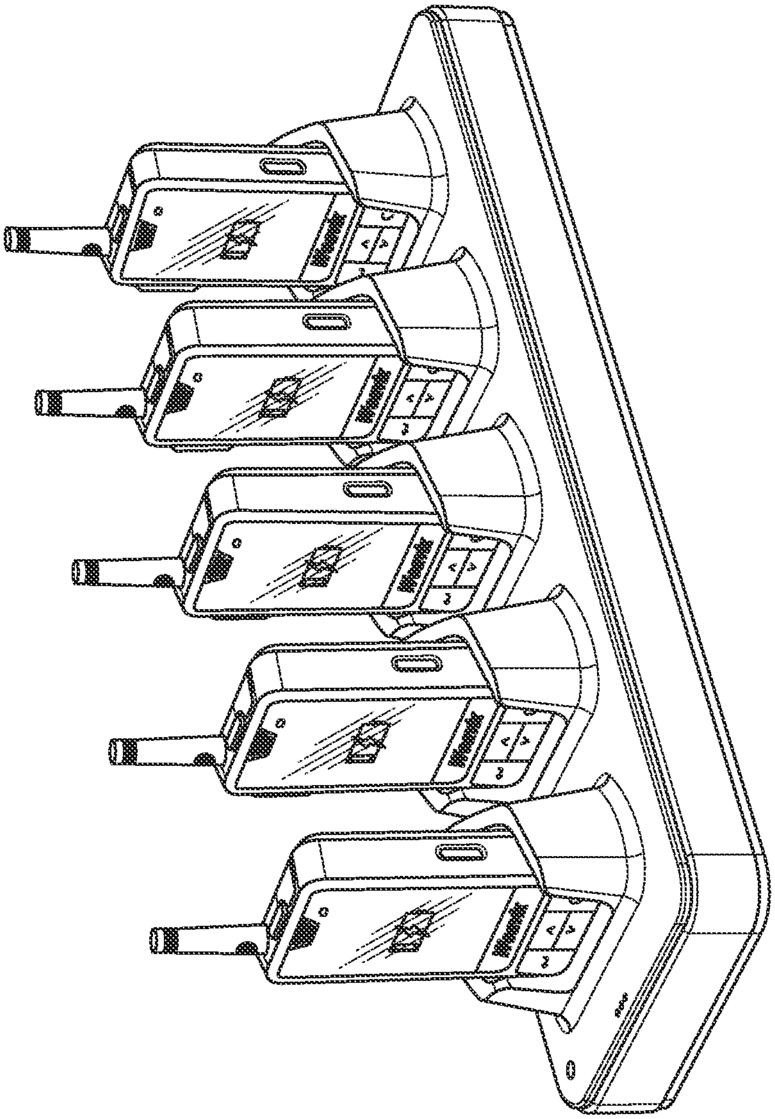
FIG. 7
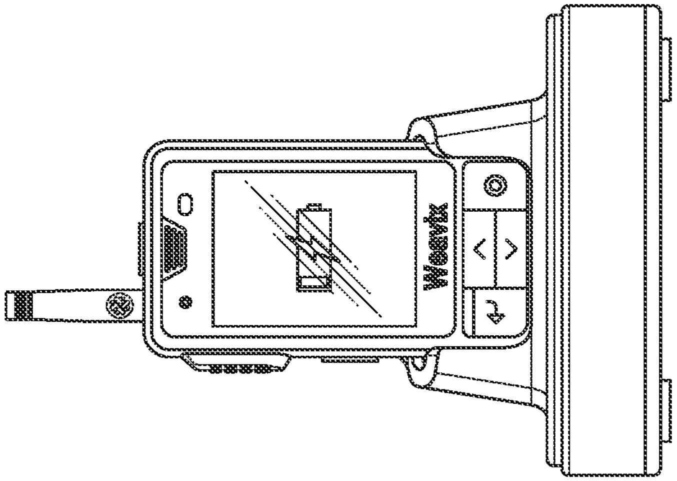

1500

ENHANCED NETWORK CAPABILITIES FOR A HANDHELD TWO-WAY RADIO TRANSCEIVER DEVICE

CROSS-REFERENCE TO RELATED APPLICATIONS

This application claims priority to and the benefits of U.S. Provisional Application No. 63/347,490 entitled "APPARATUSES AND COMMUNICATION NETWORKS FOR DEVICE TRACKING AND GEOFENCING" filed on May 31, 2022, and U.S. Provisional Application No. 63/371,293 entitled "APPARATUSES AND COMMUNICATION NETWORKS FOR DEVICE TRACKING AND GEOFENCING" filed on Aug. 12, 2022. The entire disclosures of the aforementioned applications are herein incorporated by reference as part of the disclosure of this application.

TECHNICAL FIELD

The present disclosure is generally related to wireless communication handsets and systems.

BACKGROUND

Traditional methods to monitor facilities are used to perform inspections in particular environments. Some methods use Radio-Frequency Identification (RFID) badges to monitor frontline workers using a reader at a gate or other entryway. The badges can be used to allow entry for authorized persons to gain access. Frontline workers are typically disallowed from carrying smartphones, tablets, or portable computers on site. When there is an emergency, a worker may need to alert others. However, traditional methods and systems for communication within, and monitoring of, manufacturing and construction facilities sometimes have inadequate risk management and safeguards, lack an efficient structure, or can suffer from unrealistic risk management expectations or poor production forecasting.

BRIEF DESCRIPTION OF THE DRAWINGS

FIG. 7 is a drawing illustrating example charging cradles for apparatuses implementing device tracking and geofencing, in accordance with one or more embodiments.

DETAILED DESCRIPTION

Figure 1:
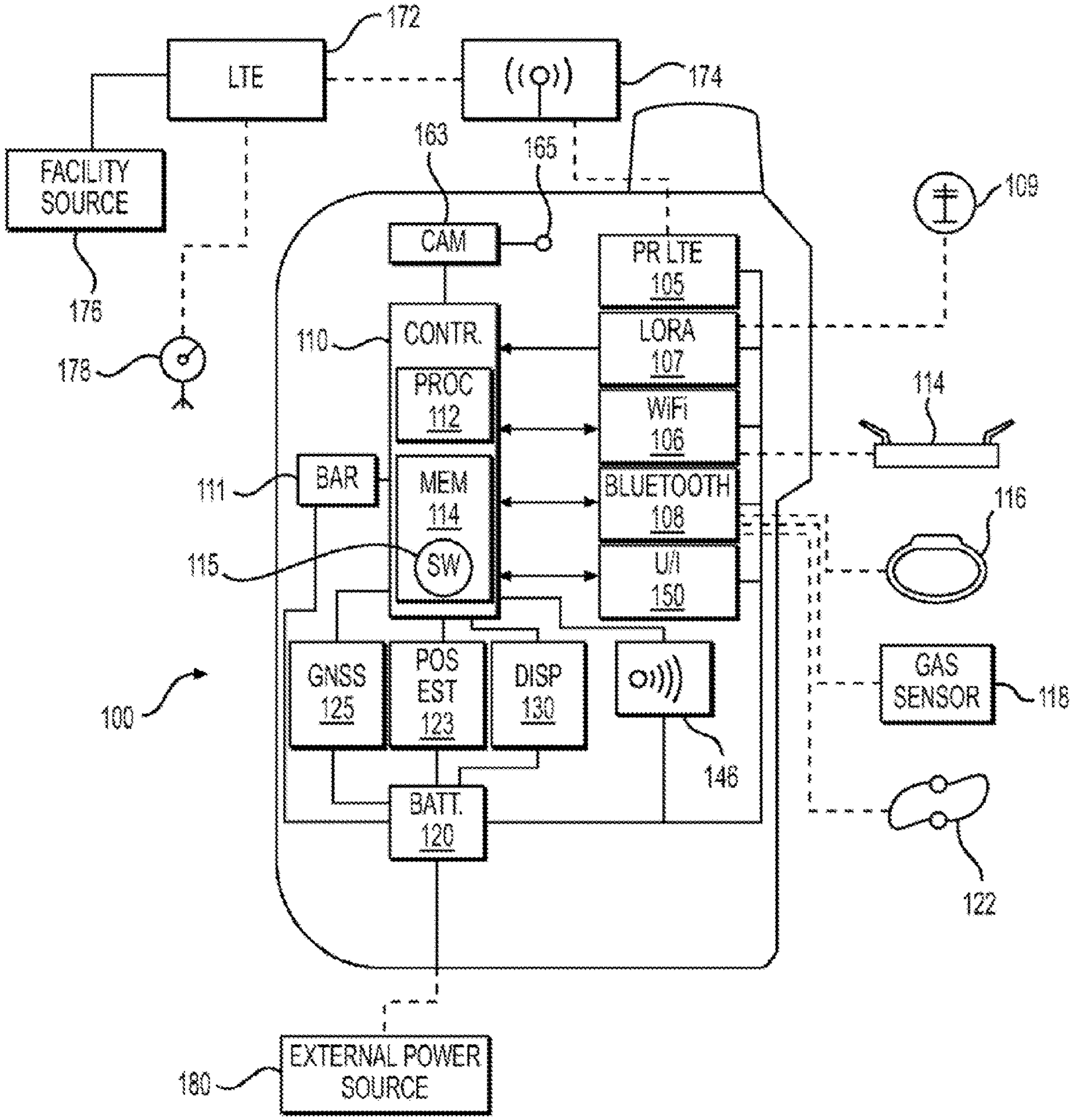
FIG. 1 is a block diagram illustrating an example architecture for an apparatus implementing device tracking using geofencing, in accordance with one or more embodiments.

The embodiments disclosed herein describe methods, apparatuses, and systems for device tracking and geofencing. Construction, manufacturing, repair, utility, resource extraction and generation, and healthcare industries, among others, rely on real-time monitoring and tracking of frontline workers, individuals, inventory, and assets such as infrastructure and equipment. In some embodiments, a portable and/or wearable apparatus, such as a smart radio, a smart camera, or a smart environmental sensor that records information, downloads information, communicates with other apparatuses or a cellphone tower, and detects gas levels, or temperature is used by frontline workers to provide compliance, quality, or safety. Some embodiments of the present disclosure provide lightweight and low-power apparatuses that are worn or carried by a worker and used to monitor information in the field, or track the worker for logistical purposes. The disclosed apparatuses provide alerts, locate resources for workers, and provide workers with access to communication networks. The wearable apparatuses disclosed enable worker compliance and provide assistance with operator tasks.

The advantages and benefits of the methods, systems, and apparatuses disclosed herein include solutions for confined-space management using live video feeds, gas detection, and analysis of entry and exit times for personnel using smart devices. The disclosed systems enable the provision of video collaboration software for the industrial field using streamlined enterprise-grade video with interactive meeting capabilities. Workers join from the field on their apparatuses without relying on software integrations or the purchase of additional software. Some embodiments disclosed enable workers to view other workers' credentials and roles such that participants know the level of expertise present. The systems further enable the location of workers who are currently out in the field using a facility map that is populated by information from smart radios, smart cameras, or smart sensors.

Among other benefits and advantages, the disclosed systems provide greater visibility compared to traditional methods within a confined space of a facility for greater workforce optimization. The digital time logs for entering and exiting a facility measure productivity levels on an individual basis and provide insights into how the weather at outdoor facilities in different geographical locations affects workers. The time tracking technology enables visualization of the conditions a frontline worker is working under while keeping the workforce productive and protected. In addition, the advantages of the machine learning (ML) modules in the disclosed systems include the use of shared weights in convolutional layers, which means that the same filter (weights bank) is used for each node in a layer. The weight structure both reduces memory footprint and improves performance for the system.

The smart radio embodiments disclosed that include Radio over Internet Protocol (RoIP) provide the ability to use an existing Land Mobile Radio (LMR) or Digital Mobile Radio (DMR) system for communication between workers, allowing a company to bridge the gap that occurs through the process of digitally transforming their systems. Communication is thus more open because legacy systems and modern apparatuses communicate with fewer barriers, the communication range is not limited by the radio infrastructure because the smart radios use the Internet, and costs are reduced for a company to provide communication apparatuses to their workforce by obviating more-expensive, legacy radios. The smart apparatuses enable workers to provide field observations to report safety issues in real-time to mitigate risk, prevent hazards, and reduce time barriers to drive operational performance. Workers in the field use the smart apparatuses to more-quickly notify management of potential safety issues or issues that are causing delays. The apparatuses enable mass notifications to rapidly relay information to a specific subgroup, provide real-time updates for evacuation, and transmit accurate location pins.

The smart apparatuses disclosed reduce the need for workers to wear multiple, cumbersome, non-integrated, and potentially distractive devices into one user-friendly, comfortable, and cost-effective smart device. Advantages of the smart radio disclosed include ease of use for carrying in the field during extended durations due to its smaller size, relatively low power consumption, and integrated power source. The smart radio is sized to be small and lightweight enough to be regularly worn by a worker. The modular design of the smart radio disclosed enables quick repair, refurbishment, or replacement. The apparatuses are shared between workers on different shifts to control inventory as needed. The smart apparatuses only work inside a facility geofence, reducing the impulse to steal.

The present disclosure also refers to smart radios and smart apparatuses as smart walkie-talkies, two-way radio transceivers or two-way radio transceiver devices, communication handsets, shared communication devices, industrial radio devices, and/or the like. As will be understood by one of skill in the field of the present disclosure, a smart radio (or other disclosed terms) generally refers to a communication device for transmitting and receiving communication signals (e.g., radio signals) with other communication devices, such as other smart radios. More particularly, the present disclosure refers to a class of communication devices (including the smart radios, walkie-talkies, two-way transceiver devices, radio handsets as referred to throughout) that is understood as distinct from conventional consumer communication devices, such as smartphones (e.g., iPhones), tablets, media players, and the like. This class of communication devices, as represented by a walkie-talkie for example, is configured to provide communication capabilities in fields that require reliability, ruggedness, efficiency and/or low overhead in direct communication, and security. For example, walkie-talkies or two-way radio transceiver devices include specific features that are well-suited for use in an industrial workplace (e.g., a chemical plant, a manufacturing facility), in military field operations, in network-sparse locations, or in amateur/amusement activities. An example of such a feature present in walkie-talkies or two-way radio transceiver devices is a push-to-talk (PTT) key that improves the ability of a user to quickly communicate to another device via coarse user control (e.g., through gloved hands). Another example feature is a walkie-talkie having local on-device control or selection of its own operating channel (e.g., a radio frequency channel or band) that itself uses to communicate with other devices, thus offering flexibility without adherence to network-dictated channel schemes/allocations. While these features can realize the requirements associated with the aforementioned fields or settings, these same features can be absent in conventional consumer communication devices, which may also be inappropriate for those fields or settings due to fragility, due to distracting/irrelevant/extraneous user features, due to reliance on cellular network infrastructure, due to cost, and the like. Indeed, a smartphone device can lack such features, due to a lack of a need for a smartphone user to control (with specificity) the parameters of communication with other users. Through applied ingenuity and effort, unique and intelligent enhancements for this distinct class of communication devices have been developed (and are described herein) to improve the functionality and operation of these communication devices, while preserving their distinct applicability to certain fields or settings.

Embodiments of the present disclosure will be described more thoroughly from now on with reference to the accompanying drawings. Like numerals represent like elements throughout the several figures, and in which example embodiments are shown. However, embodiments of the examples are embodied in many different forms and should not be construed as limited to the embodiments set forth herein. The examples set forth herein are non-limiting examples and are merely examples, among other possible examples. Throughout this specification, plural instances (e.g., "224") implement components, operations, or structures (e.g., "**224*a*") described as a single instance. Further, plural instances (e.g., "224") refer collectively to a set of components, operations, or structures (e.g., "224***a*") described as a single instance. The description of a single component (e.g., "224*a*") applies equally to a like-numbered component (e.g., "224*b*") unless indicated otherwise. These and other aspects, features, and implementations are expressed as methods, apparatuses, systems, components, program products, means, or steps for performing a function, and in other ways. These and other aspects, features, and implementations will become apparent from the following sections, including the examples. Any of the embodiments described in each section can be used with one another and features of each embodiment are not necessarily exclusive to the described embodiment such that the headings are not limiting.

Smart Radio

Figure 4:
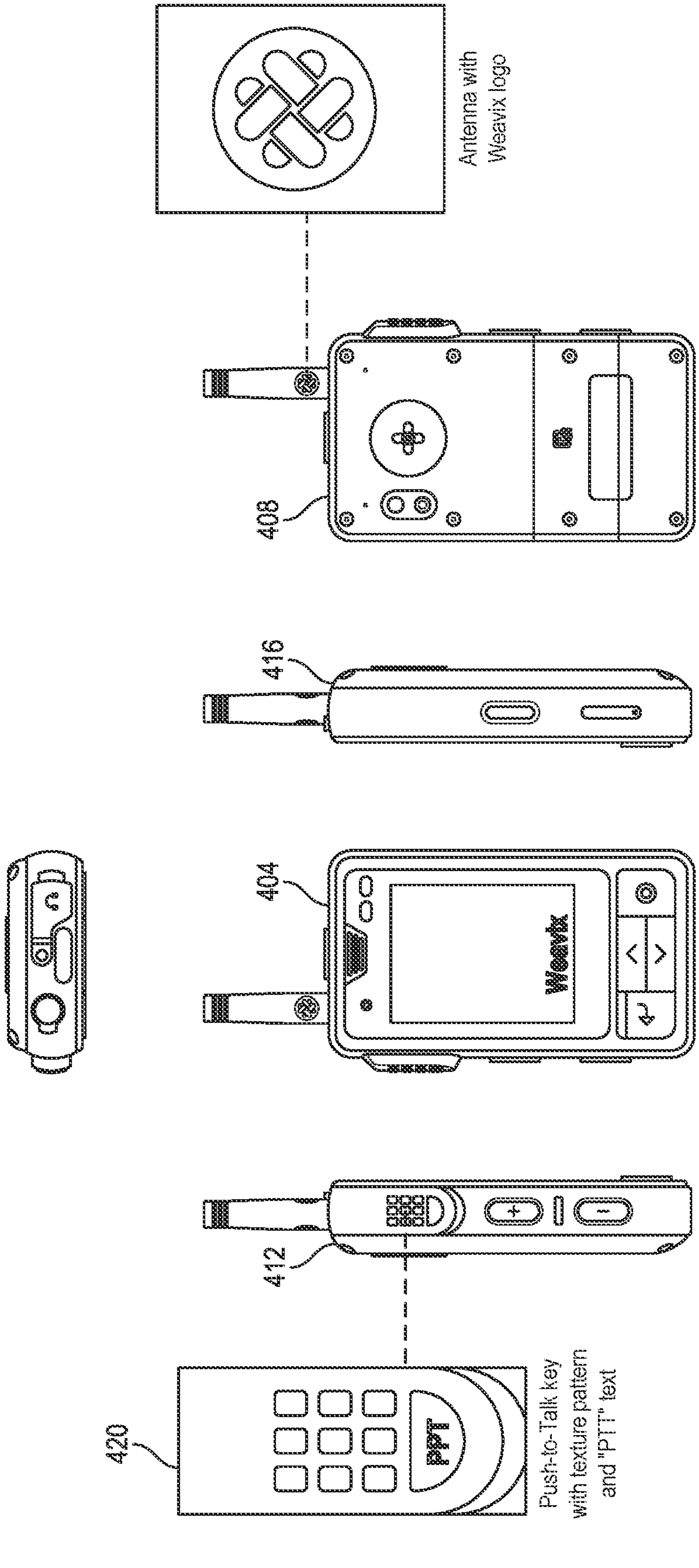
FIG. 4 is a drawing illustrating example apparatuses for device tracking and geofencing, in accordance with one or more embodiments.
Figure 5:
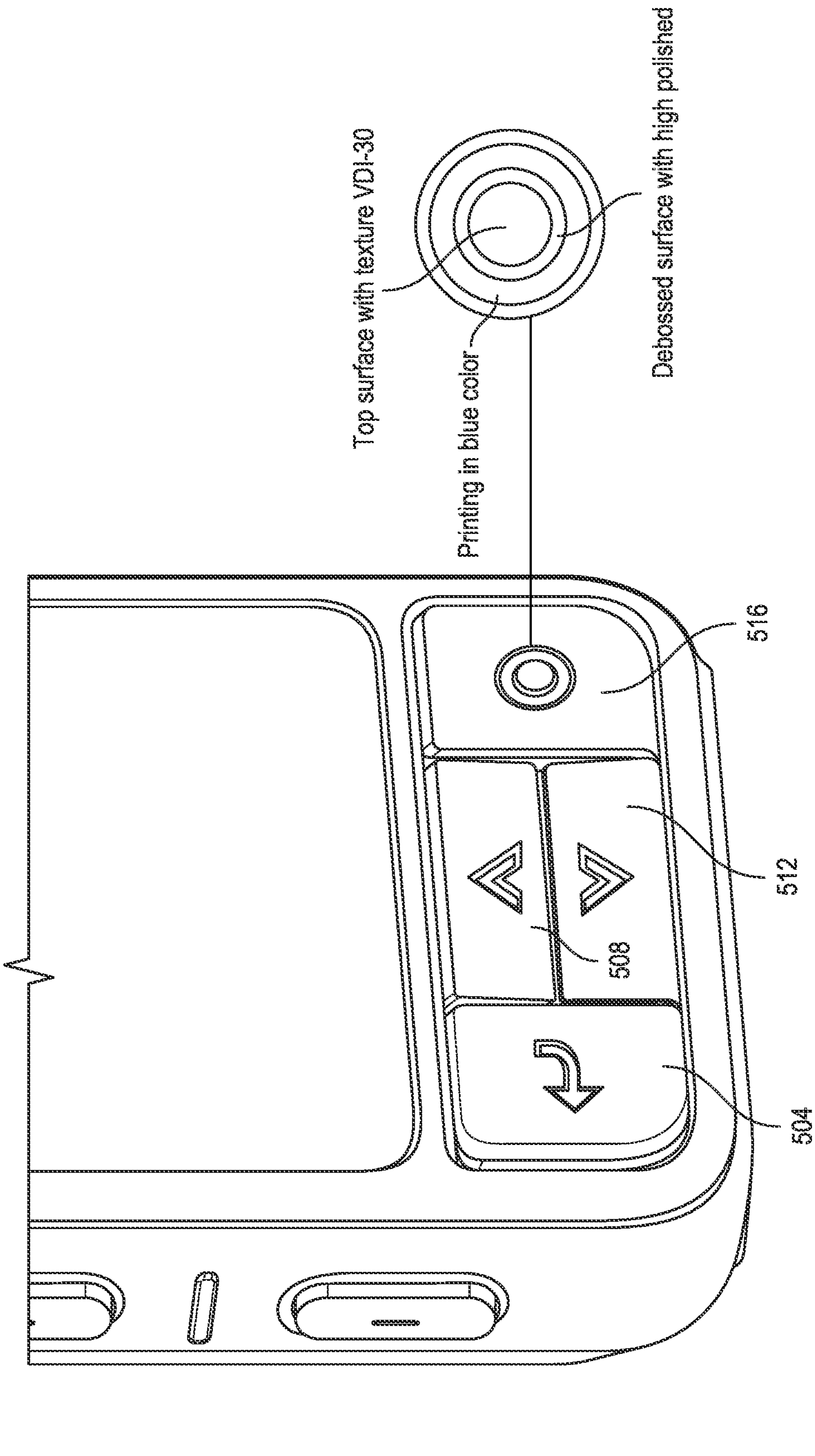
FIG. 5 is a drawing illustrating example apparatuses for device tracking and geofencing, in accordance with one or more embodiments.

FIG. 1 is a block diagram illustrating an example architecture for an apparatus 100 implementing device tracking using geofencing, in accordance with one or more embodiments. The apparatus 100 is implemented using components of the example computer system 2300 illustrated and described in more detail with reference to FIG. 23. In embodiments, the apparatus 100 is used to execute the machine learning (ML) system 2200 illustrated and described in more detail with reference to FIG. 22. The architecture shown by FIG. 1 is incorporated into a portable wireless apparatus 100, such as a smart radio, a smart camera, a smart watch, a smart headset, or a smart sensor. FIGS. 4-5 show different views of an exemplary smart radio that includes the architecture of the apparatus 100 shown in FIG. 1. Likewise, different embodiments of the apparatus 100 include different and/or additional components and are connected in different ways.

The apparatus 100 shown in FIG. 1 includes a controller 110 communicatively coupled electronically either directly or indirectly to a variety of wireless communication arrangements, a position estimating component 123 (e.g., a dead-reckoning system), which estimates current position using inertia, speed, and intermittent known positions received from a position tracking component 125, which in embodiments, is a Global Navigation Satellite System (GNSS) component, a display screen 130, an optional audio device 140, a user-input device 150, and a dual built-in camera 165 (another camera, 160, is on the other side of the device). A battery 120 is electrically coupled with a private Long-Term Evolution (LTE) wireless communication subsystem 105, a Wi-Fi subsystem 106, a low-power wide area network (LPWAN), for example, long range (LoRa) protocol subsystem 107, Bluetooth subsystem 108, barometer 111, audio device 140, user-input device 150, and built-in camera 160 for providing electrical power. Battery 120 is electrically and communicatively coupled with controller 110 for providing electrical power to controller 110 and enabling controller 110 to determine a status of battery 120 (e.g., a state-of-charge). In embodiments, battery 120 is a removable rechargeable battery.

Controller 110 is, for example, a computer having a memory 114, including a non-transitory storage medium for storing software 115, and a processor 112 for executing instructions of the software 115. In some embodiments, controller 110 is a microcontroller, a microprocessor, an integrated circuit (IC), or a system-on-a-chip (SoC). Controller 110 includes at least one clock capable of providing time stamps and displaying time via display screen 130. The at least one clock is updatable (e.g., via the user interface 150, a global positioning system (GPS) navigational device, the position tracking component 125, the Internet, a private cellular network subsystem, the server 170, or a combination thereof).

In embodiments, the apparatus 100 (e.g., implemented as a smart radio as shown by FIG. 4) communicates with a worker ID badge and a charging station using near field communication (NFC) technology. NFC devices generally act as electronic identity devices. Examples of an NFC rubber pad 804 and an NFC tag 808 located on a charging cradle are depicted in more detail in FIG. 8. An NFC-enabled device, such as a smart radio, also operates like an NFC tag or card, allowing a worker to perform transactions such as clocking in for the day at a worksite or facility, making payments, clocking out for the day, or logging in to a computer system of the facility. An example facility 300 is illustrated and described in more detail with reference to FIG. 3. The smart radio communicates with the charging station using NFC in one or both directions.

Workers entering a facility carry or wear an identification (ID) badge that has an NFC tag (and optionally an RFID tag) embedded in the badge. The NFC tag in the worker's ID badge stores personal information of the worker. Examples include name, employee or contractor serial number, login credentials, emergency contact(s), address, shifts, roles (e.g., crane operator), any other professional or personal information, or a combination thereof. When the worker arrives for a shift, they pick a smart radio up off the charging station and tap their ID badge to the smart radio. The NFC tag in the ID badge communicates with an NFC module in the smart radio to log the worker into the smart radio and login/clock the worker in to the workday. In embodiments, the worker's personal information is stored in the cloud computing system 220.

In some embodiments, when a smart radio is picked up off a charging station by a worker arriving at the facility, the smart radio operates as a time clock to record the start time for the worker at the facility. In some embodiments, the worker logs in to the facility system using a touchscreen or buttons of the smart radio. Example buttons of a smart radio are illustrated and described in more detail with reference to FIG. 5. For example, the smart radio records the time the worker signed in with their badge or other credentials and assigns the start time and location to the identity of the worker in the system. The smart radio sends the start time and the location to a local server at the facility or to the cloud computing system 220. The cloud computing system 220 uses the start time and stop time (when the worker places the smart radio back on the charging station) to maintain a record of the hours the worker worked (e.g., to determine the pay owed the worker).

In some embodiments, removing the smart radio from the charging station begins a timer that upon expiration, causes the smart radio to trigger a siren noise. The timer is halted or removed by the worker logging in to the smart radio (e.g., via tapping their ID card to the smart radio). If the smart radio is not provisioned when removed from the charging station, the system had a reduced ability to track the smart radio and the user thereof. By initiating a siren, the smart radio draws attention to the failure to log in.

Figure 2A:
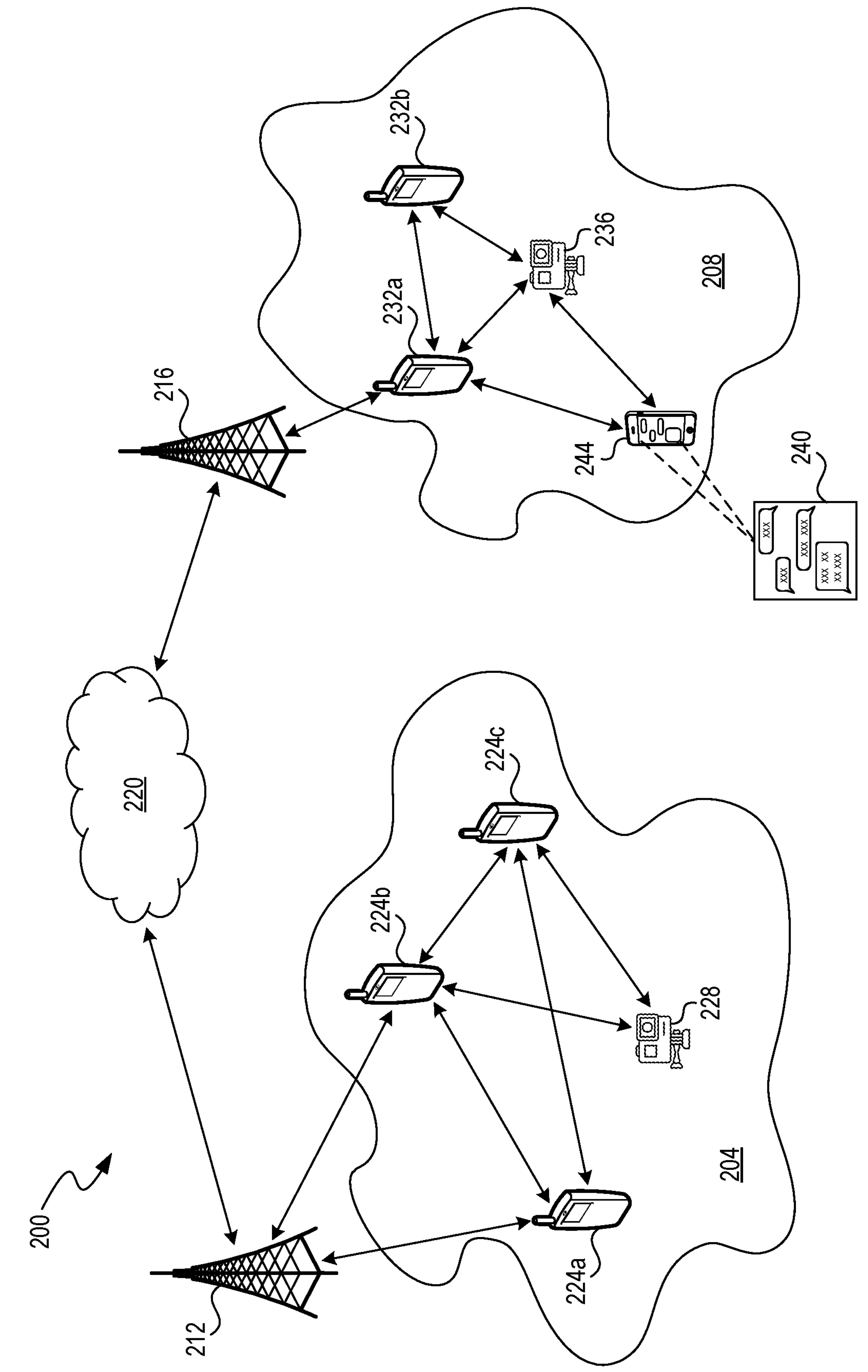
FIG. 2A is a drawing illustrating an example environment for apparatuses and communication networks for device tracking and geofencing, in accordance with one or more embodiments.

The cloud computing system 220 stores, manages, and updates shifts, contacts, and roles for each worker, project, and facility. A shift refers to a planned set period of time during which the worker (optionally with a group of other workers) performs their duties. The workday is divided into shifts. A worker is assigned one or more shifts (e.g., 9:00 a.m.-5:00 p.m. on Monday and Wednesday) to work and the assignments are stored, managed, and updated by the cloud computing system 220 based in part on time logging information received from the smart radios and other smart apparatuses (as shown by FIG. 2A). The worker has one or more roles (e.g., lathe operator, lift supervisor) for the same or different shifts. For each role and shift, the worker has one or more contacts (e.g., emergency contact(s), supervisory contact(s), etc.) assigned to the worker. The contacts are stored, managed, and updated by the cloud computing system 220 based in part on time logging information received from the smart radios. For example, the information reflects that the 9:00 a.m.-5:00 p.m. Monday shift has concluded, and the contacts are updated for the next shift of the worker.

In an example, a worker, Alice, begins their shift using a particular smart radio. After Alice picks up the smart radio and clocks in, Alice is introduced to Bob, her emergency contact. Alice can further access the name and contact information for the emergency contact, Bob, assigned to Alice for that shift using the smart radio. Three hours later, Bob's shift ends and Bob clocks out. A next shift (Chuck's shift) begins, however, Alice is still working on their shift. Chuck is Alice's new emergency contact. Alice is not necessarily aware of the change. However, the smart radio that Alice is using will automatically reflect that the emergency contact is now Chuck. The cloud computing system 220 thus stores, manages, and updates shifts, contacts, and roles for each worker, project, and facility. The information is updated based in part on time logging information received from the smart radios and other smart apparatuses (as shown by FIG. 2A). The cloud computing system 220 updates each smart radio with the information (on roles and contacts) needed for a shift when a worker clocks in using the radio.

In some embodiments, roles are assigned on a tiered basis. For example, Alice has roles assigned to her as an individual, as connected to the contract she is working, and as connected to her employer. Each of those tiers operates identity management within the cloud computing system 220. Each user frequently will work with others they have never met before and do not have the contact information thereto. Frontline workers tend to collaborate across employers or contracts. Based on tiered assigned roles, the relevant contact information for workers on a given task/job is shared therebetween. "Contact information" as facilitated by the smart radio is governed by the user account in each smart radio (e.g., as opposed to a phone number connected to a cellular phone).

In another example, Alice begins their shift using a particular smart radio. After Alice picks up the smart radio and clocks in, Alice can access the name and contact information for the emergency contact, Bob, assigned to Alice for that shift using the smart radio. Three hours later, when the shift ends and Alice clocks out, a next shift (Chuck's shift) begins. Chuck picks up the same (or a different) smart radio to clock in for their shift. If Chuck is using the same smart radio that Alice just used, the smart radio will automatically reflect that the emergency contact is now the emergency contact (Darla) assigned to Chuck for the next shift. After Chuck picks up the smart radio and clocks in, Chuck can access the name and contact information for the emergency contact, Darla, assigned to Chuck for the next shift using the smart radio. If Chuck is using a different smart radio from the radio that Alice used, the different smart radio will also automatically reflect that the emergency contact is now the emergency contact (Darla) assigned to Chuck for the next shift. The cloud computing system 220 thus stores, manages, and updates shifts, contacts, and roles for each worker, project, and facility. The information is updated based in part on time logging information received from the smart radios and other smart apparatuses (as shown by FIG. 2A). The cloud computing system 220 updates each smart radio with the information (on roles and contacts) needed for a shift when a worker clocks in using the radio. While this example describes emergency contacts being updated for a smart radio, it is understood that forms of contact information/data or preferred contact configurations can be dynamically updated for a smart radio based on current users. That is, other than emergency contacts, preferred contact configurations provided to smart radios according to a log-in of a current user can include frequent contacts, supervisor contacts, team member contacts, and/or the like. These preferred contact configurations can be maintained by the cloud computing system 220 for each user.

The information transmitted from the cloud computing system 220 to each smart radio to specifically update and configure each smart radio can include user identities for enabling access to various networks via the smart radio, including facility-specific private networks and commercial cellular networks. For example, after Alice logs in to the smart radio, the smart radio receives user identity information associated with Alice (e.g., from the cloud computing system 220) that enables the smart radio to connect to private networks for which Alice is authorized.

Figure 22:
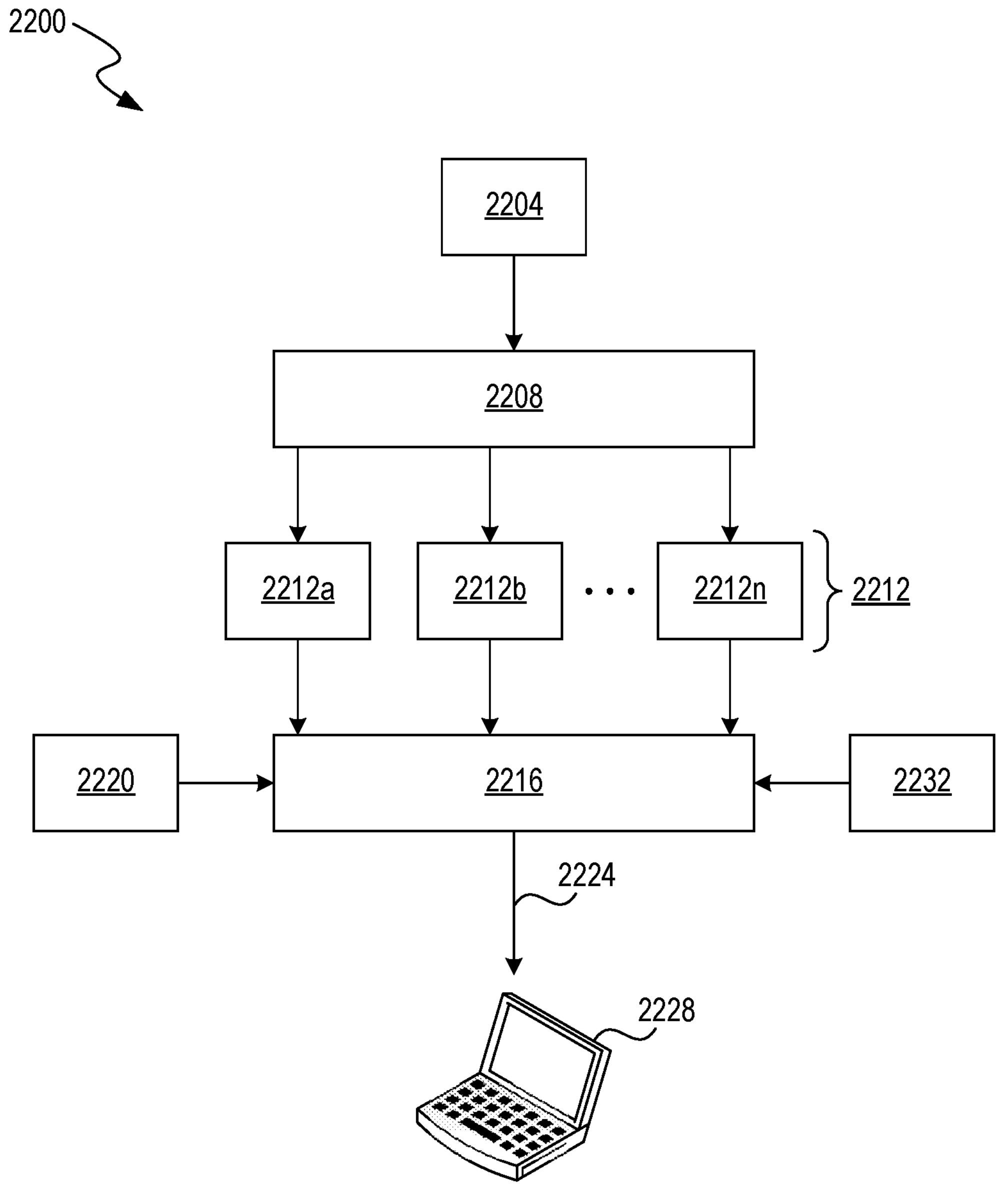
FIG. 22 is a block diagram illustrating an example machine learning (ML) system, in accordance with one or more embodiments.

In embodiments, a front-facing camera of the smart radio is used to capture employee clock-ins to deter "buddy clocking" or "buddy punching," whereby one worker fraudulently records the time of another. For example, the smart radio or cloud computing system 220 operates a facial recognition system (e.g., using the ML system 2200 illustrated and described in more detail with reference to FIG. 22), eliminating the need of a fingerprint scanner. Cloud-based software running on the smart radio enables the time logging mechanism to work seamlessly with the cloud computing system 220. In embodiments, Human Resources (HR) software is used for tracking employee time, and can, in versions, interact with smart radios or other devices to track and record when a worker enters a particular facility, or portion of a facility, and at what time each entry occurs. In order to gain access to a particular protected area of a facility, a worker uses NFC functionality of the smart radio to scan an NFC device located at an entry point, is allowed access, and the HR application records the time access was granted. The smart radios can also be used to scan NFC tags or cards mounted at locations (e.g., vessels and equipment). In embodiments, the machine learning system 2200, illustrated and described in more detail with reference to FIG. 22, is used to detect and track abnormalities in time logging, for example, using features based on the number of workers clocking in or facility slowdowns as input data.

Figure 21:
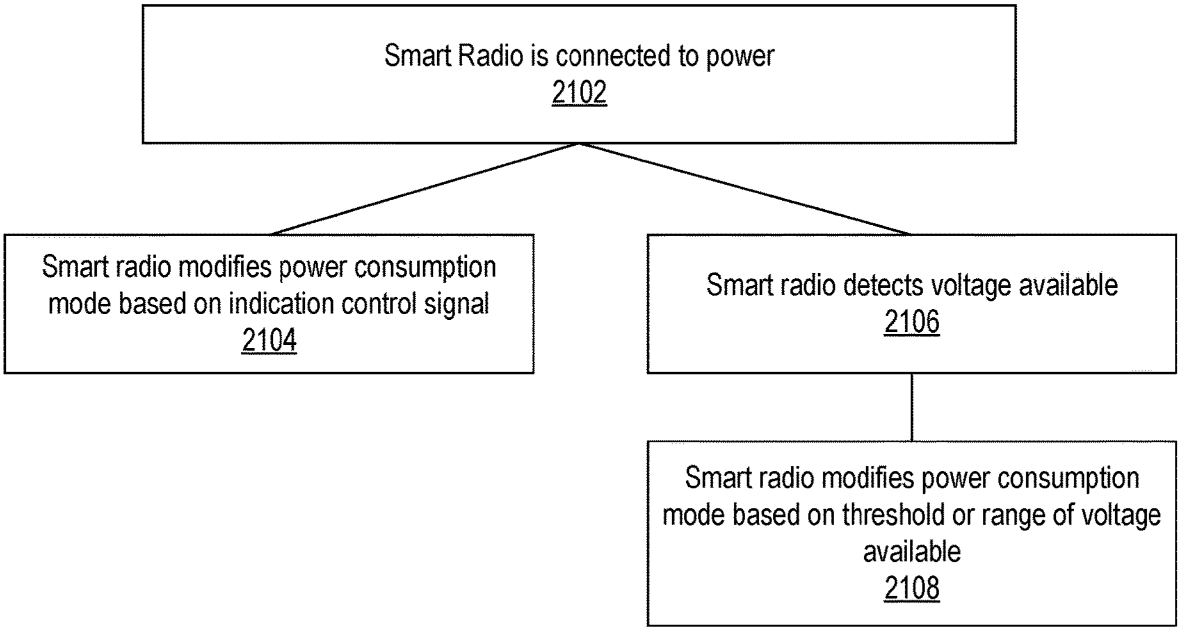
FIG. 21 is a flowchart illustrating power mode selection.

In embodiments, the smart radio and the cloud computing system 220 have geofencing capabilities. The smart radio allows the worker to clock in and out only when they are within a particular Internet geolocation. A geofence refers to a virtual perimeter for a real-world geographic area, (e.g., a portion of a facility). For example, a geofence is dynamically generated for the facility (as in a radius around a point location) or matched to a predefined set of boundaries (such as construction zones or refinery boundaries, or around specific equipment). A location-aware device (e.g., the position tracking component 125 and the position estimating component 123) of the smart radio entering or exiting a geofence triggers an alert to the smart radio, as well as messaging to a supervisor's device (e.g., the text messaging display 240 illustrated in FIG. 2A), the cloud computing system 220 or a local server. The information, including a location and time is sent to the cloud computing system 220. In embodiments, the machine learning system 2200, illustrated and described in more detail with reference to FIG. 21, is used to trigger alerts, for example, using features based on equipment malfunctions or operational hazards as input data.

The wireless communications arrangement includes a cellular subsystem 105, a Wi-Fi subsystem 106, the optional LPWAN/LoRa network subsystem 107 wirelessly connected to a LPWAN network 109, and a Bluetooth subsystem 108, all enabling sending and receiving. Cellular subsystem 105, in embodiments, enables the apparatus 100 to communicate with at least one wireless antenna 174 located at a facility (e.g., a manufacturing facility, a refinery, or a construction site). For example, the wireless antennas 174 are permanently installed or temporarily deployed at the facility. Example wireless antennas 374 are illustrated and described in more detail with reference to FIG. 3.

In embodiments, a cellular edge router arrangement 172 is provided for implementing a common wireless source. A cellular edge router arrangement 172 (sometimes referred to as an "edge kit") is usable to include a wireless cellular network into the Internet. In embodiments, the LPWAN network 109, the wireless cellular network, or a local radio network is implemented as a local network for the facility usable by instances of the apparatus 100, for example, the local network 204 illustrated and described in more detail with reference to FIG. 2A. For example, the cellular type can be 2G, 3G, 4G, LTE, 5G, etc. The edge kit 172 is typically located near a facility's primary Internet source 176 (e.g., a fiber backhaul or other similar device). Alternatively, a local network of the facility is configured to connect to the Internet using signals from a satellite source, transceiver, or router 178, especially in a remotely located facility not having a backhaul source, or where a mobile arrangement not requiring a wired connection is desired. More specifically, the satellite source plus edge kit 172 is, in embodiments, configured into a vehicle, or portable system. In embodiments, the cellular subsystem 105 is incorporated into a local or distributed cellular network operating on any of the existing 88 different Evolved Universal Mobile Telecommunications System Terrestrial Radio Access (EUTRA) operating bands (ranging from 700 MHz up to 2.7 GHz). For example, the apparatus 100 can operate using a duplex mode implemented using time division duplexing (TDD) or frequency division duplexing (FDD).

A Wi-Fi subsystem 106 enables the apparatus 100 to communicate with an access point capable of transmitting and receiving data wirelessly in a relatively high-frequency band. In embodiments, the Wi-Fi subsystem 106 is also used in testing the apparatus 100 prior to deployment. A Bluetooth subsystem 108 enables the apparatus 100 to communicate with a variety of peripheral devices, including a biometric interface device 116 and a gas/chemical detection device 118 used to detect noxious gases. In embodiments, the biometric and gas-detection devices 116 and 118 are alternatively integrated into the apparatus 100. In embodiments, numerous other Bluetooth devices are incorporated into the apparatus 100.

As used herein, the wireless subsystems of the apparatus 100 include any wireless technologies used by the apparatus 100 to communicate wirelessly (e.g., via radio waves) with other apparatuses in a facility (e.g., multiple sensors, a remote interface, etc.), and optionally with the cloud/Internet for accessing websites, databases, etc. The wireless subsystems 105, 106, and 108 are each configured to transmit/receive data in an appropriate format, for example, in IEEE 802.11, 802.15, 802.16 Wi-Fi standards, Bluetooth standard, WinnForum Spectrum Access System (SAS) test specification (WINNF-TS-0065), and across a desired range. In embodiments, multiple apparatuses 100 are connected to provide data connectivity and data sharing across the multiple apparatuses 100. In embodiments, the shared connectivity is used to establish a mesh network.

The position tracking component 125 and the position estimating component 123 operate in concert. In embodiments, the position tracking component 125 is a GNSS (e.g., GPS) navigational device that receives information from satellites and determines a geographical position based on the received information. The position tracking component 125 is used to track the location of the apparatus 100. In embodiments, a geographic position is determined at regular intervals (e.g., every five seconds) and the position in between readings is estimated using the position estimating component 123.

GPS position data is stored in memory 114 and uploaded to server 170 at regular intervals (e.g., every minute). In embodiments, the intervals for recording and uploading GPS data are configurable. For example, if the apparatus 100 is stationary for a predetermined duration, the intervals are ignored or extended, and new location information is not stored or uploaded. If no connectivity exists for wirelessly communicating with server 170, location data is stored in memory 114 until connectivity is restored, at which time the data is uploaded, then deleted from memory 114. In embodiments, GPS data is used to determine latitude, longitude, altitude, speed, heading, and Greenwich mean time (GMT), for example, based on instructions of software 115 or based on external software (e.g., in connection with server 170). In embodiments, position information is used to monitor worker efficiency, overtime, compliance, and safety, as well as to verify time records and adherence to company policies.

In some embodiments, a Bluetooth tracking arrangement using beacons is used for position tracking and estimation. For example, Bluetooth component 108 receives signals from Bluetooth Low Energy (BLE) beacons. The BLE beacons are located about the facility similar to the example wireless antennas 374 shown by FIG. 3. The controller 110 is programmed to execute relational distancing software using beacon signals (e.g., triangulating between beacon distance information) to determine the position of the apparatus 100. Regardless of the process, the Bluetooth component 108 detects the beacon signals and the controller 110 determines the distances used in estimating the location of the apparatus 100.

In alternative embodiments, the apparatus 100 uses Ultra-Wideband (UWB) technology with spaced apart beacons for position tracking and estimation. The beacons are small battery powered sensors that are spaced apart in the facility, and broadcast signals received by a UWB component included in the apparatus 100. A worker's position is monitored throughout the facility over time when the worker is carrying or wearing the apparatus 100. As described herein, location sensing GNSS and estimating systems (e.g., the position tracking component 125 and the position estimating component 123) can be used to primarily determine a horizontal location. In embodiments, the barometer component is used to determine a height that the apparatus 100 is located at (or operate in concert with the GNSS to determine the height) using known vertical barometric pressures at the facility. With the addition of a sensed height, a full three-dimensional location is determined by the processor 112.

Applications of the embodiments include determining if a worker is, for example, on stairs or a ladder, atop or elevated inside a vessel, or in other relevant locations.

Figure 8:
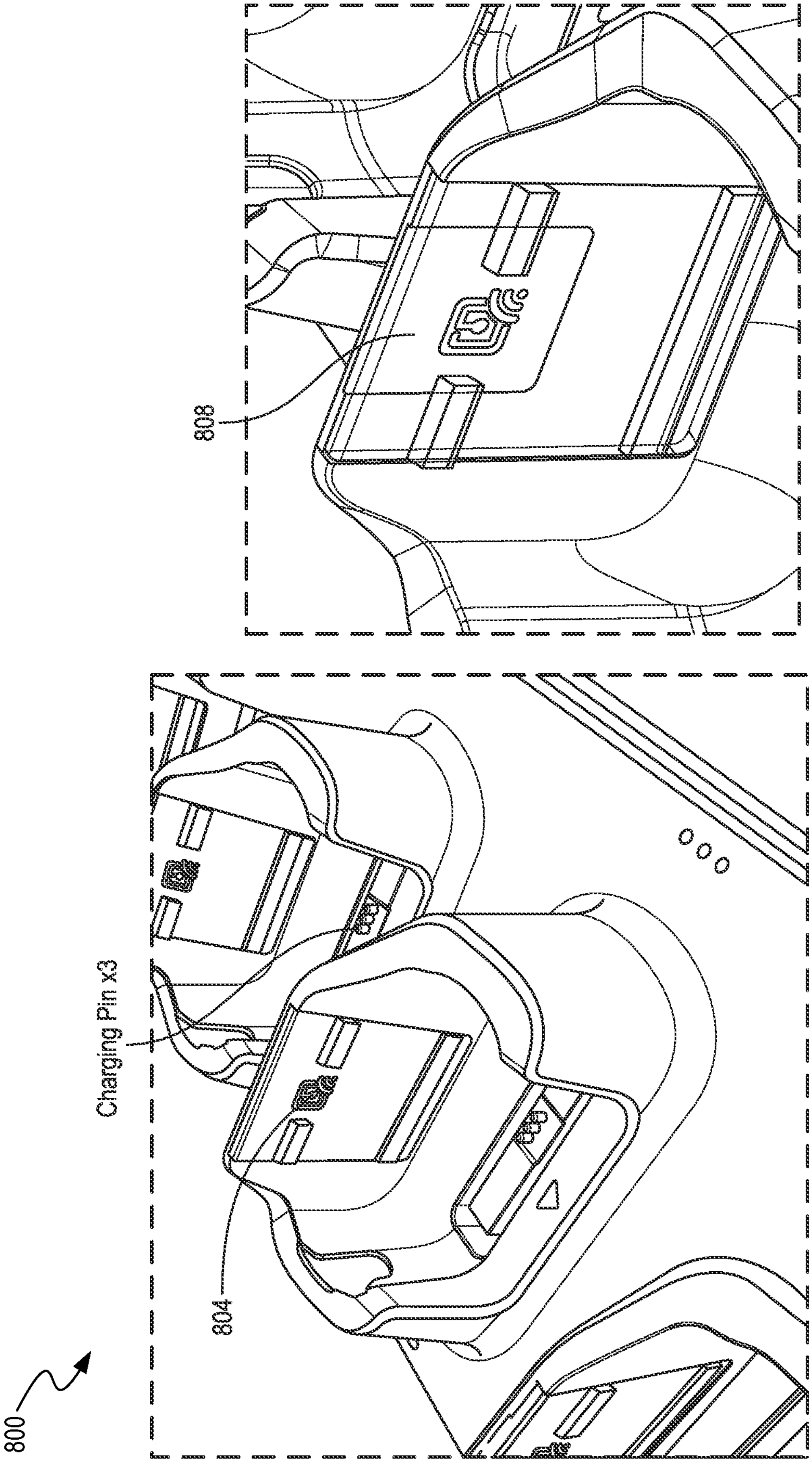
FIG. 8 is a drawing illustrating example charging cradles for apparatuses implementing device tracking and geofencing, in accordance with one or more embodiments.
Figure 9:
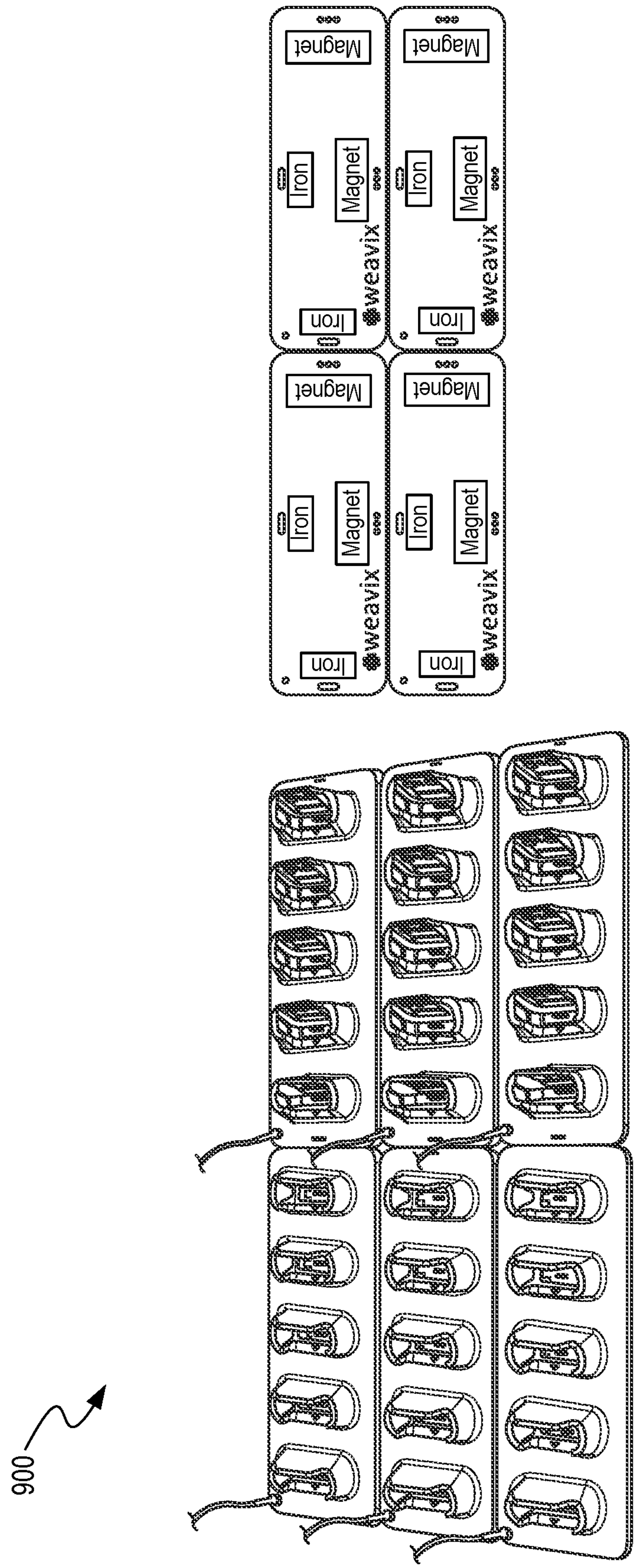
FIG. 9 is a drawing illustrating example charging cradles for apparatuses implementing device tracking and geofencing, in accordance with one or more embodiments.

An external power source 180 is optionally provided for recharging battery 120. The battery 120, in embodiments, is shaped, sized, and electrically configured to be receivable into a charging station (not shown by FIG. 1). Example charging stations (also referred to as "charging cradles" or "charging docks") are illustrated and described in more detail with reference to FIG. 6. An example charging cradle 800 is shown by FIG. 8. An example two-dimensional array of charging cradles 900 is shown by FIG. 9. In embodiments, the architecture of the apparatus 100 shown by FIG. 1 includes a connector that connects to the external power source 180.

In embodiments, display screen 130 is a touch screen implemented using a liquid-crystal display (LCD), an e-ink display, an organic light-emitting diode (OLED), or other digital display capable of displaying text and images. An example text messaging display 240 is illustrated in FIG. 2A. In embodiments, display screen 130 uses a low-power display technology, such as an e-ink display, for reduced power consumption. Images displayed using display screen 130 include but are not limited to photographs, video, text, icons, symbols, flow charts, instructions, cues, and warnings. For example, display screen 130 displays (e.g., by default) an identification style photograph of an employee who is carrying the apparatus 100 such that the apparatus 100 replaces a traditional badge worn by the employee. In another example, step-by-step instructions for aiding a worker while performing a task are displayed via display screen 130. In embodiments, display screen 130 locks after a predetermined duration of inactivity by a worker to prevent accidental activation via user-input device 150.

The audio device 146 optionally includes at least one microphone (not shown) and a speaker for receiving and transmitting audible sounds, respectively. Although only one speaker is shown existing in the architecture drawing of FIG. 1, it should be understood that in an actual physical embodiment, multiple speakers (and also microphones used for the purpose of noise cancellation) are utilized such that the apparatus 100 can adequately receive and transmit audio. In embodiments, the speaker has an output around 105 dB to be loud enough to be heard by a worker in a noisy facility. The speaker adjusts to ambient noise, for example, the audio device 146 or a circuit driving the speaker samples the ambient noise, and then increases a volume of the output audio from the speaker such that the volume is greater than the ambient noise (e.g., 5 dB louder). In embodiments, a worker speaks commands to the apparatus 100. The microphone of the audio device 146 receives the spoken sounds and transmits signals representative of the sounds to controller 110 for processing. In embodiments, the machine learning system 2200, illustrated and described in more detail with reference to FIG. 22, is used to generate appropriate volume levels, for example, using features based on noise at a location or manufacturing operation types as input data.

In embodiments, the audio device 146 disseminates audible information to the worker via the speaker and receives spoken sounds via the microphone(s). The audible information is generated by the apparatus 100 based on data or signals received by the apparatus 100 (e.g., the smart camera 228 illustrated and described in more detail with reference to FIG. 2A) from the cloud computing system 220, an administrator, or a local server. For example, the audible information includes instructions, reminders, cues, and/or warnings to the worker and is in the form of speech, bells, dings, whistles, music, or other attention-grabbing noises without departing from the scope hereof. In embodiments, one or more speakers of the apparatus 100 (e.g., the smart radio illustrated in FIG. 4) are adapted to emit sounds from a front side 404, a back side 408, any of the other sides 412, 416 of the smart radio, or even multiple sides of the smart radio.

In embodiments, the apparatus 100 is continuously powered on. For example, an option to turn off the apparatus 100 is not available to a worker (e.g., an operator without administrator privileges). If the battery 120 discharges below a cut-off voltage, such that the apparatus 100 loses power and turns off, the apparatus 100 will automatically turn on upon recharging of battery 120 to above the cut-off voltage. In operation, the apparatus 100 enters a standby mode when not actively in use to conserve battery charge. Standby mode is determined via controller 110 to provide a low-power mode in which no data transmission occurs and display screen 130 is in an OFF state. In the standby mode, the apparatus 100 is powered on and ready to transmit and receive data. During use, the apparatus 100 operates in an operational mode. In embodiments, the display screen 130, upon activation, is configured to display a battery level (e.g., a state-of-charge) indication. The indicator is made to be presented due to processes running on controller 110 (e.g., which detect voltage from a voltmeter electrically coupled with battery 180 and electronically connected with the controller 110).

Communication Network Features

FIG. 2A is a drawing illustrating an example environment 200 for apparatuses and communication networks for device tracking and geofencing, in accordance with one or more embodiments. The environment 200 includes a cloud computing system 220, cellular towers 212, 216, and local networks 204, 208. Components of the environment 200 are implemented using components of the example computer system 2300 illustrated and described in more detail with reference to FIG. 23. Likewise, different embodiments of the apparatus 100 include different and/or additional components and are connected in different ways.

Smart radios 224, 232 and smart cameras 228, 236 are implemented in accordance with the architecture shown by FIG. 1. In embodiments, smart sensors implemented in accordance with the architecture shown by FIG. 1 are also connected to the local networks 204, 208 and mounted on a surface of a worksite, or worn or carried by workers. For example, the local network 204 is located at a first facility and the local network 208 is at a second facility. An example facility 300 is illustrated and described in more detail with reference to FIG. 3. In embodiments, each smart radio and other smart apparatus has two (Subscriber Identity Module) SIM cards, sometimes referred to as dual SIM. A SIM card is an IC intended to securely store an international mobile subscriber identity (IMSI) number and its related key, which are used to identify and authenticate subscribers on mobile telephony devices. In embodiments, the two SIM cards includes a first SIM for connecting to a facility-specific network, such as a private network, and a second SIM for connecting to a commercial network that is not facility-specific. In embodiments, the SIMS of a smart radio are dynamically configured with user identities based on a current or present user of the smart radio. For example, Alice logs in to the smart radio, and the smart radio configures at least one of its SIM according to a user identity associated with Alice, such that the smart radio can access private networks for which Alice is authenticated or authorized.

A first SIM card enables the smart radio 224*a* to connect to the local (e.g., cellular) network 204 and a second SIM card enables the smart radio 224*a* to connect to a commercial cellular tower (e.g., cellular tower 212) for access to mobile telephony, the Internet, and the cloud computing system 220 (e.g., to major participating networks such as Verizon™, AT&T™, T-Mobile™). The local network 204 can be specific to the facility; for example, only certain users designated for the facility can access and communicate over the local network 204. In some embodiments, the users that can access the local network 204 or a private facility-specific network are selected by the cloud computing system 220. In such embodiments, the smart radio 224*a* has two radio transceivers, one for each SIM card. In other embodiments, the smart radio 224*a* has two active SIM cards, and the SIM cards both use only one radio transceiver. However, the two SIM cards are both active only as long as both are not in simultaneous use. As long as the SIM cards are both in standby mode, a voice call (e.g., a Radio over Internet Protocol (RoIP) call, a Voice over Internet Protocol (VoIP) call, a telephone call, a cellular network call) could be initiated on either. However, once the call begins, the other SIM becomes inactive until the first SIM card is no longer actively used.

According to example embodiments, the use of multiple SIM cards or SIM components by the smart radio is controlled by a location of the smart radio relative to geofences defined for the facility. In some embodiments, the facility is associated with facility-specific location data (e.g., stored, configured, managed by the cloud computing system) that defines one or more geofences for facility-specific activities. For example, the geofences correspond to buildings or structures within the facility, staging areas, production areas, hazardous zones, and/or the like. Generally, the geofences correspond to areas in facility in which local, private, facility-specific, and/or employer/contract-specific communication is needed, desired, or useful. In some embodiments, the smart radio obtains the facility-specific location data, for example, when a user logs-in on the smart radio.

Whenever the smart radio is located within a geofence defined by the facility-specific location data and designated for facility-specific activities and communication, the smart radio uses a facility-specific SIM component to connect to and/or communicate over a local private network for the facility. Conversely, whenever the smart radio exits the geofence (e.g., into a non-geofenced area, into a geofence designated for non-facility-specific or public activities, into a geofence defined for threshold service quality by a commercial cellular network), the smart radio responsively uses a non-facility-specific SIM component to connect to and/or communicate over a non-facility-specific network, such as a commercial cellular network. In particular, the smart radio switches from the local private network to the commercial cellular network, for example, and disconnects from the local private network.

In some embodiments, the smart radio prevents connection to the local private network when located outside of the defined geofences, for example, based on disabling the facility-specific SIM component. The geofence SIM selection scheme prevents the smart radio from connecting to a network with spotty or questionable service. For example, a network that is supported inside a building is less effective outside of the building, but the smart radio may still receive communication from the associated access point. Rather than allow the smart radio to remain operating on the low quality network associated with the inside of the building, the smart radio, now in a new outside geofence, connects to a different network using the non-facility specific SIM. Thus, the geofences implement an artificial failure state for causing a smart radio to transition from using a private network to a commercial cellular network. Monitoring of location relative to geofences thus precludes a need to evaluate respective signal qualities of private networks and public networks to determine which network to use.

In some embodiments, the geofences are used to automatically configure or program the two-way radio, DMR, or LMR rather than determine an active SIM card. For example, a given facility site has a license to use a particular wireless band, and a transmit power allowance. The license for the site enables the use of encrypted elements of the radio transmissions as well so that the licensed band remains private. The smart radio thus provisions itself to the licensed band and transmit power (and encryption if applicable) when entering an associated geofence with that facility site. Similarly, when the smart radio enters a different facility site with a difference geofence, the smart radio provisions for the wireless band and transmit power that is available at that site. While the smart radio is not within a corresponding geofence the smart radio is provisioned for public radio bands and transmit power. In some embodiments, the provisioning is inclusive rather than exclusive, that is the radio band and power available includes both public bands and transmit powers as well as the local private band.

Provisioning the smart radio to make use of the site specific band makes use of a wireless specification stored on board the smart radio. Multiple wireless specifications may exist on the smart radio as connected to locations, work orders, or people. The specifications are used to provision the wireless transceiver used for two-way radio communication. Transmit power and band filtering are settings of the transceiver that may be provisioned on an ad hoc basis.

In addition to the geofence location, the smart radio's login credentials are another element that embodiments apply to band, transmit and encryption settings of the radio features. That is, even if a user has a smart radio and is within a given geofence, that geofence may only apply to particular login credentials or users of a particular status (e.g., managers or associated with a given work order).

In embodiments, the local network 204 uses a private address space of IP addresses. The local network 204 can provide resources, such as various interfaces, data windows, and other resources described herein (e.g., generated or provided by the cloud computing system 220) related to the operation of the facility via the private address space. In other embodiments, the local network 204 is a local radio-based network using peer to peer two-way radio (duplex communication) with extended range based on hops (e.g., from smart radio 224*a* to smart radio 224*b* to smart radio 224*c*). Hence, radio communication is transferred similar to addressed packet-based data with packet switching by each smart radio or other smart apparatus on the path from source to destination. For example, each smart radio or other smart apparatus operates as a transmitter, receiver, or transceiver for the local network 204 to serve a facility. The smart apparatuses serve as multiple transmit/receive sites interconnected to achieve the range of coverage required by the facility. Further, the signals on the local networks 204, 208 are backhauled to a central switch for communication to the cellular towers 212, 216.

In embodiments (e.g., in more remote locations), the local network 204 is implemented by sending radio signals between smart radios 224. Such embodiments are implemented in less inhabited locations (e.g., wilderness) where workers are spread out over a larger work area. There may be otherwise inaccessible to commercial cellular service (e.g., for a commercial cellular network, for a cellular-based private network) in such work areas. An example is where power company technicians are examining or otherwise working on power lines over larger distances that are often remote. The embodiments are implemented by transmitting radio signals from a smart radio 224*a* to other smart radios 224*b*, 224*c* on one or more frequency channels operating as a two-way radio. The radio messages sent include a header and a payload. Such broadcasting does not require a session or a connection between the devices. Data in the header is used by a receiving smart radio 224*b* to direct the "packet" to a destination (e.g., smart radio 224*c*). At the destination, the payload is extracted and played back by the smart radio 224*c* via the radio's speaker.

For example, the smart radio 224*a* broadcasts voice data using radio signals. Any other smart radio 224*b* within a range limit (e.g., 1 mile (mi), 2 mi, etc.) receives the radio signals. The radio data includes a header having the destination of the message (smart radio 224*c*). The radio message is decrypted/decoded and played back on only the destination smart radio 224*c*. If another smart radio 224*b* receives the radio signals that was not the destination radio, the smart radio 224*b* re-broadcasts the radio signals rather than decoding and playing them back on a speaker. The smart radios 224 are thus used as signal repeaters. The advantages and benefits of the embodiments disclosed herein include extending the range of two-way radios or smart radios 224 by implementing radio hopping between the radios.

In some embodiments, the smart radio performs the described radio hopping as an alternative communication method when a facility-specific private network, a commercial cellular network (e.g., "public" networks), and other mediums (e.g., Wi-Fi networks) are unavailable. As described above, the smart radio transitions from using a private network to a commercial cellular network based on monitoring the smart radio's location relative to geofences for the private network, according to example embodiments. In some embodiments, the smart radio can transition from the commercial cellular network to radio hopping based on geofences for the commercial cellular network, measured signal quality of the commercial cellular network, and/or other criteria. In some embodiments, the smart radio performs the described radio hopping for radio signals transmitted via LMR systems, DMR systems, RoIP systems, and/or the like. Thus, the smart radio is configured to use at least one of cellular-based private networks, commercial cellular (e.g., "public") networks, and enhanced DMR/LMR/RoIP methods whenever suitable, thereby providing communication reliability and resilience.

In embodiments, the local network is implemented using Radio over Internet Protocol (RoIP). RoIP, is similar to Voice over IP (VoIP), but augments two-way radio communications rather than telephone calls. For example, RoIP is used to augment VoIP with PTT (Push-to-Talk). A smart radio having a PTT button on a user interface 420 is illustrated in FIG. 4. With RoIP, at least one node of a network is a radio (or a radio with an IP interface device, e.g., the smart radio 224*a*) connected via IP to other nodes (e.g., smart radios 224*b*, 224*c*) in the local network 204. The other nodes can be two-way radios but could also be softphone applications running on a smartphone (e.g., the smartphone, or some other communications device accessible over IP). In embodiments, the smart radio can initiate RoIP voice calls over the local network, and on another network such as a commercial cellular network, the smart radio can be used for cellular voice calls, telephone calls, VoIP calls, and the like.

In embodiments, the local network 204 is implemented using Citizens Broadband Radio Service (CBRS). To enable CBRS, the controller 110 includes multiple computing and other devices, in addition to those depicted (e.g., multiple processing and memory components relating to signal handling, etc.). The controller 110 is illustrated and described in more detail with reference to FIG. 1. For example, the private network component 105 (illustrated and described in more detail with reference to FIG. 1) includes numerous components related to supporting cellular network connectivity (e.g., antenna arrangements and supporting processing equipment configured to enable CBRS). The use of CBRS Band 48 (from 3550 MHz to 3700 MHz), in embodiments, provides numerous advantages. For example, the use of Band 48 provides longer signal ranges and smoother handovers. The use of CBRS Band 48 supports numerous smart radios 224 and smart cameras 228 at the same time. A smart apparatus is therefore sometimes referred to as a Citizens Broadband Radio Service Device (CB SD).

In alternative embodiments, the Industrial, Scientific, and Medical (ISM) radio bands are used instead of CBRS Band 48. It should be noted that the particular frequency bands used in executing the processes herein could be different, and that the aspects of what is disclosed herein should not be limited to a particular frequency band unless otherwise specified (e.g., 4G-LTE or 5G bands could be used). In embodiments, the local network 204 is a private cellular (e.g., LTE) network operated specifically for the benefit of the facility. An example facility 300 implementing a private cellular network using wireless antennas 374 is illustrated and described in more detail with reference to FIG. 3. Only authorized users of the smart radios 224 have access to the local network 204. For example, the network 204 uses the 900 MHz spectrum. In another example, the local network 204 uses 900 MHz for voice and narrowband data for land mobile radio (LMR) communications, 900 MHz broadband for critical wide area, long-range data communications, and CBRS for ultra-fast coverage of smaller areas of the facility, such as substations, storage yards and office spaces.

In embodiments, the communication systems disclosed herein mitigate the network bottleneck problem when larger groups of workers are working in or congregating in a localized area of the facility. When a large number of workers are gathered in one area, the smart radios 224 they carry or wear creates too much demand for cellular networks or the cellular tower 212 to handle. To solve the problem, in embodiments, the cloud computing system 220 is configured to identify when a large number of smart radios 224 are located in proximity to each other.

In embodiments, the cloud computing system 220 anticipates where congestion is going to occur for the purpose of placing additional access points in the area. For example, the cloud computing system uses the ML system 2200 to predict where congestion is going to occur based on bottleneck history and previous location data for workers. An example of network choke points are facility entry points where multiple workers arrive in close succession and clock in. The cloud computing system 220 accounts for congestion at such entry points by including additional access points at such locations. The cloud computing system 220 configures each smart radio 224*a* to relay data in concert with the other smart radios 224*b*, 224*c*. By timing the transmissions of each smart radio 224*a*, the radio waves from the cellular tower 212 arrive at a desired location, i.e., the desired smart radio

224*a* at a different point in time than the point in time the radio waves from the cellular tower 212 arrive at a different smart radio 224*b*. Simultaneously, the phased radio signals are overlaid to communicate with other smart radios 224*c*, mitigating the bottleneck.

The cloud computing system 220 delivers computing services—including servers, storage, databases, networking, software, analytics, and intelligence—over the Internet ("the cloud") to offer faster innovation, flexible resources, and economies of scale. FIG. 2A depicts an exemplary high-level cloud-centered network environment 200 otherwise known as a cloud-based system. Referring to FIG. 2A, it can be seen that the environment centers around the cloud computing system 220 and the local networks 204, 208. Through the cloud computing system 220, multiple software systems are made to be accessible by multiple smart radio apparatuses 224, 232, smart cameras 228, 236, as well as more standard devices (e.g., a smartphone 244 or a tablet) each equipped with local networking and cellular wireless capabilities. Each of the apparatuses 224, 228, 244, although diverse, embody the architecture of apparatus 100 shown by FIG. 1, but are distributed to different kinds of users or mounted on surfaces of the facility. For example, the smart radio 224*a* is worn by employees or independent contracted workers at a facility. The CBRS-equipped smartphone 244 is utilized by an on or off-site supervisor. The smart camera 228 is utilized by an inspector or another person wanting to have improved display or other options. Regardless, it should be recognized that numerous apparatuses are utilized in combination with an established cellular network (e.g., CBRS Band 48 in embodiments) to provide the ability to access the cloud software applications from the apparatuses (e.g., smart radio apparatuses 224, 232, smart cameras 228, 236, smart phone 244).

In embodiments, the cloud computing system 220 and local networks 204, 208 are configured to send communications to the smart radios 224, 232 or smart cameras 228, 236 based on analysis conducted by the cloud computing system 220. The communications enable the smart radio 224 or smart camera 228 to receive warnings, etc., generated as a result of analysis conducted. The employee-worn smart radio 224*a* (and possibly other devices including the architecture of apparatus 100, such as the smart cameras 228, 236) are used along with the peripherals shown in FIG. 1 to accomplish a variety of objectives. For example, workers, in embodiments, are equipped with a Bluetooth enabled gas-detection smart sensor, implemented using the architecture shown in FIG. 1. The smart sensor detects the existence of a dangerous gas, or gas level. By connecting through the smart radio 224*a* or directly to the local network 204, the readings from the smart sensor are analyzed by the cloud computing system 220 to implement a course of action due to sensed characteristics of toxicity. The cloud computing system 220 sends an alert out to the smart radio 224 or smart camera 228, and thus a worker, for example, using speaker 146 or alternative notification means to alert the worker so that they can avoid danger. The speaker 146 is illustrated and described in more detail with reference to FIG. 1.

Smart Peripheral Apparatuses

In embodiments, a peripheral biometric apparatus implemented using the architecture shown by FIG. 1 (e.g., incorporating heart rate, moisture sensors, etc.). The term "peripheral" means that the worker may not be required to use or carry the particular apparatus unlike the smart radio 224*a*. For example, the peripheral apparatus uses local network 204 and/or the cellular tower 212 to communicate with a biometrics analysis system. The biometrics analysis system operates on the cloud computing system 220 to detect danger indicating biometric conditions of the worker. Heart rates, dehydration, and other biometric parameters are monitored and analyzed by the cloud computing system 220. Further, warnings are transmitted to the worker through the smart radio 224*a* or to anyone else (e.g., a supervisor using apparatus 244) connected with the overall communication system.

In embodiments, the cloud computing system 220 detects abnormal biometric conditions using peripheral biometric smart sensors (e.g., dehydration, abnormally low heart rate). The cloud computing system 220 couples the information with readings from a gas-detection smart sensor (e.g., a reading reflecting the presence of hydrogen sulfide gas) to reach a conclusion that the worker needs to immediately get to safety. For example, the biometric and gas-detection devices 116 and 118 illustrated and described in more detail with reference to FIG. 1 are used. In embodiments, the cloud computing system 220 uses numerous means to communicate the warning to the worker. For example, the smart radio 224*a* includes a vibration warning system that warns the worker by vibration. Or the smart radio 224*a* uses the speaker 146 or Bluetooth peripherals illustrated and described in more detail with reference to FIG. 1.

In embodiments, the smart radio 224*a* is repurposed as a camera on site that provides video of the site, a node for peer-to-peer communication, and a point of triangulation for device location and identification. For example, if the video feed is of lower than suitable quality for identification of individual workers, the workers are labeled in the video based on the smart radio they are carrying. In an example, the smart radio or cloud computing system 220 operates a facial recognition system (e.g., using the ML system 2200 illustrated and described in more detail with reference to FIG. 22) to perform the labeling. The repurposed smart radio 224*a* provides imaging no matter how the smart radio 224*a* is being used. In embodiments, an additional external camera 228 is used that is physically separated from the smart radio 224*a* via Bluetooth. The smart camera 228 is optionally be used in place of built-in cameras in the smart radio 224*a* or in addition to the built-in cameras. The smart radio 224*a* would be configured to receive pictures taken by the external camera 228.

In embodiments, the smart radio 224*a* is configured to receive photos (e.g., via Bluetooth, another short-range wireless network, the local network 204, or a combination thereof) from other kinds of external peripheral cameras. For example, the peripheral cameras are wearable devices such as cameras mounted to glasses or helmets. The peripheral cameras provide a forward-facing view from the perspective of the worker while being operated hands-free. Alternatively, a peripheral camera 236 is positioned or mounted above a workstation/area, machinery, equipment, or another structure to provide an overhead view or an inside view of a contained area. The peripheral camera 236 provides an internal view of the contained area, and is positioned on a gimbal, swivel plate, rail, tripod, stand, post, and/or pole for enabling movement of the camera 236. Camera movement is controlled by the worker, under preprogrammed control via controller 110 or via another control mechanism. In embodiments, multiple views are displayed on display screen 130 from built-in cameras of the peripheral camera 236 (which are represented as one camera 165 in FIG. 1). Selection and enhancement (e.g., scrolling, panning, zooming) of views is provided via user-input means 150, for example. The display screen 130, camera 165, and user-input means 150 are illustrated and described in more detail with reference to FIG. 1. The built-in cameras, in embodiments, are digital-video cameras or high-definition digital-video cameras. Optional front and back cameras together enable the receipt of photo or video content from either side of the peripheral camera 236.

Machine-Defined Interactions

The cloud computing system 200 uses data received from the smart radio apparatuses 224, 232 and smart cameras 228, 236 to track and monitor machine-defined interactions and collaborations of workers based on locations worked, times worked, analysis of video received from the smart cameras 228, 236, etc. An "interaction" describes a type of work activity performed by the worker. An interaction is measured by the cloud computing system 200 in terms of at least one of a start time, a duration of the activity, an end time, an identity (e.g., serial number, employee number, name, seniority level, etc.) of the worker performing the activity, an identity of the equipment(s) used by the worker, or a location of the activity. In embodiments, an interaction is measured by the cloud computing system 200 in terms of a vector (e.g., [time period 1, equipment location 1; time period 2, equipment location 2; time period 3, equipment location 3]). For example, a first interaction describes time spent operating a particular machine (e.g., a lathe, a tractor, a boom lift, a forklift, a bulldozer, a skid steer loader, etc.), performing a particular task, or working at a particular type of facility (e.g., an oil refinery).

A smart radio 224*a* carried or worn by a worker would track that the position of the smart radio 224*a* is in proximity to or coincides with a position of the particular machine. Example tasks include operating a machine to stamp sheet metal parts for manufacturing side frames, doors, hoods, or roofs of automobiles, welding, soldering, screwing, or gluing parts onto an automobile, all for a particular time period, etc. A lathe, lift, or other equipment, would have sensors (e.g., smart camera 228 or other peripheral devices) that log times when the smart radio 224*a* is in proximity to the equipment and send that information to the cloud computing system 220.

In an example, a smart camera 228 mounted at a stamping shop in an automobile factory captures video of a worker working in the stamping shop and performs facial recognition or equipment recognition (e.g., using computer vision elements of the ML system 2200 illustrated and described in more detail with reference to FIG. 22). The smart camera 228 sends the start time, duration of the activity, end time, identity (e.g., serial number, employee number, name, seniority level, etc.) of the worker performing the activity, identity of the equipment(s) used by the worker, and location of the activity to the cloud computing system 220 for generation of one or more interaction(s).

The cloud computing system 220 also has a record of what a particular worker is supposed to be working on or is assigned to for the start time and duration of the activity. The cloud computing system 220 compares the interaction(s) computed with the planned shifts of the worker to signal mismatches if any. An example interaction describes work performed at a particular geographic location (e.g., on an offshore oil rig or on a mountain at a particular altitude). The interaction is measured by the cloud computing system 200 in terms of at least the location of the activity and one of a duration of the activity, an identity of the worker performing the activity, or an identity of the equipment(s) used by the worker. In embodiments, the machine learning system 2200 is used to detect and track interactions, for example, extracting features based on equipment types or manufacturing operation types as input data. For example, a smart sensor mounted on the oil rig transmits to and receives signals from a smart radio 224*a* carried or worn by a worker to log the time the worker spends at a portion of the oil rig.

A "collaboration" describes a type of group activity performed by a worker, for example, a group of construction workers working together in a team of two or more in an automobile paint facility, layering a chemical formula in a construction site for protection against corrosion and scratches, installing an engine into a locomotive, etc. A collaboration is measured by the cloud computing system 200 in terms of at least one of a start time, a duration of the activity, an end time, identities (e.g., serial numbers, employee numbers, names, seniority levels, etc.) of the workers performing the activity, an identity of the equipment(s) used by the workers, or a location of the activity. In embodiments, a collaboration is measured by the cloud computing system 200 in terms of a vector (e.g., [time period 1, equipment location 1, worker identities 1; time period 2, equipment location 2, worker identities 2; time period 3, equipment location 3, worker identities 3]).

Collaborations are detected and monitored using location tracking (as described in more detail with reference to FIG. 1) of multiple smart apparatuses. For example, the cloud computing system 220 tracks and records a specific collaboration based on determining that two or more smart radios 224 were located in proximity to one another within a specific geofence associated with a particular worksite for a predetermined period of time. For example, a smart radio 224*a* transmits to and receives signals from other smart radios 224*b*, 224*c* carried or worn by other workers to log the time the worker spends working together in a team with the other workers.

In embodiments, a smart camera 228 mounted at a paint facility captures video of the team working in the facility and performs facial recognition (e.g., using the ML system 2200). The smart camera 228 sends the location information to the cloud computing system 220 for generation of collaborations. Examples of data downloaded to the smart radios 224 to enable monitoring of collaborations include software updates, device configurations (e.g., customized for a specific operator or geofence), location save interval, upload data interval, and a web application programming interface (API) server uniform resource locator (URL). In embodiments, the machine learning system 2200, illustrated and described in more detail with reference to FIG. 22, is used to detect and track interactions (e.g., using features based on geographical locations or facility types as input data).

In embodiments, the cloud computing system 220 determines a "response time" metric for a worker. The response time refers to the time difference between receiving a call to report to a given task and the time of arriving at a geofence associated with the task. To determine the response time, the cloud computing system 220 obtains and analyzes the time the call to report to the given task was sent to a smart radio 224*a* of the worker from the cloud computing system 220, a local server, or a supervisor's device (e.g., smart radio 224*b*). The cloud computing system 220 obtains and analyzes the time it took the smart radio 224*a* to move from an initial location to a location associated with the geofence.

In some embodiments, the response time is compared against an expected time. Expected time is based on trips originating from a location nearby the starting location for the worker (e.g., from within a starting geofenced area, or a threshold distance) and ending at the geofence associated with the task, or a regional geofence that the task occurs within. Embodiments that make use of a machine learning model identify similar historical journeys that are similar as a basis of comparison.

In an example, the cloud computing system determines a "repair metric" for a worker and a particular type of equipment (e.g., a power line, etc.) For example, a repair metric identifies how frequently repairs by a given individual were effective. Effectiveness of repairs is machine observable based on a length of time a given object remains functional as compared to an expected time of functionality (e.g., a day, a few months, a year, etc.). After a worker is called to repair a given object, a timer begins to run. The timer is ended by either of a predetermined period expiring (e.g., expected usable life of repairs) or an additional worker being called to repair that same object.

Thus, where a second worker is called out to fix the same object prior to the expected usable life of the repair has expired, the original worker is assumed to have done a poor job on the repair and their respective repair metric suffers. In contrast, so long as a second worker has not been called out to repair the same object (as evidenced by location data and dispatch descriptions) during the expected operational life of the repairs, the repair metric of the first worker remains positive. The expected operation life of a given set of repairs is based on the object repaired. In some embodiments, a machine learning model is used to identify appropriate functional lifetimes of repairs based on historical examples.

The repair metric is determined by the cloud computing system 200 in terms of at least one of locations of the worker (e.g., traveling to the equipment), location of the equipment, time spent in proximity to the equipment, predetermined amount of time the equipment is expected to be operable (e.g., a day, a few months, a year, etc.) after repair, number of repairs, etc.

In another example, a repair metric relates to an average amount of time equipment is operable and in working condition after the worker visits the particular type of equipment the worker repaired. The repair metric is determined by the cloud computing system 200 in terms of at least one of a location of a smart radio 224*a* carried by the worker, time spent in proximity to the equipment, predetermined amount of time the equipment is expected to be operable (e.g., a day, a few months, a year, etc.) after repair, or location of the equipment. For example, if the particular type of equipment is operable for more than 60 days after the worker visited the equipment (to repair it), the repair metric of the worker with respect to the particular type of equipment is increased. If the equipment has broken within less than a week after the worker visited the equipment (to repair it), the repair metric of the worker with respect to the particular type of equipment is decreased. In embodiments, the machine learning system 2200, illustrated and described in more detail with reference to FIG. 22, is used to detect and track interactions (e.g., using features based on equipment types or defect reports as input data).

Another example of a repair metric for a worker relates to a ratio of the amount of time an equipment is operable after repair to a predetermined amount of time the equipment is expected to be operable (e.g., a day, a few months, a year, etc.) after repair. The predetermined amount of time changes with the type of equipment. For example, some industrial components wear out in a few days, while other components can last for years. After the worker repairs the particular type of equipment, the cloud computing system 220 counts until the predetermined amount of time for the particular type of equipment is reached. Once the predetermined amount of time is met, the equipment is considered correctly repaired, and the repair metric for the worker is incremented. If before the predetermined amount of time, another worker is called to repair the same equipment, the repair metric for the worker is decremented.

In embodiments, equipment is assumed/considered repaired until the cloud computing system 220 is informed otherwise. In such embodiments, the worker does not need to wait to receive credit to their repair metric in cases where the predetermined amount of time for particular equipment is large (e.g., months or years).

Figure 3:
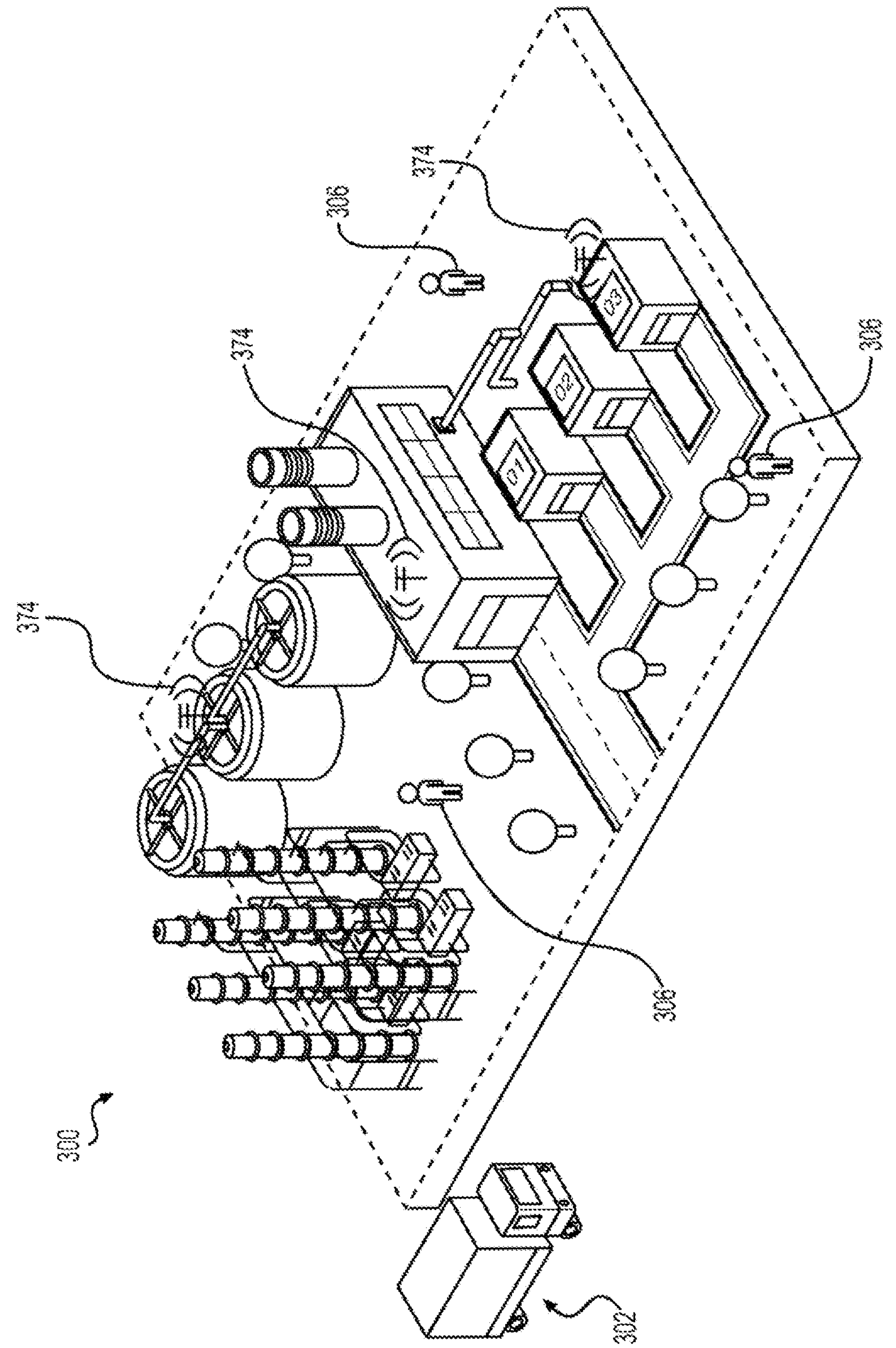
FIG. 3 is a drawing illustrating an example facility using apparatuses and communication networks for device tracking and geofencing, in accordance with one or more embodiments.

The smart radio 224*a* can track not only the current location of the worker, but also send information received from other apparatuses (e.g., the smart radio 224*b*, the camera 228) to contribute to the recorded locational information (e.g., of employees 306 at the facility 300 shown by FIG. 3). Because the smart radios 224 are readable by the cloud computing system 220, locational records can be analyzed to determine how well the different workers and other device users are doing in performing various tasks. For example, if a worker is inspecting a particular vessel in a refinery, it may be necessary for them to spend an hour doing so for a high-quality job to be performed. However, if the locational data record reveals that the worker was physically at the vessel for only two minutes, it would be an indication of hasty or incomplete work. The cloud computing system 220 can therefore track a "engagement metric" of time spent at a task with respect to the time required to be spent for the task to be performed.

In embodiments, the cloud computing system tracks the path chosen by a worker from a current location to a destination as compared to a computed direct path for determining "route efficiency." For example, tracking records for multiple workers going from a contractor's building at the site to another point within the site can be used to determine (e.g., patterns in foot traffic). In an example, the tracking reveals that a worker chooses a pathway that causes them to go back and forth to a location on the site that is long and goes around many interfering structures. The added distances reduce cost-effectiveness because of where the worker is actually walking. Traffic patterns and the "route efficiency" of a worker monitored and determined by the cloud computing system 220 based on positional data obtained from the smart radios 224 is used to improve the worker's efficiency at the facility.

In embodiments, the tracking is used to determine whether one or more workers are passing through or spending time in dangerous or restricted areas of the facility. The tracking is used by the cloud computing system 220 to determine a "risk metric" of each worker. For example, the risk metric is incremented when time logged by a smart radio that the worker is wearing in proximity to hazardous locations increases. In embodiments, the risk metric triggers an alarm at an appropriate juncture. In another example, the facility or the cloud computing system 220 establishes geofences around unsafe working areas. Geofencing is described in more detail with reference to FIG. 1. The risk metric is incremented when the position of the smart radio is determined to be within the geofence even though the worker is not supposed to be within the geofence for the particular task. In another example, the risk metric is incremented when a position of the smart radio and sensors mounted on particular equipment indicate that the equipment is faulty or unsafe to use, yet the worker is using the equipment instead of signaling for replacement equipment to be provided. The logged position and other data are also used to generate records to build an evidence profile to be used in accident situations. In some embodiments, the evidence profile includes worker-related events that are temporally adjacent to an accident scenario. For example, the evidence profile includes worker events (e.g., interactions with equipment, collaborations with other workers) that occur in a first time window prior to the time of the accident scenario and in a second time window after the time of the accident scenario. Respective spans of the first time window and the second time window can be predefined, configured according to a severity level of the accident scenario, and/or the like. Events that are temporally adjacent to an accident scenario can occur within a time block or time window in which the accident scenario occurred. For example, temporally adjacent events include events that occurred in the same hour as the accident scenario (e.g., events between 2:00 pm and 3:00 pm if the scenario also occurred between 2:00 pm and 3:00 pm), events that occurred in a same worker shift as the accident scenario (e.g., events between 12 pm and 5:00 pm if the scenario occurred during an afternoon shift defined between 12 pm and 5:00 pm), and/or the like.

In embodiments, the established geofencing described herein enables the smart radio 224*a* to receive alerts transmitted by the cloud computing system 220. The alerts are transmitted only to the apparatuses worn by workers having a risk metric above a threshold in this example. Based on locational records of the apparatuses connected to the local network 204, particular movable structures within the refinery may be moved such that a layout is configured to reduce the risk metric for workers in the refinery (e.g., where the cloud computing system 220 detects that employees are habitually forced to take longer walk paths in order to get around an obstructing barrier or structure). In embodiments, the ML system 2200 is used to configure the layout to reduce the risk metric based on features extracted from coordinates of the geofencing, stored risk metrics, the locational records of the apparatuses connected to the local network 204, locations of the movable structures, or a combination thereof.

The cloud computing system 220 hosts the software functions to track operations, interactions, collaborations, and repair metrics (which are saved on one or more databases in the cloud) to determine performance metrics and time spent at different tasks and with different equipment, generate work experience profiles of frontline workers based on interfacing between software suites of the cloud computing system 220 and the smart radio apparatuses 224, 232, smart cameras 228, 236, smart phone 244. The cloud computing system 200 is, in embodiments, configured by an administrating organization to enable workers to send and receive data to and from their smart devices. For example, functionality desired to create an interplay between the smart radios and other devices with software on the cloud computing system 220 is configured on the cloud by an organization interested in monitoring employees, transmitting alerts to these employees based on determinations made by a local server or the cloud computing system 220. Amazon Web Services (AWS), Microsoft Azure, and Google Cloud are widely used examples of a cloud platform, but others could be used instead.

Tracking of interactions, collaborations, and repair metrics is implemented in, for example, Scheduling Systems (SS), Field Data Management (FDS) systems, and/or Enterprise Resource Planning (ERP) software systems that are used to track and plan for the use of facility equipment and other resources. Manufacturing Management System (MMS) software is used to manage the production and logistics processes in manufacturing industries (e.g., for the purpose of reducing waste, improving maintenance processes and timing, etc.) Risk Based Inspection (RBI) software assists the facility using optimizing maintenance business processes to examine equipment and/or structures, and track interactions, collaborations, and repair metrics prior to and after a breakdown in equipment, detection of manufacturing failures, or detection of operational hazards (e.g., detection of gas leaks in the facility). The amount of time each worker logs at an interaction, collaboration, or other machine-defined activity with respect to different locations and different types of equipment is collected and used to update an "experience profile" of the worker on the cloud computing system 220 in real-time. The repair metric and engagement metric for each worker with respect to different locations and different types of equipment is collected and used to update the experience profile of the worker on the cloud computing system 220 in real-time.

Experience Profile Features

Figure 2B:
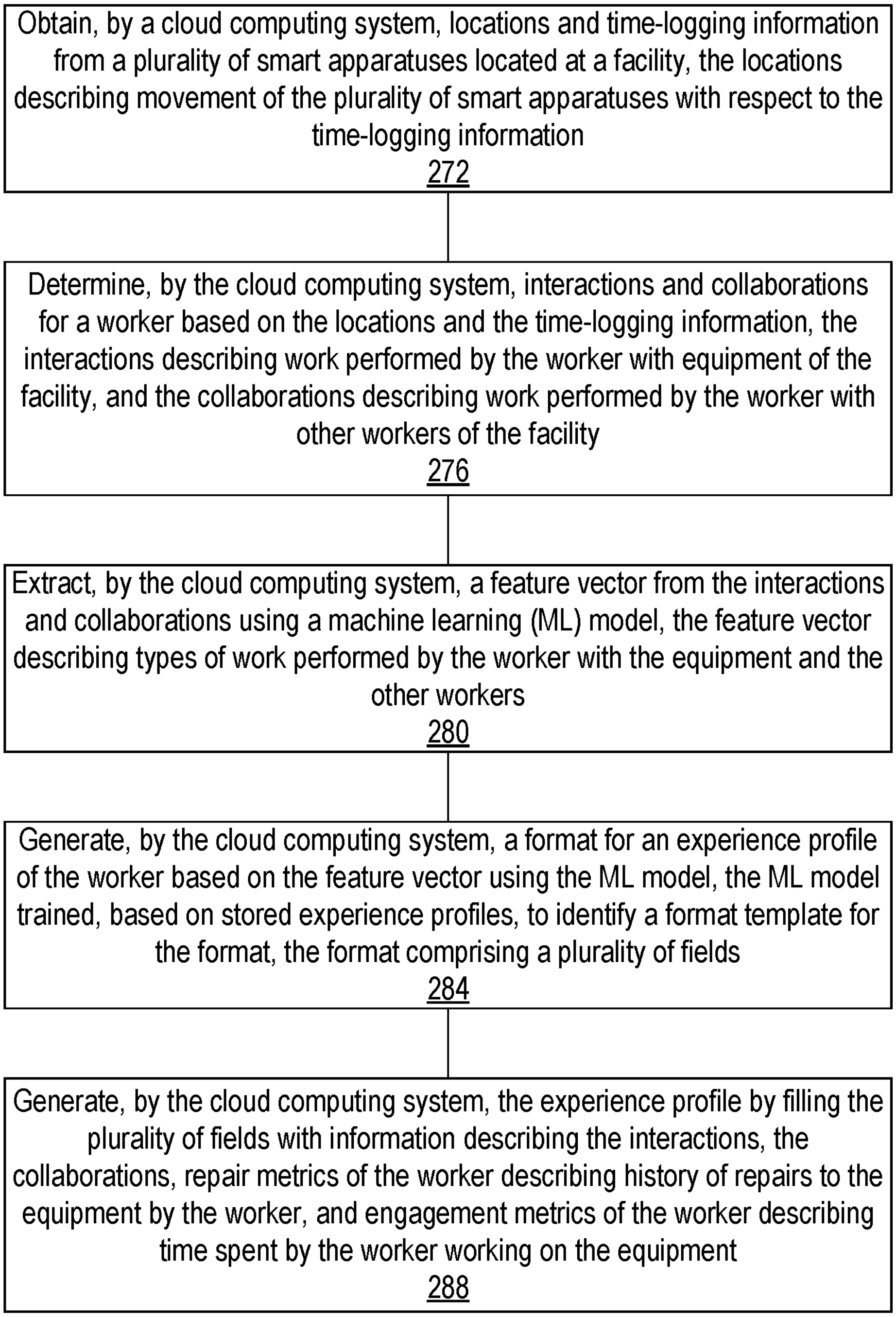
FIG. 2B is a flow diagram illustrating an example process for generating a work experience profile using apparatuses and communication networks for device tracking and geofencing, in accordance with one or more embodiments.

FIG. 2B is a flow diagram illustrating an example process for generating a work experience profile using apparatuses 100, 242*a*, 242*b*, and communication networks 204, 208 for device tracking and geofencing, in accordance with one or more embodiments. The apparatus 100 is illustrated and described in more detail with reference to FIG. 1. The smart radios 224 and local networks 204, 208 are illustrated and described in more detail with reference to FIG. 2A. In embodiments, the process of FIG. 2B is performed by the cloud computing system 220 illustrated and described in more detail with reference to FIG. 2A. In embodiments, the process of FIG. 2A is performed by a computer system, for example, the example computer system 2300 illustrated and described in more detail with reference to FIG. 23. Particular entities, for example, the smart radios 224 or the local network 204, perform some or all of the steps of the process in embodiments. Likewise, embodiments can include different and/or additional steps, or perform the steps in different orders.

The experience profile that is automatically generated and updated by the cloud computing system 220 in real-time includes multiple profile layers that store a record of work history of the worker. In embodiments, an HR employee record is created that lists what each worker was doing during a particular shift, at a particular location, and at a particular facility to build an evidence profile to be used in accident situations. For example, the cloud computing system 220 automatically generates or builds an evidentiary data log for an accident event, and said log can be used for enhancing accident reporting, streamlining accident investigation, supporting subjective human statements, and the like. A portion of the data in the experience profile can follow a worker when they change employment. A portion of the data remains with the employer.

In step 272, the cloud computing system 220 obtains locations and time logging information from multiple smart apparatuses (e.g., smart radios 224) located at a facility. An example facility 300 is illustrated and described in more detail with reference to FIG. 3. The locations describe movement of the multiple smart apparatuses with respect to the time logging information. For example, the cloud computing system 220 track of shifts, types of equipment, and locations worked by each worker, and uses the information to develop the experience profile automatically for the worker, including formatting services. When the worker joins an employer or otherwise signs up for the service, relevant personal information is obtained by the cloud computing system 220 to establish payroll and other known employment particulars. The worker uses a smart radio 224*a* to engage with the cloud computing system 220 and works shifts for different positions. In embodiments, the cloud computing system 220 performs incident mapping based on the locations, time-logging information, shifts, types of equipment, etc. For example, the cloud computing system 220 determines where the worker was with respect to an accident when the accident occurred, and a timeline of the worker's locations before and after the accident. The incident mapping and the timeline is used to augment the risk metric described herein. In particular, the cloud computing system 220 determines worker events that are temporally adjacent to the accident, or occurring immediately before or after the accident, occurring within a pre-defined or configured time window of the accident, and/or the like.

In step 276, the cloud computing system 220 determines interactions and collaborations for a worker based on the locations and the time logging information. Interactions and collaborations are described in more detail with reference to FIG. 2A. The interactions describe work performed by the worker with equipment of the facility (e.g., lathes, lifts, crane, etc.) The collaborations describe work performed by the worker with other workers of the facility. The cloud computing system 220 tracks the shifts worked, the amount of time spent with different equipment, interactions, collaborations, the relevant skills with respect to those shifts, etc. In some embodiments, the cloud computing system 220 tracks and stores the interactions and collaborations. In an example, the cloud computing system 220 stores a window of interactions and collaborations determined or detected, for example, in the last month, the last week, the last day, or the last hour. The cloud computing system 220 can refer to stored interactions and collaborations when later generating profiles related to a worker, for example, an experience profile or an accident report/log. In some embodiments, the cloud computing system 220 determines past interactions and collaborations (e.g., by command in response an occurrence of an accident event) at certain past timepoints based on the locations and time logging information being stored.

The cloud computing system 220 generates a format for the experience profile of the worker based on the interactions and collaborations. The cloud computing system 220 generates the format by comparing the interactions and collaborations with respect to types of work performed by the worker with the equipment and the other workers. In an example, the cloud computing system 220 analyzes machine observations, such as location tracing of a smart radio a worker is carrying over a specific period of time cross-referenced with known locations of equipment.

In another example, the cloud computing system 220 analyzes contemporaneous video data that indicates equipment location. The machine observations used to denote interactions and collaborations are described in more detail with reference to FIG. 2A, for example, a start time, a duration of the activity, an end time, identities of the workers performing the activity, identity of the equipment(s) used by the workers, or a location of the activity.

The cloud computing system 220 assembles the information collected and identifies a format for the experience profile. The format is based on the information collected. Where a given worker has worked positions/locations with many different employers (as measured by threshold values), the format focuses on the time spent at the different types of work as opposed to individual employment. Where a worker has spent most of their time at a few specialized jobs (e.g., welding), the experience profile format is tailored toward employment that is related to that skill and deemphasizes unrelated employment (e.g., where the worker is a welder, time spent as a truck driver is not particularly relevant).

Where a given worker has worked on many (as measured by thresholds) shifts repeatedly with a given type of equipment, the experience profile format focuses on the worker's relationship with the given equipment. Based on the automated analysis, the system procedurally generates the experience profile content (e.g., descriptions of skills or attributes). The cloud computing system 220 includes multiple format templates that focus on emphasizing parts of the worker's experience profile or target jobs. Additional format templates are added based on evolving styles in various industries.

In embodiments, template styles are identified via the ML system 2200. In step 280, the cloud computing system 220 extracts a feature vector from the interactions and collaborations using an ML model. Example measures that the cloud computing system 220 uses to denote interactions by are described in more detail with reference to FIG. 2A, for example, a start time, a duration of the activity, an end time, identities of the workers performing the activity, identity of the equipment(s) used by the workers, or a location of the activity. The feature vector would be extracted from the measures. An example ML system 2200, example feature vector 2212, and an example ML model 2216 are illustrated and described in more detail with reference to FIG. 22. The feature vector describes types of work performed by the worker with the equipment and the other workers.

In step 284, the cloud computing system generates a format for an experience profile of the worker based on the feature vector using the ML model. The ML model is trained, based on stored experience profiles, to identify a format template for the format. The format includes multiple fields. To train the ML system 2200, information from stored experience profiles is input into the ML system 2200. The ML system 2200 interprets what appears on those stored experience profiles and correlates content of the worker's experience profile (e.g., time logged at particular experiences) to structure (e.g., how the experience profile is written). The ML system 2200 uses the worker's experience profile as compared to the data structures based on the training data to identify what elements of the worker's experience profile are the most relevant.

Similarly, the ML system 2200 identifies what information tends to not appear together and filters lower incidence data out. For example, when a worker has many (as measured by thresholds) verified or confirmed hours working with particular equipment, then experience at unskilled labor will tend not to appear on the worker's experience profile. In the example, the "lower incidence" data is the experience relating to unskilled work; however, the lower incidence varies based on the training data in the ML system 2200. The relevant experience data that is not filtered out is based on the experience profile content that tends to appear together across the training set. The population of the training set is configured to be biased toward particular traits (e.g., hours spent using complex equipment) by including more instances of experience profiles having complex equipment listed than non-skilled work.

For example, the listed work experience in the experience profile includes 350 hours spent working on an assembly system for injection valves or 700 hours spent driving an industrial lift jack system having hydraulic rams with a capacity of 1000 tons. Such work experience is collated by the ML system 2200 from location data of the worker, sensor data of the equipment, shift data, etc. In embodiments, especially embodiments relying upon the ML system 2200, a specific format template is not used. Rather, the ML system 2200 identifies a path in an artificial neural network where the generated experience profile content adheres to certain traits or rules that are template-like in nature according to that path of the neural network.

In step 288, the cloud computing system 220 generates the experience profile by filling the multiple fields of the format with information describing the interactions, the collaborations, repair metrics of the worker describing history of repairs to the equipment by the worker, and engagement metrics of the worker describing time spent by the worker working on the equipment. Repair metrics and engagement metrics are described in more detail with reference to FIG. 2A. The cloud computing system 220 automatically fills in fields/page space of the experience profile format identified. The data filled into the field space of the experience profile includes the specific number of hours that a worker has spent working with a particular type of equipment (e.g., 200 hours spent driving forklifts, 150 hours spent operating a lathe, etc.) Details used to fill in the format fields favor more recent experiences, interactions, and collaborations, or employment having stronger repair metrics and engagement metrics. In embodiments, the experience profile content is generated via procedural rules and predefined format template structures.

In embodiments, the cloud computing system 220 exports or publishes the experience profile to a user profile of a social or professional networking platform (e.g., such as LinkedIn™, Monster™, any other suitable social media or proprietary website, or a combination thereof). In embodiments, the cloud computing system 220 exports the experience profile in the form of a recommendation letter or reference package to past or prospective employers. The experience data enables a given worker to prove that they have a certain amount of experience with a given equipment platform.

In some embodiments, the cloud computing system 220 additionally, or alternatively, builds an evidentiary data log for an accident event from the interactions and collaborations detected in step 276. According to an example method, the cloud computing system 220 automatically builds an evidentiary data log for an accident event, in response to a detection of an accident event based on sensor data collected by the cloud computing system from sensor devices located throughout the facility. The evidentiary data log identifies, for the worker, at least one first worker-equipment interaction or first worker-worker collaboration that occurred temporally adjacent to the accident event. In some examples, the cloud computing system can adjust a risk metric of the worker based on the interactions and the collaborations. In some embodiments, the evidentiary data log includes a timeline of the tracked locations of the worker (or the smart radio associated with the worker) before and after the accident event. In some embodiments, the cloud computing system 220 provides a dynamic visualization of the timeline of tracked locations according to embodiments described herein.

Data pertaining to a given worker is organized into multiple tiers. In some embodiments, the tiers are structured into an individual basis, as connected to the contract they are working, and as connected to their employer. Each of those tiers operates identity management within the cloud computing system 220. When a worker ceases to work for an employer or cease to work on a contract, their individual data (e.g., their training, what they did, risk metrics determined by the cloud computing system for the worker) continues to follow them through the system to the next employer/contract they are attached to. Data is conserved in escalating tiers such that individual data is stored to the contract level and stored to the employer level.

Conversely, data pertaining to the contract (e.g., performance data, hours worked, accident mapping) stays with the contract tier. For example, the cloud computing system associates portions of an evidentiary data log for an accident with different persistence levels that control whether the portions of the evidentiary data log remain associated with the worker subsequent to the worker no longer being associated with the facility or a current employer. With respect to examples in which accident mapping stays with the contract tier, certain portions of an evidentiary data log can be associated with a persistence level to cause the certain portions to be disassociated from the worker subsequent to the worker no longer being associated with the current employer. Similarly, data pertaining to the employer tier (e.g., the same as contract data across multiple contracts) remains with the employer. For example, the cloud computing system enables access to the certain portions of an evidentiary data log by current users associated with the facility and the employer, even after the worker is no longer associated with the employer.

Users are part of a global directory of login profiles to the smart radios (or other interface platforms). Regardless of which employer/facility/project/other group delineation the user is associated with, the user logs in to the smart radio using the same login identity. The global directory enables traceability of otherwise transient workers. The global directory improves efficiency or emergency response by enabling quicker decision making and also allowing different permissions in different facilities for the same user. Each user has a seamless experience in multiple facilities and need not worry about multiple passwords per group delineation.

FIG. 3 is a drawing illustrating an example facility 300 using apparatuses and communication networks for device tracking and geofencing, in accordance with one or more embodiments. For example, the facility 300 is a refinery, a manufacturing facility, a construction site, etc. An example apparatus 100 is illustrated and described in more detail with reference to FIG. 1. The communication technology shown by FIG. 3 is implemented using components of the example computer system 2300 illustrated and described in more detail with reference to FIG. 23.

Multiple differently and strategically placed wireless antennas 374 are used to receive signals from an Internet source (e.g., a fiber backhaul at the facility), or a mobile system (e.g., a truck 302). The wireless antennas 374 is similar to or the same as the wireless antenna 174 illustrated and described in more detail with reference to FIG. 1. The truck 302, in embodiments, includes the edge kit 172 illustrated and described in more detail with reference to FIG. 1. The strategically placed wireless antennas 374 repeat the signals received and sent from the edge kit 172 such that a private cellular network (e.g., the local network 204) is made available to multiple workers 306. Each worker carries or wears a cellular-enabled smart radio. The smart radio is implemented using the apparatus 100 illustrated and described in more detail with reference to FIG. 1. As described in more detail with reference to FIG. 1 and FIG. 2A, a position of the smart radio is continually tracked during a work shift.

In implementations, a stationary, temporary, or permanently installed cellular (e.g., LTE or 5G) source (e.g., edge kit 172) is used that obtains network access through a fiber or cable backhaul. In embodiments, a satellite or other Internet source is embodied into hand-carried or other mobile systems (e.g., a bag, box, or other portable arrangement). A backhaul arrangement such as the cellular or other Internet source provides access to the cloud computing system via the private network (e.g., local network 204). FIG. 3 shows that multiple wireless antennas 374 are installed at various locations throughout the facility. Where the edge kit 172 is located at a location near a facility fiber backhaul, the communication system in the facility 300 uses multiple omnidirectional Multi-Band Outdoor (MBO) antennas as shown. Where the Internet source is instead, located near an edge of the facility 300, as is often the case, the communication system uses one or more directional wireless antennas to improve the coverage in terms of bandwidth. Alternatively, where the edge kit, if in a mobile vehicle, for example, truck 302, the antennas' directional configuration would be picked depending on whether the vehicle would ultimately be located at a central or boundary location.

In embodiments where a backhaul arrangement is installed at the facility 300, the edge kit 172 is directly connected to an existing fiber router, cable router, or any other source of Internet at the facility. In embodiments, the wireless antennas 374 are deployed at a location in which the apparatus 100 (e.g., a smart radio) is to be used. For example, the wireless antennas 374 are omnidirectional, directional, or semi-directional depending on the intended coverage area. In embodiments, the wireless antennas 374 support a local cellular network (e.g., the local network 204 illustrated and described in more detail with reference to FIG. 2A). In embodiments, the local network is a private LTE network (e.g., based on 4G or 5G). In more specific embodiments, the network is a Band 48 Citizen's Broadband Radio Service (CBRS) local network. The frequency range for Band 48 extends from 3550 MHz to 3700 MHz and is executed using Time Division Duplexing (TDD) as the duplex mode. The private LTE wireless communication device 105 (illustrated and described in more detail with reference to FIG. 1) is configured to operate in the private network created, for example, configured to accommodate Band 48 CBRS in the frequency range for Band 48 (again, from 3550 MHz to 3700 MHz) and accommodates TDD. Thus, channels within the preferred range are used for different types of communications between the cloud and the local network.

FIG. 4 is a drawing illustrating example apparatuses for device tracking and geofencing, in accordance with one or more embodiments. The apparatuses shown by FIG. 4 are smart radios. The smart radios are implemented using components of the example computer system 2300 illustrated and described in more detail with reference to FIG. 23.

The features of the smart radio include an easy to grab volume control dial that can be used to, with one hand, increase or decrease the volume of the device as well as a push-to-talk button 420. The volume control controls the loudness of the smart radio (e.g., the speaker of the audio device 146 illustrated and described in more detail with reference to FIG. 4), while the push-to-talk button 420, when depressed, enables voice transmissions/messages to be sent to other smart device (e.g., the smart camera 228 illustrated and described in more detail with reference to FIG. 2A). Electronic circuits in the controller 110 enable signals from the push-to-talk button 420 and the volume control to result in the desired functions. The controller 110 is illustrated and described in more detail with reference to FIG. 1.

FIG. 5 is a drawing illustrating example apparatuses for device tracking and geofencing, in accordance with one or more embodiments. A user-input system is implemented on the smart radios (illustrated in more detail in FIG. 4) for receiving user inputs and transmitting the user inputs to controller 110. The controller 110 is illustrated and described in more detail with reference to FIG. 1. User inputs include any user-input means including but not limited to touch inputs, audible commands, a keyboard, etc. In the embodiments of the smart radio depicted in FIG. 5, a user-input device includes multiple navigational tools that are operable by the finger/thumb of a worker. As depicted in FIG. 5, the navigational tools include a down navigational button 512, an up navigational button 508, a selection button 516, and a back/home button 504. In some embodiments, the down and up navigational buttons 508, 512 are constructed in a concave arrangement to enable gloved hands to more readily identify the bounds of each button.

To enable operation of the buttons and other navigational means of the smart radio by a worker wearing work gloves, the buttons described herein click at a predetermined force/psi. The predetermined force/psi is selected such that a heavy touch by a gloved finger or hand will not result in multiple clicks and that a touch will not depress multiple buttons. In some embodiments, force- or pressure-sensitive operation of the buttons is implemented using hardware features included in the user-input system. For example, the user-input system includes one or more of springs, switches, rubber rings or drums, elastic resistance, and/or the like that cause a button to not fully depress and provide resultant input to a controller until at least the predetermined force or pressure is used. In some embodiments, the user-input system includes sensing devices, such as force or pressure sensors, that provide force or pressure measurements based on which inputs via the buttons are provided to a controller or not (e.g., via an operational amplifier configured as a comparator, via operating system level software, and/or the like).

The down navigational button 512 and up navigational button 508 enable scrolling up or down through displayed content, and the outwardly extending selection button 516 is depressible to select menu options. The back/home button 504 enables a worker to back out of selected options and ultimately to return to a home screen. The other handheld devices (e.g., smart camera 228 illustrated and described in more detail with reference to FIG. 2A) will use other kinds of arrangements (e.g., a touchscreen, or other buttons) without departing from the scope hereof. An example text messaging display 240 is illustrated in FIG. 2A.

In embodiments, the buttons shown by FIG. 5 or other user-input means of the smart radio disclosed include capacitive sensors to disable the buttons and other input means when pressed by or in contact with bare human skin. The benefits of the embodiments include prevention of use of the smart radio or other smart apparatus by a worker who is not suitably gloved for work. For example, for worksite safety, the back/home button 504 is rendered inoperable by a Touch ID sensor when depressed by a bare hand or finger. In particular, the capacitive sensors measure a capacitance of an object in contact with a given pressure-sensitive button and disables the input of the given pressure-sensitive button if the measured capacitance is indicative of bare, ungloved human skin.

Charging Station Features

Figure 6:
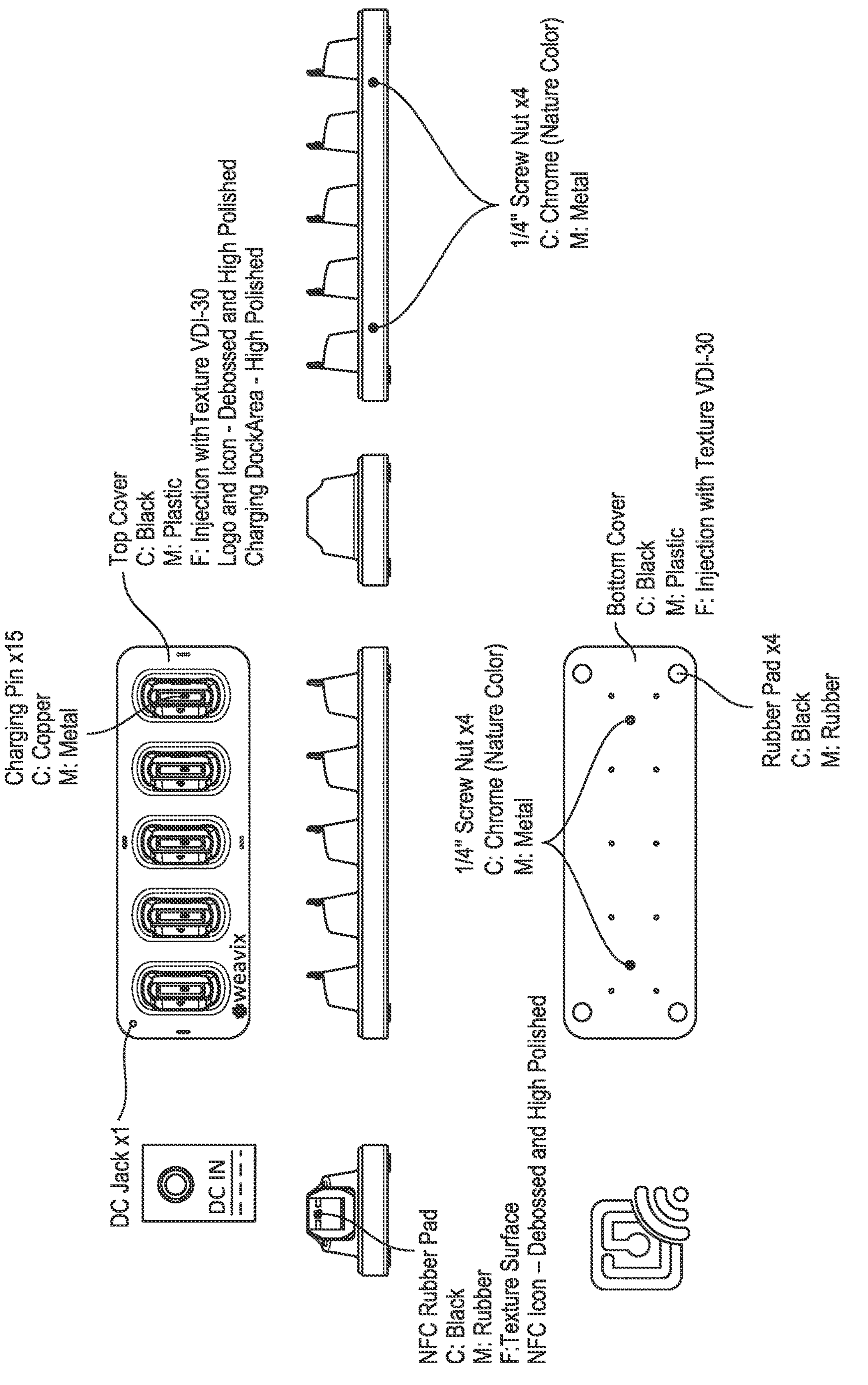
FIG. 6 is a drawing illustrating example charging cradles for apparatuses implementing device tracking and geofencing, in accordance with one or more embodiments.

FIG. 6 is a drawing illustrating example charging cradles for apparatuses implementing device tracking and geofencing, in accordance with one or more embodiments. An example charging cradle 800 is shown by FIG. 8. For example, the smart radio depicted by FIG. 4 is removed out of a charging cradle by a worker clocking in at a facility and placed in the charging cradle by the worker clocking out of the facility. An example facility 300 is illustrated and described in more detail with reference to FIG. 3. The charging cradles are arranged in arrays and mounted on a surface at an entry or exit of the facility. Multiple smart radios are placeable in an array of charging cradles as shown by FIG. 7. An example two-dimensional array of charging cradles 900 is shown by FIG. 9.

In embodiments, a charging cradle provides a simplified way to plug-in the smart radio disclosed herein hot, cold, or standby. In a cold dock or undock, a worker shuts down or powers off the smart radio before docking/undocking. In a hot dock or undock, the smart radio remains running when docked/undocked. In standby docking or undocking, the smart radio is docked/undocked while powered on but requires that it be placed into a sleep mode prior to docking/undocking.

FIG. 7 is a drawing illustrating example charging cradles for apparatuses implementing device tracking and geofencing, in accordance with one or more embodiments. The charging cradles are shown, each having a smart radio inserted into the charging cradle. Each smart radio inventories an NFC tag or card embedded in or otherwise located within a respective charging cradle. An example charging cradle 800 is shown by FIG. 8. Examples of an NFC rubber pad 804 and an NFC tag 808 located on charging cradles are also depicted in more detail in FIG. 8. For example, the smart radio connects to the NFC tag 804, and the particular NFC tag 804 enables the smart radio to communicate its location to the cloud computing system 220 based on the known location of the particular NFC tag 808 of the particular charging cradle. The NFC technology used by the smart radios is described in more detail with reference to FIG. 1. The cloud computing system 220 is described in more detail with reference to FIG. 1. An example two-dimensional array of charging cradles 900 is shown by FIG. 9.

FIG. 8 is a drawing illustrating example charging cradles for apparatuses implementing device tracking and geofencing, in accordance with one or more embodiments. In embodiments, the smart radio illustrated and described in more detail with reference to FIG. 4 includes a charging port, which enables it to be received into a charging cradle 800.

An example NFC rubber pad 804 and NFC tag 808 located on charging cradles are depicted in FIG. 8.

The smart radio connects to only one NFC tag at a time, reducing accidental transactions. In embodiments, encrypted data exchange happens between the NFC tag 808 and the smart radio. The NFC tag 808 and the smart radio connect instantly for data exchange when brought close together or when the smart radio is placed in the charging cradle. The smart radio has an NFC module that connects wirelessly and without an external power source. The nearby connection is limited to one smart radio and protects the data exchange from remote jacking by a malicious entity.

FIG. 9 is a drawing illustrating example charging cradles for apparatuses implementing device tracking and geofencing, in accordance with one or more embodiments. An example charging cradle 800 is shown by FIG. 8. The charging cradles shown in FIG. 7 link together in a particular manner using magnets embedded in the base or sides of the cradles, forming a two-dimensional array (as shown by FIG. 9). In embodiments, the charging cradles are mounted (e.g., sideways) to a wall of the facility, or (e.g., facing up) on a horizontal surface of the facility. An example facility 300 is illustrated and described in more detail with reference to FIG. 3.

Figure 10:
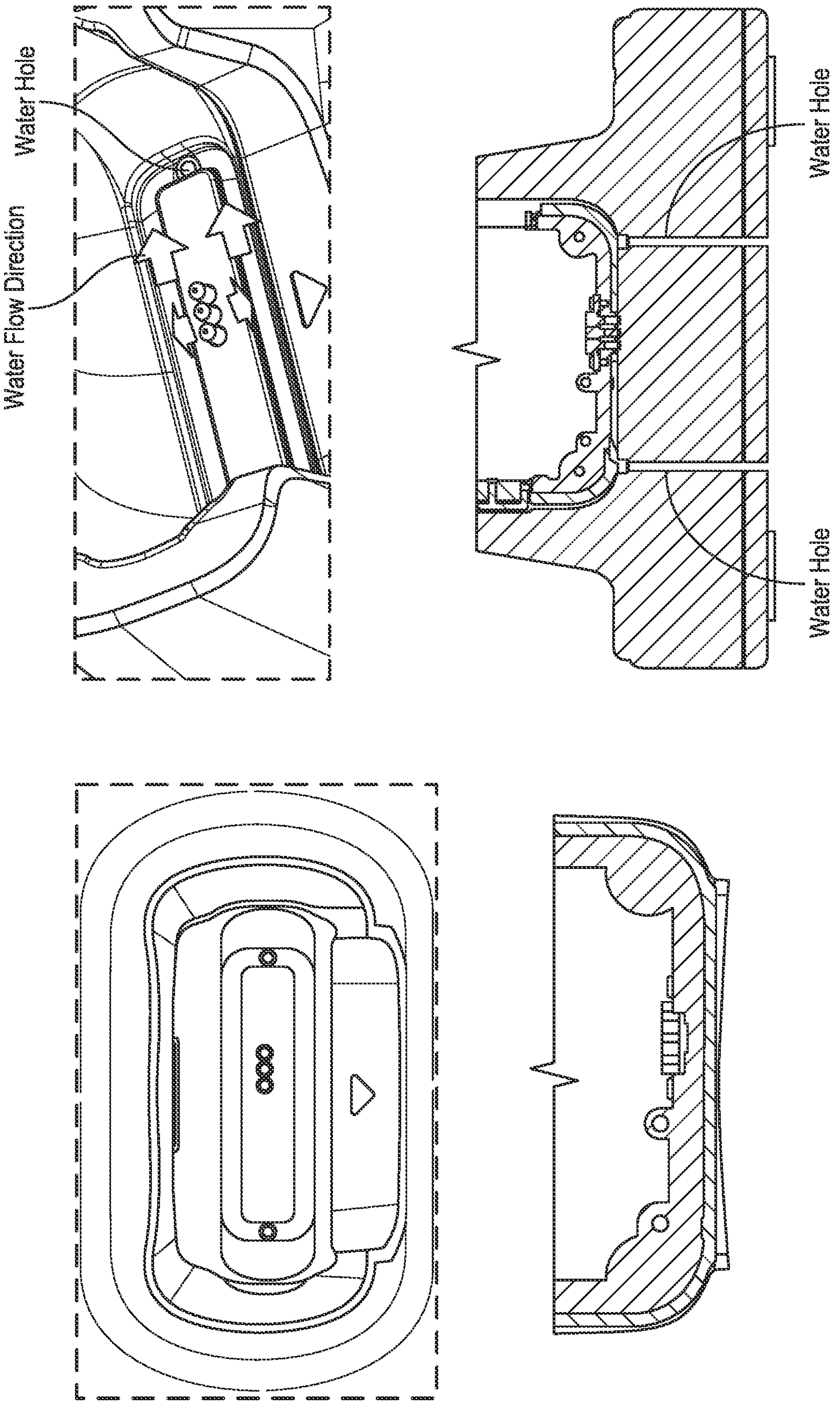
FIG. 10 is a drawing illustrating example drainage holes for charging cradles for apparatuses implementing device tracking and geofencing, in accordance with one or more embodiments.

FIG. 10 is a drawing illustrating example drainage holes for charging cradles for apparatuses implementing device tracking and geofencing, in accordance with one or more embodiments. An example charging cradle 800 is shown by FIG. 8. Each charging cradle include a drainage hole for letting water or other liquids run off wet devices that are placed in the charging cradle. The drainage holes are shaped and otherwise physically configured to enable the water runoff whether the charging cradle is positioned facing up (e.g., when the charging cradle is mounted on a horizontal surface) or facing sideways (e.g., when wall mounted).

Location-Based Features

As described herein, smart radios are configured with location estimating capabilities and are used within a facility or worksite for which geofences are defined. A geofence refers to a virtual perimeter for a real-world geographic area, such as a portion of a facility or worksite. A smart radio includes location-aware devices (e.g., position tracking component 125, position estimating component 123) that inform of the location of the smart radio at various times. Embodiments described herein relate to location-based features for smart radios or smart apparatuses. Location-based features described herein use location data for smart radios to provide improved functionality. In some embodiments, a location of a smart radio (e.g., a position estimate) is assumed to be representative of a location of a worker using or associated with the smart radio. As such, embodiments described herein apply location data for smart radios to perform various functions for workers of a facility or worksite.

Responder-Targeted Communications

Some example scenarios that require radio communication between workers are area-specific, or relevant to a given area of a facility. As one example, a local hazardous event in a given area of a facility is not hazardous to other workers in other areas that are remote. As another example, a downed (e.g., injured, disabled) worker in a given area of a facility requires immediate assistance and that attention is unlikely to be provided from other workers in other areas. The use of geofences to define various areas within a facility or worksite provides a means for defining area-specificity of various scenarios and events.

Radio communication with workers located in a given area is needed to handle area-specific scenarios relevant to the given area. In some examples, the communication is needed at least to transmit alerts to notify the workers of the area-specific scenario and to convey instructions to handle and/or remedy the scenario.

Figure 11:
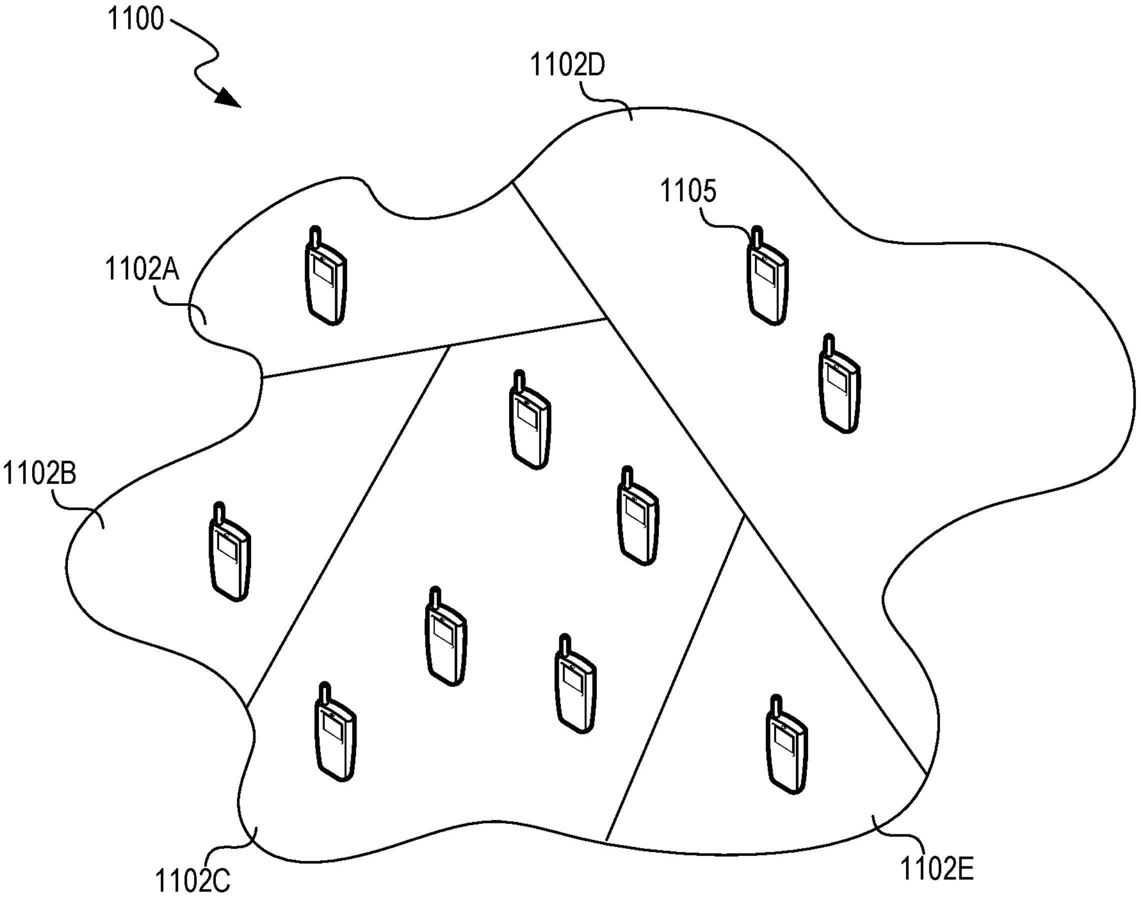
FIG. 11 is a diagram illustrating geofencing and geofenced-based communication within a facility or worksite, in accordance with one or more embodiments.

According to some embodiments, locations of smart radios are monitored (e.g., by cloud computing system 220) such that at a point in time, each smart radio located in a specific geofenced area is identified. FIG. 11 illustrates an example of a worksite 1100 that includes a plurality of geofenced areas 1102, with smart radios 1105 being located within the geofenced areas 1102.

In some embodiments, an alert, notification, communication, and/or the like is transmitted to each smart radio 1105 that is located within a geofenced area 1102 (e.g., 1102C) responsive to a selection or indication of the geofenced area 1102. A smart radio 1105, an administrator smart radio (e.g., a smart radio assigned to an administrator), or the cloud computing system 220 is configured to enable user selection of one of the plurality of geofenced areas 1102 (e.g., 1002C). For example, a map display of the worksite 1100 and the plurality of geofenced areas 1102 is provided. With the user selection of a geofenced area 1102 and a location for each smart radio 1105, a set of smart radios 1105 located within the geofenced area 1102 is identified. An alert, notification, communication, and/or the like is then transmitted to the identified smart radios 1105.

However, in various examples, technical challenges arise with mass communication with each worker located in a given area. That is, despite an area-specific scenario potentially being relevant to each worker, communication with all workers located in the area requires a significant amount of resources and time. For example, in the illustrated example of FIG. 11, the geofenced area 1102C includes five smart radios. Inefficiencies and delays in response time arise when communication with all five smart radios is attempted. Further, if continued communication is needed following an initial alert or notification, not all workers are guaranteed to have seen and read the initial alert or notification. Thus, in some examples, repetition of information redundant with an initial communication is needed for workers who have not actually seen the initial communication. Additionally, with different geofenced areas 1102 having a different number of smart radios 1105, area-wide communication for different areas becomes inconsistent and potentially unreliable.

Accordingly, embodiments described herein provide response-ordered communication with local smart radios to address at least these identified technical challenges. In particular, example embodiments establish communications with a selected subset of smart radios 1105 located within a geofenced area 1102C. The subset of smart radios 1105 is selected based on a response time to an initial communication transmitted to each of a superset of smart radios within the geofenced area 1102C.

As such, example embodiments enable efficient and rapid handling of area-specific scenarios due to the selection of smart radios based on response time. Smart radios with responsive behavior are selected, which results in continued communication with workers who are adequately informed and prepared to handle the area-specific scenario. This results in communication resources not being spent on non-selected smart radios whose workers are delayed in being informed of the area-specific scenario (e.g., workers that are busy and occupied with other matters).

An illustrative non-limiting example is described with reference to FIG. 11, and the geofenced area 1102C with five smart radios. As discussed above, inefficient operational delays occur with communicating via each of the five smart radios. For example, a given worker is occupied and distracted by another task and fails to become aware of an emergency that is alerted via a smart radio. As such, the given worker is not adequately prepared or briefed for continued communication to allow for responding to and handling the emergency. Establishing the continued communications with the otherwise occupied worker would result in inefficiencies in the response and handling of the emergency.

Accordingly, a subset of the five smart radios are selected based on response time to an initial communication transmitted to each of the five smart radios. For example, the first two smart radios to respond by performing an activity related to the initial communication are selected. As another example, smart radios that perform an activity within a threshold time of the initial communication are selected.

That is, response time refers to a time that passes before a smart radio performs an activity related to and/or in response to an initial communication. In some embodiments, response time is measured as a time spanning between when the initial communication is received by the smart radio and when an activity is detected at the smart radio.

In some embodiments, the activities at a smart radio that control response time are related to user interactions by a worker with the smart radio. For example, response time is determined based on when a worker reads the initial communication. In an example, the reading of the initial communication is detected based on the initial communication being displayed for a threshold amount of time. In another example, the reading of the initial communication is detected based on a display of the initial communication being initiated (e.g., responsive to a user interaction with a displayed notification of the initial communication). In yet another example, the reading of the initial communication is detected based on a threshold degree of movement or jostling that is measured via a gyroscope, an accelerometer, and/or similar sensors on the smart radio.

As another example, response time is determined based on a response transmitted by the smart radio. For example, the response time is determined based on the smart radio transmitting an acknowledgement, a receipt, and/or the like back to an administrator smart radio from which the initial communication was transmitted. In an example, the acknowledgement, receipt, and/or the like is transmitted in response to a command from the worker. As such, the acknowledgement, receipt, and/or the like is representative of the initial communication reaching the worker.

These and other example activities are detected and used to determine response times for different smart radios. As discussed, smart radios with short response times (e.g., compared to other smart radios, within a threshold time) are selected, and further communication is established with the selected smart radios. For example, a communication channel (e.g., a video call, an audio call, a text conversation or thread) is initiated between the administrator smart radio and the selected smart radio(s).

Accordingly, an administrator is able to communicate further details and instructions to worker(s) at the selected smart radio(s) via the initiated communication channel. The worker(s) is likely to have seen the initial communication and have an initial informed awareness of an area-specific scenario. The administrator does not need to repeat information and directly communicate further details or instructions, thus saving critical time needed to handle and respond to scenarios in the facility. As such, technical benefits are provided by establishing communications with a first responder audience selected from a localized population of workers.

Figure 12:
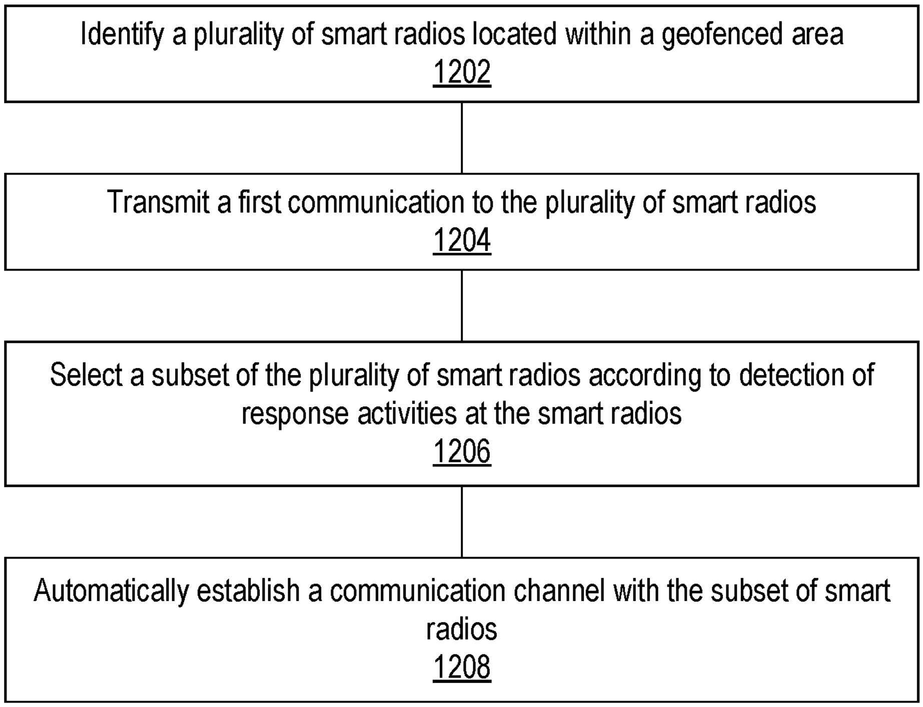
FIG. 12 is a flow diagram illustrating an example process for response-controlled communications for geofenced areas, in accordance with one or more embodiments.

Turning now to FIG. 12, a flow diagram is provided. The flow diagram illustrates an example process for response-controlled communications for geofenced areas. In some examples, the illustrated process is performed to minimize resource usage when communicating with workers in a facility about local scenarios and events. In some embodiments, the illustrated process is performed by a cloud computing system 220 (e.g., shown in FIG. 2A). In some embodiments, the illustrated process is performed by a computer system, for example, the example computer system 2300 illustrated and described in more detail with reference to FIG. 23. Particular entities, for example, the smart radios (e.g., smart radios 1105, smart radios 224), perform some or all of the steps of the process in some embodiments. Likewise, some embodiments include different and/or additional steps, or perform the steps in different orders.

In step 1202, a plurality of smart apparatuses (e.g., smart radios 1105, smart radios 224) located within a geofenced area are identified. In some embodiments, the smart apparatuses are identified based on obtaining location and time logging information from multiple smart apparatuses. Locations of the multiple apparatuses are mapped to a plurality of geofences that define areas within a worksite, such as the example geofenced areas illustrated in FIG. 11.

In some embodiments, step 1202 is performed in response to a selection or an indication of the geofenced area. In an example, a geofenced area relevant to a detected event or scenario is automatically identified and used to identify the plurality of smart apparatuses.

In step 1204, a first communication is transmitted to the plurality of smart apparatuses that are identified as being located within the geofenced area. In some embodiments, the first communication is a text-based alert or notification of an event or scenario that is relevant and specific to the geofenced area. In some embodiments, the first communication is an audio-based and/or video-based message that is broadcast to the plurality of smart apparatuses.

In an example, the first communication is broadcast to workers associated with the plurality of smart apparatuses via local infrastructure located in the geofenced area, such as intercoms, alarms, video screens or billboard-like structures, and/or the like.

In step 1206, a subset of the plurality of smart radios is selected. In some embodiments, the subset of smart radios is selected according to the detection of response activities at the smart radios and according to response times based on the detection of response activities. Accordingly, the subset of smart radios constitutes a first responder audience. The subset of smart radios represents a subset of workers who responded to the initial communication in a manner that satisfies various constraints or thresholds.

For example, the subset of smart radios is selected according to a response time threshold. Smart radios at which a response activity is detected before the response time threshold are selected for the subset. As another example, the smart radios are ordered according to respective times at which response activities are detected. A first number of first radios in the order are selected for the subset.

In some embodiments, additional constraints or thresholds are considered when selecting the subset of smart radios. For example, smart radios are assigned to different workers with different roles, role levels, profiles, and/or the like. Smart radios whose assigned worker satisfies a threshold role level, a role/profile requirement, and/or the like are considered for the selection of the subset. In some embodiments, the additional constraints (e.g., threshold role level, role requirement) are determined based on the relevant event or scenario that prompted the process.

In step 1208, a communication channel with the subset of smart radios is automatically established. In some embodiments, the communication channel is established between the subset of smart radios and the computer system performing the process, such as an administrator computer system. In some embodiments, the communication channel is established between the subset of the smart radios and an administrator smart radio. In some embodiments, the communication channel is established between the smart radios of the subset to enable the local workers to coordinate the handling of and response to the relevant event or scenario. In some embodiments, the communication channel is a video call, an audio call, a text conversation, and/or the like.

In some embodiments, the determined response times used to select the subset of smart radios are added to experience profiles of workers associated with the smart radios. For example, an average response time that a worker takes to read or interact with a communication via a smart radio is stored in an experience profile for the worker.

As such, in some embodiments, selection of smart radios is further based on experience profiles of the workers associated with the smart radios. For example, workers with an average response time less than a threshold are automatically selected for the first responder subset. Use of response time metrics in worker experience profiles conserves some time that would be spent detecting response activities on the smart radios and determining (and ordering) response times.

Smart Radio Location Displays

Embodiments described herein relate to temporally-dynamic visualization of smart radio locations within a worksite. According to example embodiments, a user interface is configured to display a slice or snapshot of smart radio locations, with multiple different slices or snapshots being available for display. Thus, embodiments for temporally-dynamic visualization of smart radio locations enable a user to easily view different locations and arrangements of smart radios over time.

In some embodiments, the user interface is provided via a smart radio (e.g., via a display screen 130 of a smart radio as illustrated and described in relation with FIG. 1). In some embodiments, the user interface is provided via a computer system as in the example computer system 2300 illustrated and described in more detail with reference to FIG. 23.

Figure 13:
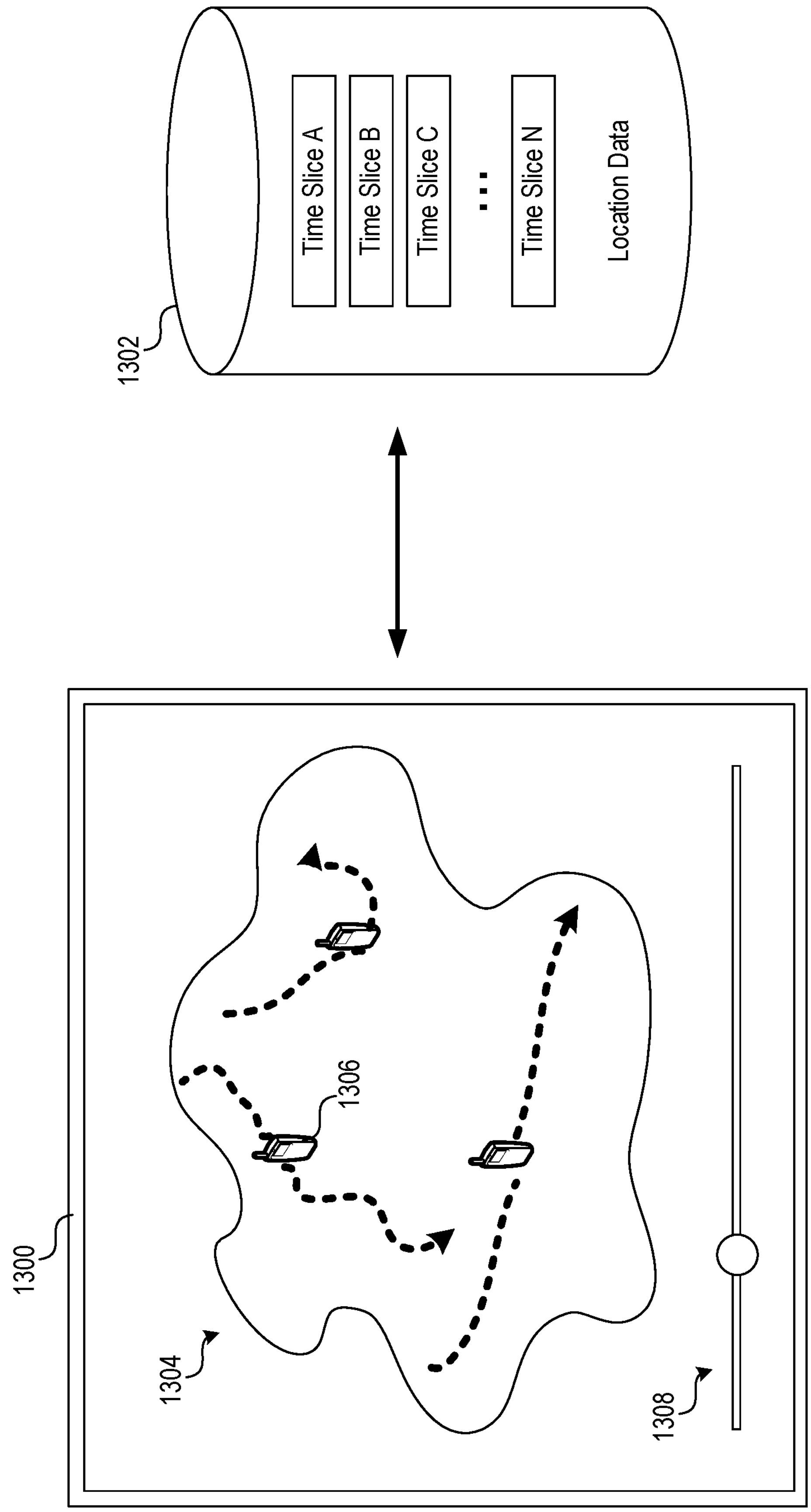
FIG. 13 is a diagram illustrating an example system for visualization and storage of temporally-dynamic smart radio location, in accordance with one or more embodiments.

FIG. 13 illustrates an example system in which a temporally-dynamic visualization of smart radio locations is provided. The example system includes a user interface 1300 in which smart radio locations are displayed and a location database 1302 stores sets of location data that each correspond to a point or slice in time. With the user interface 1300 and the location database 1302, the example system is configured to overcome technical challenges that arise with large volumes of smart radio locations over long periods of time. According to example embodiments, selection of a time slice via the user interface 1300 allows efficient access and retrieval of a corresponding set of location information from multiple sets stored in the location database 1302.

Referring first to the user interface 1300, the example user interface 1300 includes a map portion 1304 that is configured to indicate locations of multiple smart radios. For example, in the map portion 1304, a map layer displays a representation of a worksite or facility within which smart radio locations are indicated.

In some embodiments, the map layer additionally displays geographic areas within the worksite or facility. In some embodiments, the geographic areas within the worksite or facility are geofenced, and the example user interface 1300 is configured to enable selection of geofenced areas displayed in the map portion 1304 for area-specific operations. For example, a user selects a geofenced area displayed in the map portion 1304 to cause an area-wide communication to be transmitted, to establish response-controlled communications within the geofenced area (e.g., via the example process of FIG. 12), and/or the like.

In the map portion 1304, the smart radio locations within the representation of the worksite are indicated via an overlay layer that is displayed over the map layer. The overlay layer includes indicators 1306 that represent locations for multiple smart radios within the worksite or facility. In some examples, the indicators 1306 in the overlay layer are configured to indicate additional information, such as a name or identifier for a worker assigned to a smart radio, an image of the logged-in user, a battery level of the smart radio, and/or the like.

In particular, the indicators 1306 of the overlay layer represent smart radio locations for a given point in time, and the indicators 1306 are generated based on location information that corresponds to a given point in time. The location information used to generate the indicators of smart radio locations is accessed and retrieved from the location database 1302, which stores multiple sets of location information, each corresponding to different points or slices in time.

Thus, according to example embodiments, display of smart radio locations for a given point in time is based on precise and efficient selection of relevant location information from sets of location information stored in the location database 1302. In some embodiments, the location database 1302 stores an index that describes relationships between sets of location information and different points in time.

In some embodiments, the location database 1302 stores sets of location information that each include a corresponding time point identifier (e.g., a timestamp). In some embodiments, each set of location information includes locations (e.g., coordinate values) for each of a plurality of smart radios at a corresponding point in time. For example, the location database 1302 stores a plurality of data objects, with each data object including a time point identifier and a set of location information. In some embodiments, a data object stores a previously generated overlay layer for a corresponding point in time.

As such, the location database 1302 is configured to store location information in a time-wise organization to enable efficient access and retrieval of relevant portions of location information. FIG. 13 illustrates the location database 1302 separately storing a first data object for a first time slice (e.g., Time Slice A), a second data object for a second time slice (e.g., Time Slice B), and so on.

Thus, given an indication of a specific point in time, a relevant data object (e.g., relevant portions of location information) stored in the location database 1302 is identified from a plurality of data objects. In some embodiments, the indication of the specific point in time is based on a user selection that is made through the user interface 1300. In some embodiments, the user interface 1300 includes a time selection portion 1308. For example, in FIG. 13, the time selection portion 1308 includes a slider interface via which the user selects a specific point in time.

In response to a user interaction with the time selection portion 1308 of the user interface 1300, a query or request is sent to the location database 1302 to cause the retrieval of the relevant data object. Using the time selection portion 1308 and the location database 1302 storing separate data objects for different time points/slices, a user is able to cause any given snapshot of smart radio locations to be non-chronologically or non-sequentially displayed.

A display of different snapshots of smart radio locations is shown in FIG. 13 shown by dotted paths. In some examples, dynamic user interaction with the time selection portion 1308 causes the appearance of the indicators 1306 traveling along the dotted paths. While the time selection portion 1308 is exemplified as a slider interface in FIG. 13, it will be appreciated that other mechanisms are implemented in other examples. In some embodiments, non-chronological or non-sequential selection of time points or slices is enabled.

According to the described embodiments, temporally-dynamic visualization of smart radio locations is based on user interaction with a user interface and selection of a relevant data object from a plurality of time-specific data objects stored in a database. In an example operation, a first overlay layer that includes indicators of smart radio locations for a first point in time is displayed in a user interface (e.g., user interface 1300). Responsive to a user interaction with a time selection portion (e.g., portion 1308) of the user interface that selects a second point in time, a query that indicates the second point in time is sent to the database (e.g., location database 1302). The database stores a plurality of data objects that each include a set of location information for a corresponding point in time. In some embodiments, the set of location information included in a data object includes a previously generated overlay layer. Based on the indication of the second point in time, a data object is then selected and used to generate a second overlay layer. The second overlay layer includes indicators of smart radio locations for the second point in time and is displayed on the user interface.

Equipment Location Monitoring

Embodiments described herein relate to mobile equipment tracking via smart radios as triangulation references. In this context, mobile equipment refers to work site or facility industrial equipment (e.g., heavy machinery, precision tools, construction vehicles). According to example embodiments, a location of a mobile equipment is continuously monitored based on repeated triangulation from multiple smart radios located near the mobile equipment. Improvements to the operation and usage of the mobile equipment are made based on analyzing the locations of the mobile equipment throughout a facility or worksite. Locations of the mobile equipment are reported to owners of the mobile equipment, or entities that own, operate, and/or maintain the mobile equipment. Mobile equipment whose location is tracked include vehicles, tools used and shared by workers in different facility locations, tool kits and toolboxes, manufactured and/or packaged products, and/or the like. Generally, mobile equipment is movable between different locations within the facility or worksite at different points in time.

In some embodiments, a tag device is physically attached to a mobile equipment so that the location of the mobile equipment is monitored. A computer system (e.g., example computer system 2300, cloud computing system 220, a smart radio, an administrator smart radio) receives tag detection data from at least three smart radios based on the smart radios communicating with the tag device. Each instance of tag detection data received from a smart radio includes a distance to the tag device and a location of the smart radio.

In some embodiments, the tag detection data is received from smart radios owned or associated with different entities. That is, different smart radios that are not necessarily associated with the same given entity (e.g., a company with which various operators at the worksite are employed) as a given mobile equipment are used to track the given mobile equipment. As such, ubiquity of smart radios that are capable or allowed to track a given mobile equipment (via the tag device) is increased regardless of ownership or association with particular entities.

In some embodiments, the tag device is an AirTag™ device. In some embodiments, the tag device is associated with a detection range. The tag device is detectable via wireless communication by other devices, including smart radios, located within the detection range of the tag device. For example, a smart radio detects the tag device via Wi-Fi, Bluetooth, Bluetooth Low Energy, near-field communications, cellular communications, and/or the like. In some embodiments, a smart radio that is located within the detection range of the tag device detects the tag device, determines a distance between the smart radio and the tag device, and provides the tag detection data to the computer system.

From the tag detection data, the computer system determines a location of the tag device, which is representative of the location of the mobile equipment. In particular, the location of the mobile equipment is triangulated from the known locations of multiple smart radios and the respective distances to the tag device, using the tag detection data.

Thus, the computer system determines the location of the mobile equipment and is configured to continuously monitor the location of the mobile equipment as additional tag detection data is obtained over time.

In some embodiments, the determined location of the mobile equipment is indicated to the entity with which the mobile equipment is associated (e.g., an owner, a user of the mobile equipment, etc.). As discussed, in some examples, the location of the mobile equipment is determined based on triangulation of the tag device by different smart radios owned by different entities. If a mobile equipment location is determined via multiple entities, the mobile equipment location is only reported to the relevant entity, such that mobile equipment locations are not insecurely shared across entities.

In some embodiments, mobile equipment location is determined and tracked according to privacy layers or groups that are defined. For example, a tag for a mobile equipment is detected and tracked by a first group of entities (or smart radios assigned to a first privacy layer), and the determined location is reported to a smaller group of entities (or devices assigned to a second privacy layer).

Various monitoring operations are performed based on the locations of the mobile equipment that are determined over time. In some embodiments, a usage level for the mobile equipment is automatically classified based on different locations of the mobile equipment over time. For example, a mobile equipment having frequent changes in location within a window of time (e.g., different locations that are at least a threshold distance away from each other) is classified at a high usage level compared to a mobile equipment that remains in approximately the same location for the window of time. In some embodiments, certain mobile equipment classified with high usage levels are indicated and identified to maintenance workers such that usage-related failures or faults can be preemptively identified.

In some embodiments, a resting or storage location for the mobile equipment is determined based on the monitoring of the mobile equipment location. For example, an average spatial location is determined from the locations of the mobile equipment over time. A storage location based on the average spatial location is then indicated in a recommendation provided or displayed to an administrator or other entity that manages the facility or worksite.

In some embodiments, locations of multiple mobile equipment are monitored so that a particular mobile equipment is recommended for use to a worker during certain events or scenarios. For example, in a medical emergency situation, a particular vehicle is recommended and indicated to a nearby worker based on a monitored location for the particular vehicle being located nearest to the worker. As another example, for a worker assigned with a maintenance task at a location within a facility, one or more maintenance tool kits shared among workers and located near the location are recommended to the worker for use.

Accordingly, embodiments described herein provide local detection and monitoring of mobile equipment locations. Facility operation efficiency is improved based on the monitoring of mobile equipment locations and analysis of different mobile equipment locations.

Area-Based Productivity Tracking

According to example embodiments, smart radios are assigned to different workers who are associated with different roles. For example, a first smart radio is assigned to and used by an administrator, a second smart radio is assigned to and used by a medic, and a third smart radio is assigned to and used by a maintenance technician.

The different roles associated with different workers are representative of different operations and tasks performed by the workers, which are more relevant to certain areas within a facility than other areas. As such, in some embodiments, certain geofenced areas of a facility are identified as activity areas for a given role, and different roles have different activity areas. For example, a break or rest area is an activity area for a medic but is not an activity area for a technician. As another example, a base or office area is an activity area for an administrator but is not an activity area for a vehicle operator.

That is, in some embodiments, activity areas are identified for a worker role based on an expectation that the tasks associated with the worker role are productively performed within the activity areas. Thus, a worker is expected to have an increased productivity while located within the activity area than while located outside of the activity area.

Figure 14:
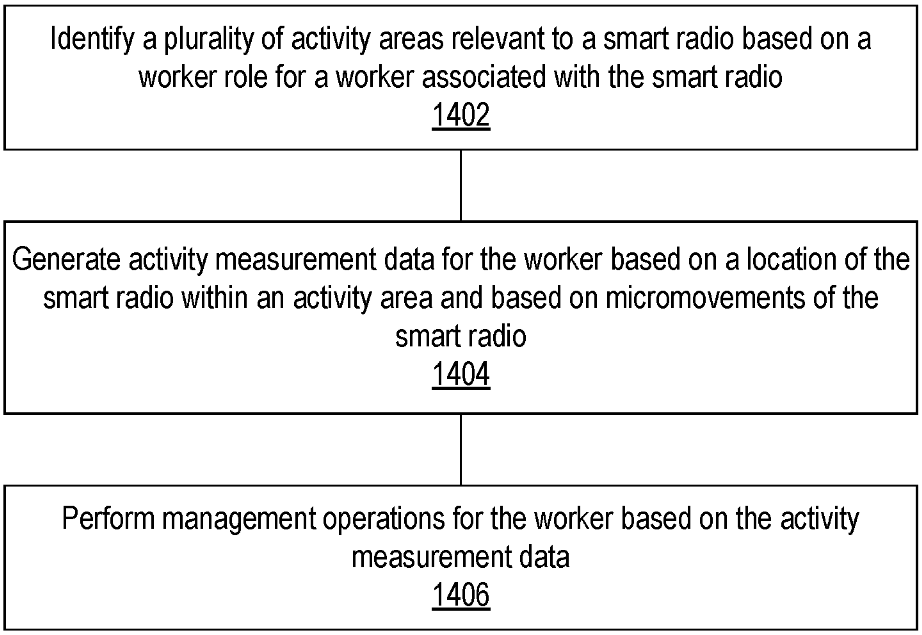
FIG. 14 is a flow diagram illustrating an example process for classifying worker activity based on smart radio locations with role-specific activity areas, in accordance with one or more embodiments.

Embodiments described herein use role-specific activity areas and geofencing to classify activity levels for workers. FIG. 14 provides a flow diagram that illustrates an example process for classifying worker activity based on smart radio locations with role-specific activity areas. In some embodiments, the illustrated process is performed by a cloud computing system 220 (e.g., shown in FIG. 2A). In some embodiments, the illustrated process is performed by a computer system, for example, the example computer system 2300 illustrated and described in more detail with reference to FIG. 23. Particular entities, for example, the smart radios (e.g., smart radios 1105, smart radios 224), perform some or all of the steps of the process in some embodiments. Likewise, some embodiments include different and/or additional steps, or perform the steps in different orders.

In step 1402, a plurality of activity areas relevant to a smart radio are identified. The activity areas are geofenced areas that are mapped to a worker role of a worker who is currently using the smart radio and/or assigned to the smart radio. In some examples, metadata generated with a definition of a geofence includes an indication of worker roles for which the geofence is an activity area.

In step 1404, activity measurement data is generated. In some embodiments, the activity measurement data describes an activity or productivity level of a worker, or an estimation of whether the worker is actively performing assigned tasks.

For example, the activity measurement data includes a first activity level determined for the worker based on the smart radio (and the worker) being located within an activity area for the worker's role. The first activity level is indicative of increased productivity of the worker due to the worker being located within an activity area where the assigned tasks are intended to be performed.

In some examples, the activity measurement data includes a second activity level for the worker that is determined based on micromovements of the smart radio. For example, a relatively high degree of micromovements of the smart radio is indicative of the worker actively performing a physical task, while a relatively low degree of micromovements of the smart radio suggests that the worker is static.

Thus, further to the worker being located within an activity area, physical activity of the worker is estimated and used to classify a further activity or productivity level of the worker.

In some embodiments, micromovements refer to small-scale changes in location of the smart radio, or movements that do not exceed a threshold distance within a certain time. For example, some example micromovements are detected and measured via a position tracking component of a smart radio (e.g., position tracking component 125 in FIG. 1). In some embodiments, micromovements include changes in three-dimensional position of the smart radio, for example, changes detected by a gyroscope, accelerometer, and/or similar sensors in the smart radio. Generally, from data collected at the smart radio, a degree of micromovement of the smart radio is determined and used to classify a second activity level for the worker.

In some embodiments, the activity measurement data is time-dependent and includes times at which a first activity level is classified for the worker, times at which a second activity level is classified for the worker, and/or the like.

In step 1406, management operations of the worker are performed based on the activity measurement data. In some embodiments, clock-ins of the worker are captured based on the activity measurement data including a first activity level or a second activity level for the worker. In some embodiments, time data that includes lengths of time that the worker spends at the first activity level and/or the second activity level is determined from the activity measurement data. In some embodiments, the time data is automatically provided to HR software and systems, such that manual input of the time records by the worker is not needed. In some embodiments, the time data is stored with profiles associated with the worker, such as an experience profile.

In some embodiments, the activity measurement data is used to monitor exposure of the worker to hazardous conditions. For example, from the activity measurement data, a length of time that the worker is physically active in certain conditions (e.g., excessive sunlight, an oxygen-depleted environment, a room with a cold temperature) is monitored and compared against safety thresholds. Thus, in some examples, worker activity is measured and used to improve worker safety.

In some embodiments, an automated alert is transmitted to a given worker that has spent less than a threshold length of time in an activity area or has spent longer than a threshold length of time outside of an activity area. For example, a length of time that a worker is not classified at either a first activity level or a second activity level is monitored and compared against a threshold to determine whether to transmit an alert to the smart radio for the worker.

Figure 15:
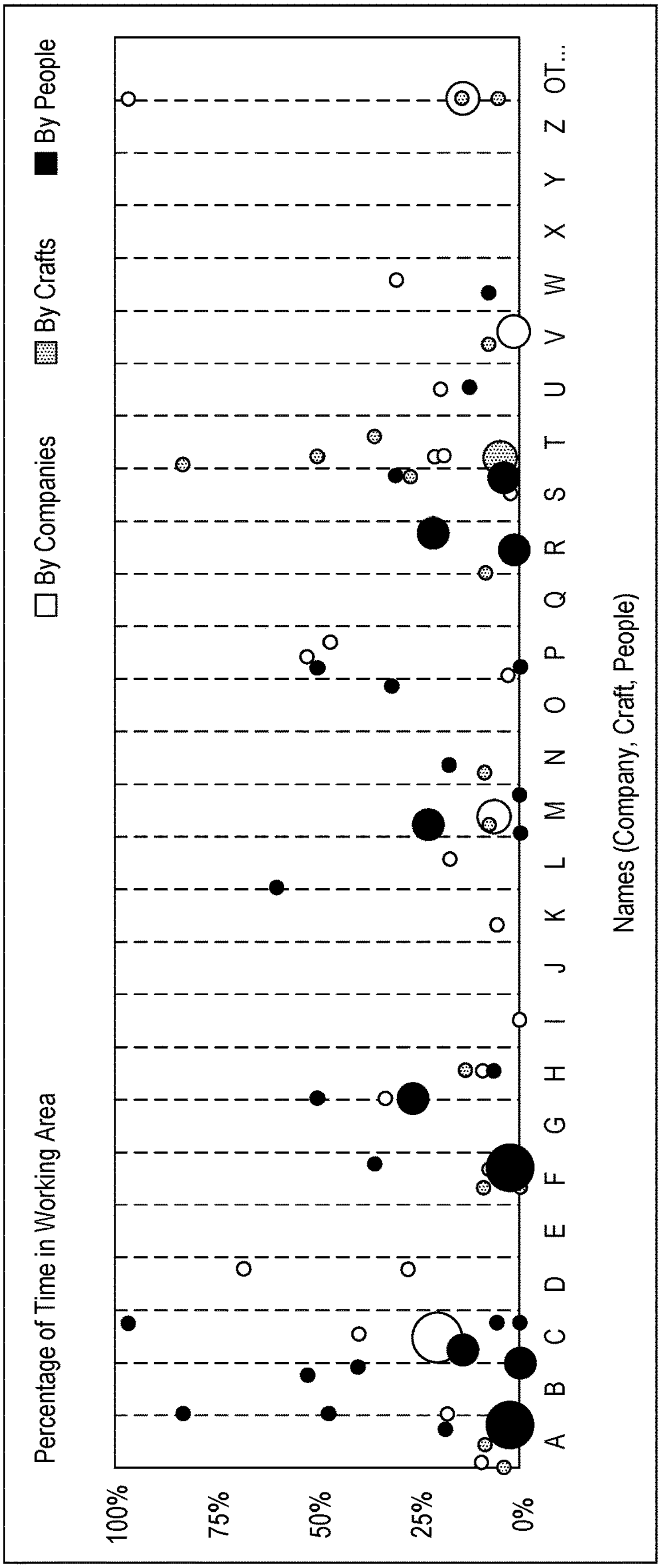
FIG. 15 is a drawing illustrating an example user interface for visualizing worker activity data, in accordance with one or more embodiments.

In some embodiments, the management operations includes generating a worker activity user interface for display. FIG. 15 illustrates an example worker activity user interface 1500.

In some embodiments, the worker activity user interface 1500 is provided for display at an example computer system 2300, and in particular, at a video display 1218 thereof. In some embodiments, the example computer system 2300 is an administrator system, and the worker activity user interface 1500 is provided for display to an administrator. In some embodiments, the example computer system 2300 is a smart radio, and the worker activity user interface 1500 is provided for display via a display screen 130 of the smart radio.

As illustrated in FIG. 15, the worker activity user interface 1500 is configured to indicate the activity measurement data. In some embodiments, the worker activity user interface 1500 includes a graph of percentage of time in an activity area. For example, a data point associated with a given worker is located on the graph to represent a percentage of total time that the given worker is located within an activity area for the given worker's role. In FIG. 15, multiple data points are located on the graph and shown as circles of varying sizes. The respective size of a circle indicates a number of data points that overlap.

That is, in some embodiments, the worker activity user interface 1500 indicates a length of time that each worker is classified with a first activity level. In some embodiments, the worker activity user interface 1500 additionally or alternatively indicates a length of time that each worker is classified with a second activity level, or is exhibiting threshold physical micromovements within an activity area.

In some embodiments, as illustrated in FIG. 15, worker-specific activity measurement data is aggregated based on groupings of workers. Accordingly, in some embodiments, an average length of time that a group of workers are classified with a first activity level and/or classified with a second activity level is indicated in the worker activity user interface 1500. For example, workers are grouped by affiliation with certain entities (e.g., by company), by worker roles (e.g., crafts), and/or the like.

It will be appreciated that the worker activity user interface 1500 includes other indications of the activity measurement data, in some examples. For example, a ranked list or leaderboard of workers (or groups thereof) that is sorted by lengths of time at a first activity level is displayed via the worker activity user interface 1500.

Automated Geofencing

As discussed herein, geofences are used to define real-world geographic areas. In various examples, the geographic areas that take shape in the real-world are difficult for geofences to accurately represent. In some examples, a geographic area is highly polygonal, elliptical, or similarly complex.

Meanwhile, to minimize data footprint, a geofence is defined as a circle with a center and a radius. While a geofence is efficiently defined with the two data points, inaccuracies in representing a geographic area that is not perfectly circular arise. Such inaccuracies result in misclassifications of a smart radio being located in a certain geographic area when the smart radio is actually outside of the area.

Figure 16A:
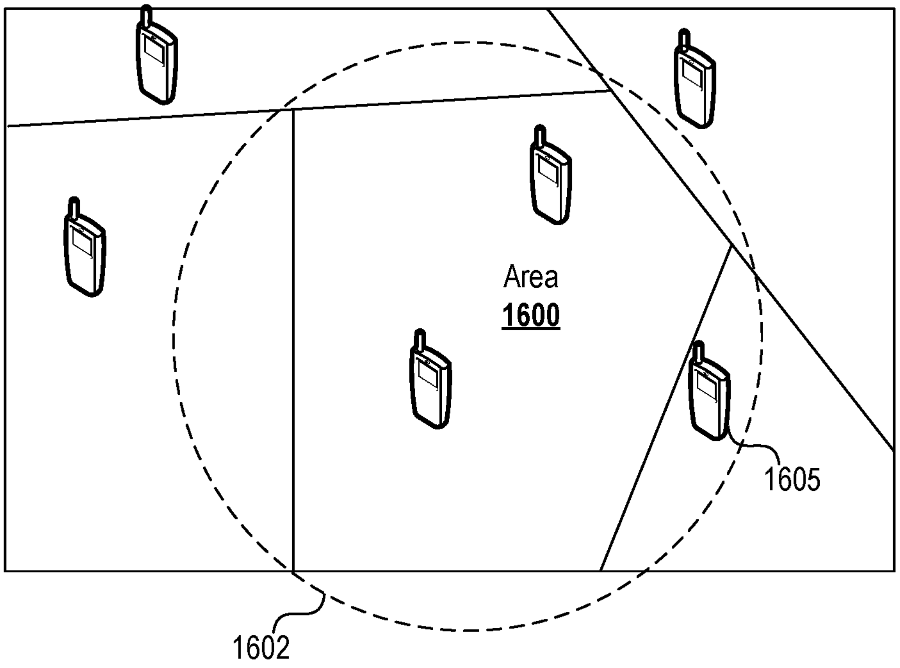
FIGS. 16A and 16B are drawings illustrating example techniques for geofencing a specific area, in accordance with one or more embodiments.

FIG. 16A illustrates an example scenario in which inaccuracy of geofence representation of an area 1600 leads to misclassification of smart radios. As illustrated, area 1600 is polygonal, while geofence 1602 is circular. As a result, use of the geofence 1602 to represent the area 1600 results in a misclassification of a particular smart radio 1605 as being located in the area 1600 despite being located outside of the area 1600.

Figure 16B:
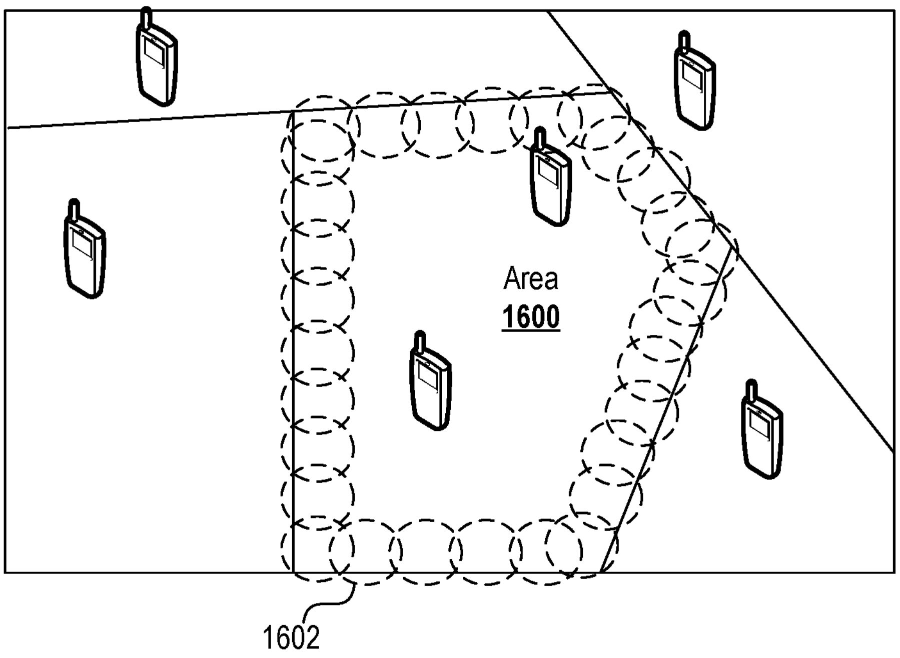

Embodiments described herein improve accuracy of geofence representation of real-world geographic areas based on defining a geographic area using a plurality of circular geofences. FIG. 16B illustrates a plurality of circular geofences 1602 used to define a border of the area 1600. The plurality of circular geofences 1602 form an aggregate geofence, with which smart radio locations are classified. For example, if a smart radio location is completely surrounded by the plurality of circular geofences 1602, the smart radio location is determined to be within the aggregate geofence and is classified as being located inside of the area 1600. Improvements to the accuracy of location-specific and location-based operations for smart radios/apparatuses are therefore provided.

"Blind Use" Interface

Figure 17:
FIG. 17 is an illustration of "blind" operation of a smart radio.

The smart radio is designed and configured to be used "blind." References to the word "blind" refer to the positional use of the smart radio. FIG. 17 is an illustration of "blind" operation of a smart radio. The smart radio is intended to be worn on the chest or shoulder region 1700 (e.g., via a Klick Fast™ bracket) while the screen faces away from the user/wearer. The use of the term "blind" may not be constrained to only refer to physical blindness, but rather include examples in which the device is operable while the user is not looking at the device or that the device is only in peripheral vision.

In some embodiments, the smart radio includes switches, buttons, sensors, and/or other features that detect whether the smart radio is being worn or attached to a user in a blind use position. For example, as described below in connection with FIG. 18, the smart radio includes a bracket via which the smart radio is attached to a user (e.g., at a front torso strap, mount, or the like worn by the user as shown in FIG. 17), and the smart radio includes a switch, button, sensor, and/or the like to detect whether the bracket is presently engaged in attachment to the user. In some embodiments, the smart radio uses an on-board accelerometer to determine whether the smart radio is currently in use and attached to a user. For example, based on a threshold degree of movement being measured by the on-board accelerometer, the smart radio determines that the smart radio is in a blind use position.

A user who is working and has the smart radio attached to themselves is not going to want to remove the smart radio frequently to focus on the radio. In order to operate blind, the smart radio includes large, raised buttons that are easy to find by touch, even through heavy work gloves. Although there is a screen that faces the opposite direction, navigation through said display interface must be simple. Additional features include use of vibration and channel recognition sounds that alert when changing to a given channel. Another important factor is the limited number of buttons. Referring again to FIG. 5, on the front face, the smart radio has only four buttons that perform navigation. The up and down buttons 508, 512 make use of a concave surface that enables a gloved hand to find ridges defining the beginning of the back/home button 504 and the selection button 516. The concave design further enables gloved identification of up and down 508, 512.

A front facing RGB LED light that is sufficiently bright to reflect off ambient surfaces indicates messages or communications in channels associated with particular colors. For example, audio/text on an emergency channel causes the LED to present as red. Audio/text from an administrator causes the LED to present as purple, and audio/text on a different channel causes the light to present as a different color specifically associated with the channel. In some embodiments, the display screen colors each channel the same color that the LED changes to based on the incoming audio/text. In some embodiments, each channel being presented by the smart radio (e.g., according to a logged-in user, according to a geofence that the smart radio is located in) is associated with a unique color. In some embodiments, the smart radio includes lensing in connection with the LED that facilitates the scattering of light emitted by the LED. In some embodiments, the LED light is located on the front face of the smart radio. In some embodiments, the smart radio includes the LED light or a second LED light on the top face such that a user to which the smart radio is attached can look down and see the emitted light. In some embodiments, the LED light is only operated based on the smart radio determining that the smart radio is in the blind use position, thereby conserving power when not in the blind use position.

Figure 18:
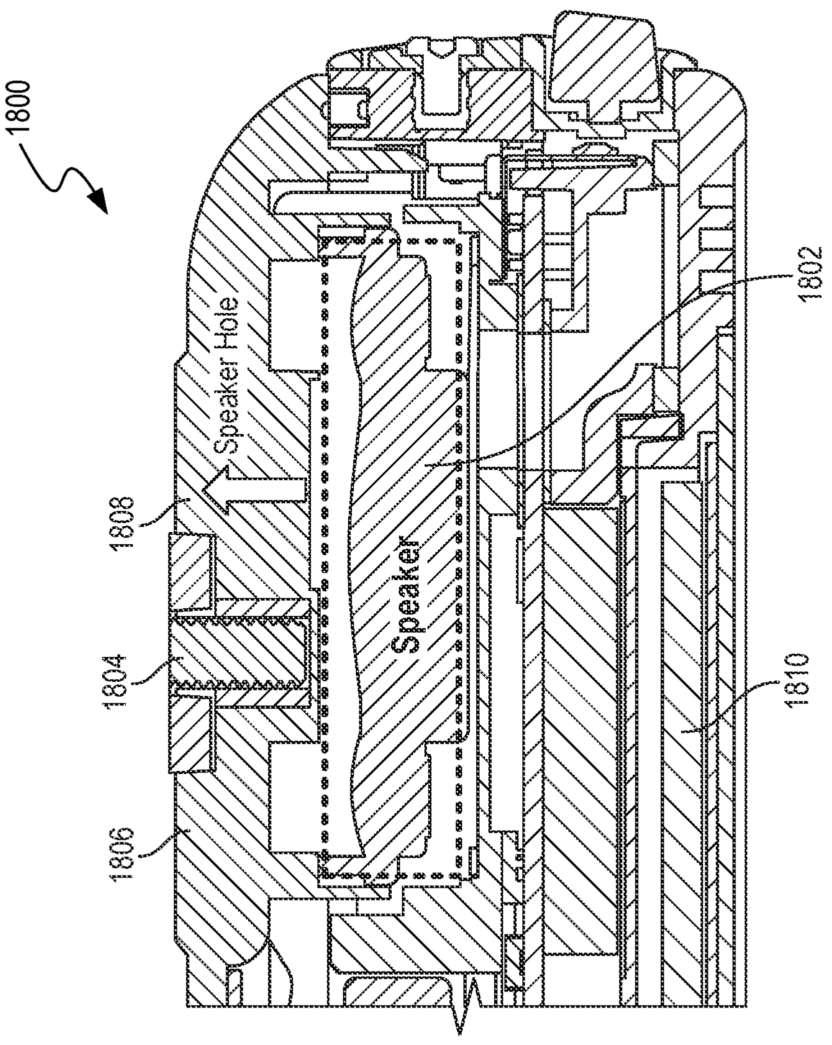
FIG. 18 is a cross-sectional diagram of a smart radio illustrating speaker placement.

The smart radio is further configured with a rear-facing speaker. FIG. 18 is a cross-sectional diagram of a smart radio 1800 illustrating speaker placement. The speaker 1802 is positioned within the smart radio 1800 toward the rear of the assembly, behind a mounting bracket 1804 and a rear outer housing 1806. The mounting bracket 1804 enables the smart radio to incorporate a stud that mounts to external surfaces (e.g., a Klick Fast™ stud). Configuring the speaker 1802 to be rear facing provides several advantages.

As a first advantage, the speaker 1802 is positioned closer to the exterior of the device 1806 (e.g., the speaker is not obstructed by a display screen that must be on the front). The proximity of the speaker 1802 to the speaker hole 1808 on the exterior of the device increases output volume as there is less sound lost internally to the device 1800. Second, the speaker hole 1808 is not limited by the size of the display screen 1810 and is enabled to be larger; therefore, the device 1800 is enabled to emit more sound. Additionally, the larger speaker hole 1808 enables less distortion (muffling) of the sound output. Third, the decrease in distance between the speaker 1802 and the speaker hole 1808 enables the use of a speaker mesh that provides the smart radio some measure of water resistance. Finally, the rear facing speaker 1802 increases the volume when in "blind use."

Aiming the speaker toward a mounting bracket 1804 (e.g., such as a Klick Fast™ bracket) positioned on a user's body provides directional routing of sound off the user's body and toward the head. Thus, in the context of a body mounted bracket 1804, the rear-facing speaker 1802 increases the perceived volume per output power. Increased volume is a relevant concern where a user is operating loud machinery or wearing headphones.

Another element that enables blind operation is the use of smart radio vibrations and channel identification sounds. As the user scrolls through channels (e.g., using the large forward-facing buttons), the smart radio emits an auditory notification indicating the channel the user is on. Embodiments of the auditory notification include spoken recitations of the channel title and/or chimes that are associated with specific channels (e.g., a first note(s) of a siren sounds in response to being switched to an emergency channel). In some embodiments, the auditory renderings of text-based messages received by the smart radio are also played via the rear-facing speaker. For example, the smart radio automatically renders a playback of text-based messages received while in the blind use position. In some embodiments, the smart radio receives a text-based message, and in response to a user input (e.g., via the large front buttons, via the PTT button), the smart radio renders an auditory rendering of the text-based message.

In some embodiments, the smart radio is configured to enhance recognition and interpretation of received messages, including live PTT or streamed messages and text-based messages (and auditory renderings thereof). According to example embodiments, the smart radio is configured to translate a received message from a first language to a second language. For example, a text-based message is defined in Spanish, and the smart radio translates the text-based message to English (e.g., for the user to read in a communication thread), or generates an English auditory rendering of the Spanish message. The target language of the translation can be associated with the user of the smart radio. For example, profile data associated with the user can indicate that the user is fluent in one or more particular languages, and the smart radio translates received messages in a different language to the user's fluent languages. In some embodiments, the smart radio locally stores language models, automatic speech recognition (ASR) models, translation models, dictionary mappings, and/or the like that the smart radio uses to generate a translated auditory rendering. In some embodiments, the smart radio interfaces with a translation service, for example via an API, to obtain a translated message that the smart radio can then dictate or auditorily render.

A smart radio's improvement to message interpretation/recognition includes including auditory identifications of the sender of a received message (e.g., a live PTT or streamed message, a text-based message) and/or the communication channel/thread of the received message. When receiving an auditory rendering of a message, a user might not be able to recognize a voice of a sender of the message (or the voice is a computer-generated voice that dictates a text message) and may be uninformed as to the sender of the message. Accordingly, the smart radio includes an identification of the sender of a message when playing an audio rendering of the message. In some embodiments, the smart radio alternatively or additionally includes an identification of a communication channel or thread in which the message is received with the audio rendering of the message. For example, the smart radio indicates that the message was received in an emergency channel, an operating channel, a particular radio frequency channel, and/or the like.

In some embodiments, the smart radio determines whether to append the sender/channel identification to the audio rendering of the message or to precede the audio rendering of the message with the sender/channel identification. In some embodiments, the smart radio appends the sender/channel identification based on the message being a live PTT message or a streamed message. In doing so, the message contents are communicated to its recipient (the user of the smart radio) first, enabling the recipient to act on the live PTT or streamed message with more priority or urgency. In some embodiments, the smart radio precedes the message (or auditory rendering thereof) with the sender/channel identification. Compared to live PTT or streamed messages, text-based messages and auditory renderings thereof are communicated with less urgency, thus permitting preceding sender/channel identification and resultant delay of message communication.

The navigation menus themselves include limited options that cycle through radio channels. The channels update based on the job, employer, facility, or geofence where the user is working at a given time. The user is assigned to a given set of tasks/employers/facilities based on the operation of an administrative user. The geofence within which a user is physically present determines geofence based channels. A sample set of channels that are automatically populated includes: emergency channel, dispatch channel, daily team members channel, geofence region channel, and channels associated with individuals that are part of any of the mentioned groups.

Single Threaded Social Features

An important feature of a smart radio is streaming audio that operates on a push-to-talk (PTT) basis. However, modern social features, such as those in smart phones don't operate with the simplicity of a radio. Embodiments disclosed herein include a new interface that combines modern social features such as text threads, including SMS and MMS type messaging, along with PTT radio improvements on existing interfaces.

A known interface includes a scrolling screen that includes a list of open and/or available text threads. When a user clicks/touches a text thread, the thread opens, and the available features of that thread are presented to the user. When a user receives a message, the device typically presents a notification that enables a quick link to the relevant social thread.

Disclosed herein are interfaces that integrate PTT features with social text threads. In some embodiments, when a smart radio begins receiving streaming audio from an external device, the source of the audio is identified via audio metadata. The audio metadata includes such embodiments as packet headers that identify a sender or a sender's role. In some embodiments, the audio metadata is represented by a channel from which the audio is received or non-audio data that is transmitted with the audio data (e.g., as a portion of the payload).

As described elsewhere in this application, the PPT features of the smart radio operate using at least one of the on-board antennae. The networks used are any of a plurality of local private cellular networks, external public or commercial cellular networks, Wi-Fi (IEEE 802.11 networks), or hopping two-way radio protocol (as described elsewhere herein).

When received, the audio data is played back immediately, and the smart radio automatically shifts display from a current screen to a text/social thread associated with the sender. In some embodiments, the smart radio screen remains off (to save power), but when accessed, it automatically displays the text/social thread associated with the sender. In some embodiments, the streaming audio that is received is automatically transcribed and presented in the social thread. In doing so, the user is able to later reference the received audio message, for example, when the smart radio is no longer in the blind use position.

Further or subsequent PTT streaming audio transmissions are presented in the same thread where SMS and MMS style messages are received. For example, the user responds to the received audio message by activating the PTT button (e.g., by depressing the PTT button for a continuous length of time) and uttering a response. The response is streamed back to the origin device of the received audio message and/or the response is automatically transcribed and added to the text thread. In some embodiments, the uttered response is both streamed as audio and transcribed as text for the recipient (the origin device of the audio message received by the smart radio). In some embodiments, the uttered response is either streamed as audio or transcribed as text depending on the recipient, for example, whether the recipient is also a smart radio or a smart radio in a blind use position. In some embodiments, upon receipt of a streaming audio message, the smart radio provides a period for quick response within the same social thread (e.g., 15 seconds). After the period elapses without action, the smart radio returns from the relevant social thread to a home screen. Similarly, when the user interface is in a text thread associated with a given user or group of users, activating a PTT key initiates streaming audio with that user or group of users.

The disclosed interface is applicable to different hardware platforms as well. The smart radios operate on a network that is configured to include additional devices such as mobile phones. On mobile phones, the disclosed messaging interface is included in a mobile application. The mobile application is configurable to supplement, augment, or replace a default messaging application of the mobile phone.

In some embodiments of the disclosed communication interface, where a user is actively streaming audio (e.g., via PTT) on one channel and streaming audio is received on another channel, the audio playback waits until the user is done speaking to shift the display to the incoming message thread, and playback of the incoming streaming audio.

Roaming Channels

Figure 19:
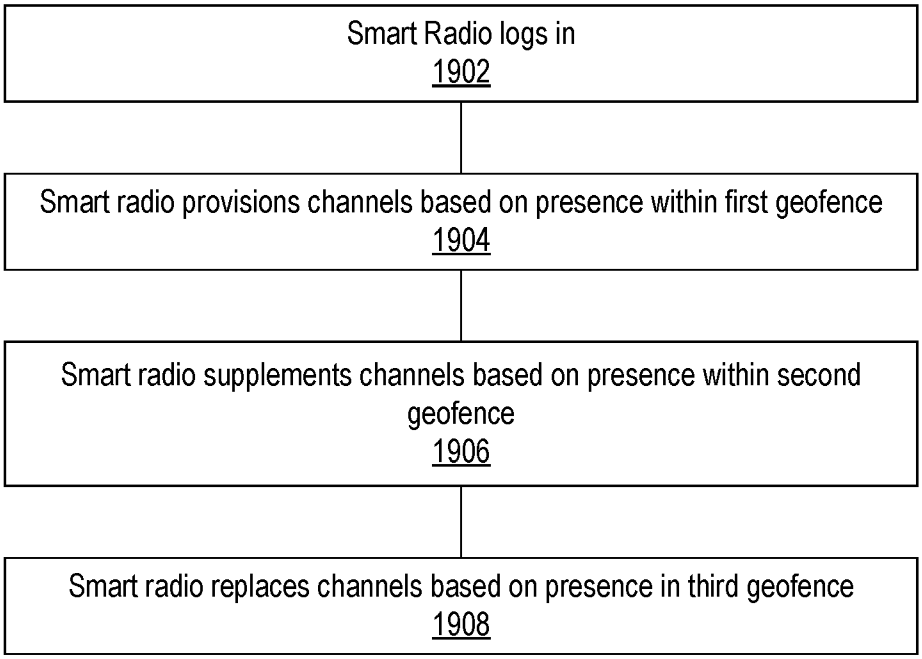
FIG. 19 is a flowchart illustrating automatic roaming of channels.

The smart radio is further configured to roam channels based on presence within a geofence. FIG. 19 is a flowchart illustrating automatic roaming of channels. As described above, an administrative user assigns users to particular teams, jobs, or facilities and the user's smart radio channels are determined therefrom. However, in some embodiments, a greater number of channels are derived from the geofence that the user (e.g., and the smart radio they are logged into) is present in. In step 1902, when a user logs into a smart radio using the global directory/tap & go, the user is present within a given geofence. In step 1904, the geofence the user is present in triggers provisioning of their smart radio to the employer, job, and teams of most associated with that geofence.

For example, although an administrative user is able to manually assign users to associated or assigned groups, a user using their own preconfigured geofence allows for less steps required for managing individual users that may be largely transient. Where users login, a first geofence provisions their device with some channels (e.g., associated the user with the employer for the day). In step 1906, the user is then instructed to go to a second location where a second geofence further provisions the smart radio for the day (e.g., associating the user with a given facility/job for the day).

In step 1908, where the user is subsequently directed to a third location, a third geofence revises the prior provisioning of the smart radio associated with the user's profile. Revisions to the user's current operation modify the radio channels available to the user on the smart radio. The changes to the available channels are an automatic and seamless process for the user.

Long Press PTT Interface

Figure 20A:
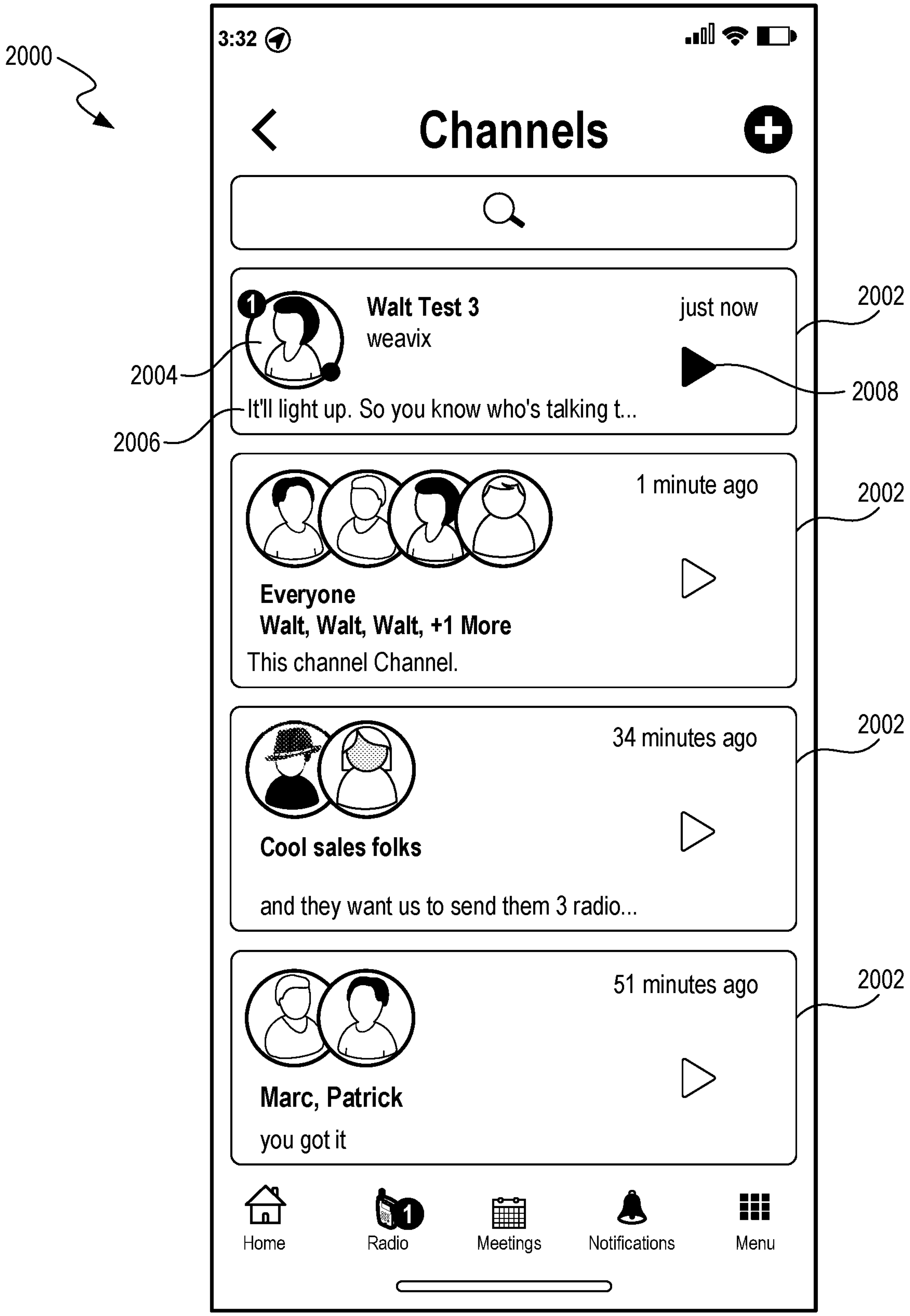
FIGS. 20A and 20B illustrate a message thread user interface implementing long presses as a push-to-talk feature.
Figure 20B:
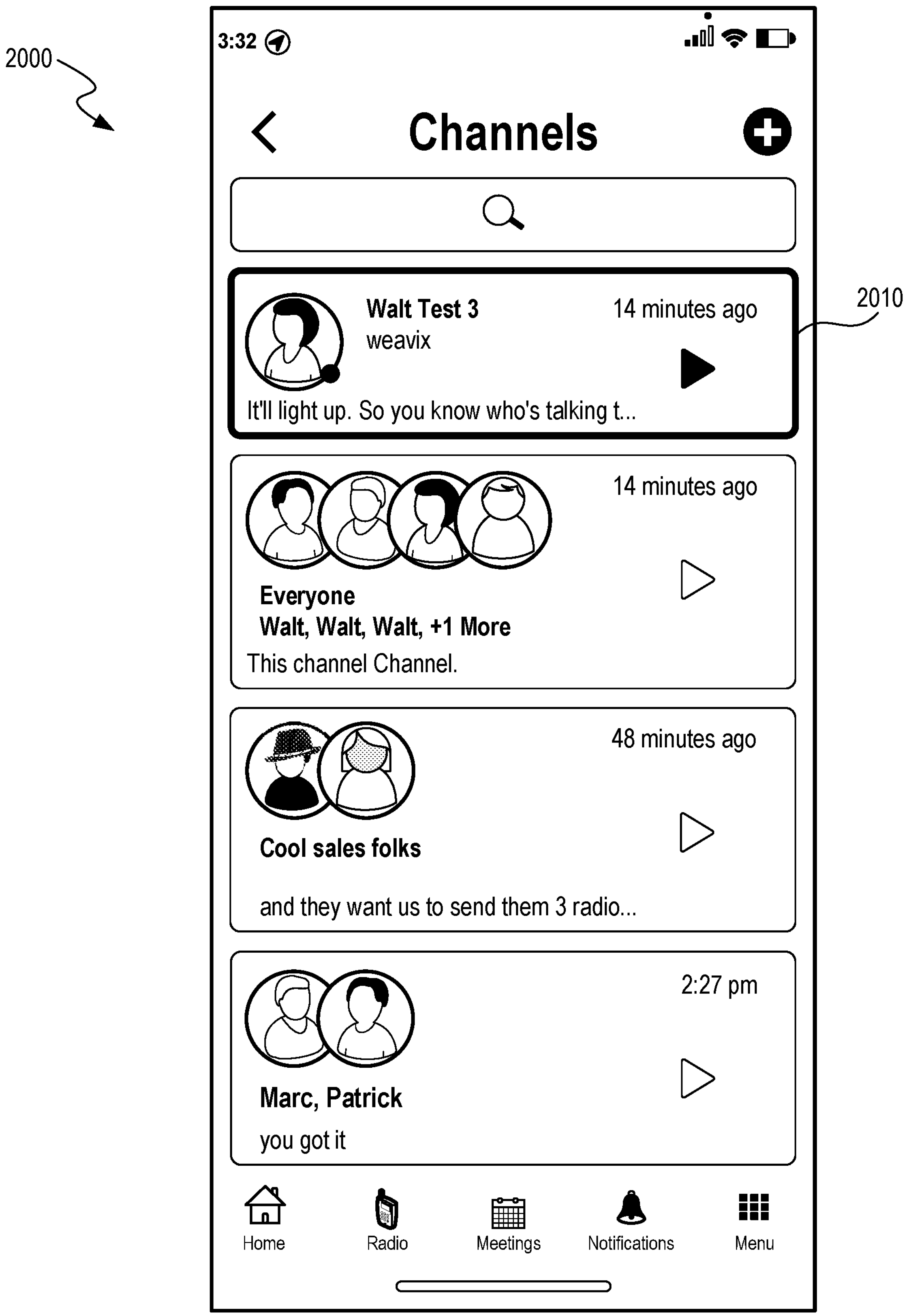

FIGS. 20A and 20B illustrate a message thread user interface 2000 implementing long presses as a push-to-talk feature. Some devices, such as mobile phones, operate on a similar network as the smart radios and connect via a mobile application. The mobile application replaces or supplements the existing messaging application on the mobile phone. Mobile phones typically have additional interface options, such as touch screens and do not have features such as PTT radio toggles. Using the mobile application described herein, a display screen includes a number of threads 2002 associated with individuals or groups for SMS, MMS, and streaming audio messaging. Each thread 2002 includes an avatar 2004, a summary of most recent text 2006, a playback button 2008 that plays the most recent streaming audio received and/or a text-to-speech auditory output. Devices that incorporate a touch screen interface further enable a long press 2010 (indicated by a highlighted display) on a given messaging thread 2002 to enable PTT features with the individual or individuals associated with the selected messaging thread 2002.

Existing interfaces use long press interaction to open an additional menu that enables archival, deletion, pinning, or muting of the messaging thread. Use of long press interaction on a given messaging thread to enable a PTT feature to the members of the messaging thread enables quick cycling through different streaming audio conversations.

PTT on Motion-Connected Lock Screen

Embodiments of the smart radio include motion-based locking. While the device is worn, the on-board accelerometer detects small movements of the device that keep the device unlocked for use by the user wearing the device. When the device is set down, the device locks. Locking a smart radio is different than locking a mobile phone. The smart radio's PTT functionality still operates and the radio still emits streaming audio when received. However, locked devices will not enable an operator to view text message history or transcriptions of the streaming audio. A lock screen requests reauthorization (e.g., through a pin code or "tap & go" of work badge). The PTT features remain functional on all channels but text communication becomes limited. Text communication is limited as compared to PTT because a given user's voice is recognizable, but their text speech may not be.

Additionally, in a given use case, user identification is easily disambiguated by administrator analytics. If a given user is carrying their own smart radio, there is an administrator record of that smart radio approaching the stationary radio followed by radio operation on the otherwise motionless radio. It is easy for a computer to attribute the message to the user who was observed approaching the stationary radio. Conversely, once a user's private messages have been revealed to other users, clarification of a use record cannot fix the situation. Thus, PTT use of the radio on all channels is not prevented on the lock screen, but review of past recorded messages is prevented.

Generally, smart phones lock when placed in a user's pocket (e.g., worn); however, use of the smart radio is often from a worn position and thus detection and characterization of worn movement keeps the device unlocked. Conversely, the smart radio seeks security when it is left somewhere.

Cable Attenuation Power Management

The smart radio is configured to operate as a mounted sensor (e.g., camera, wireless communicator, etc.). Mobile devices such as the smart radio typically charge using a specified voltage or voltage range (e.g., 5-9.4V). The charging voltage presents a problem for providing wired sources of power to the mounted device because the device must be close to the source of power. This is because voltage attenuation occurs over long cables, and the voltage at the device is no longer what the device expects. Where a device receives a voltage it does not expect, it will not charge. Power sources are frequently not particularly close to every location where one may desire a mounted sensor. Typically, a device receives 9.4V and a transformer modifies that voltage to 5V. Values under 5V become problematic for the device.

Accordingly, some embodiments of the smart radio are configured to charge using a variable peak or root mean square (RMS) voltage. The smart radio thus operates on a first power setting when in radio mode and another power setting when in mounted sensor mode (e.g., a trickle charging mode). When operated in a mounted sensor mode, the device uses less power because the device need not operate all devices on board (e.g., the display screen, the accelerometer, etc.). The power operation modes are set via onboard software and control charging voltage and/or operable on-board equipment.

FIG. 21 is a flowchart illustrating power mode selection. Control of the power modes is operable by remote control signals, local application settings, or by physical switch. An embodiment of a physical switch is a button under an external shell of the smart radio that is depressed based on the insertion of a screw connected to a power cable plug. The screw locks the power cable in place on the smart radio and further depresses the physical switch. Numerous embodiments of threaded power cables known in the art function as mode triggers using the physical switch on the smart radio.

In step 2102, the smart radio is attached to power (of an unknown voltage and configuration). In step 2104, the device receives configuration via control signal, application settings, or physical switch and modifies the power consumption mode. Alternatively, in step 2106, the device detects an available voltage (either of RMS voltage or peak voltage). In step 2108 and in response to detection of the voltage being above or below a predetermined threshold, or within any of multiple expected ranges, the device modifies its power consumption mode to a corresponding mode. In some embodiments, the lower voltage mode, operates at less than 5V and the higher voltage mode operates at 5V or higher.

Embodiments of the smart radio as described herein make use of longer power cables such as those extending to 200 feet, 300 feet, 400 feet, or smaller lengths therebetween. Given the range of multiple hundreds of feet, the mounted sensor embodiment of the smart radio is enabled to position within significant distances from dedicated power sources. The voltage attenuation over multiple hundred feet of cable is too great for off the shelf mobile phones to function. Similarly, mobile phones have no reason to operate at such low voltages (e.g., 3-4V, or 3.9V)—specifically, smart phones are designed to operate all on board sensors as frequently as possible. Thus, including multiple power modes that operate with fewer sensors on smart phone devices is counter-intuitive.

Accordingly, embodiments of the smart radio are modified to operate at a mobile device voltage, and at a mounted sensor voltage that accounts for attenuation of over 100 feet of power cable.

Computer Embodiment

FIG. 22 is a block diagram illustrating an example ML system 2200, in accordance with one or more embodiments. The ML system 2200 is implemented using components of the example computer system 2300 illustrated and described in more detail with reference to FIG. 23. For example, portions of the ML system 2200 are implemented on the apparatus 100 illustrated and described in more detail with reference to FIG. 1, or on the cloud computing system 220 illustrated and described in more detail with reference to FIG. 2A. Likewise, different embodiments of the ML system 2200 include different and/or additional components and are connected in different ways. The ML system 2200 is sometimes referred to as a ML module.

The ML system 2200 includes a feature extraction module 2208 implemented using components of the example computer system 2300 illustrated and described in more detail with reference to FIG. 23. In some embodiments, the feature extraction module 2208 extracts a feature vector 2212 from input data 2204. For example, the input data 2204 includes location parameters measured by devices implemented in accordance with embodiments disclosed herein. The feature vector 2212 includes features 2212*a*, 2212*b*, . . . , 2212*n*. The feature extraction module 2208 reduces the redundancy in the input data 2204, for example, repetitive data values, to transform the input data 2204 into the reduced set of features 2212, for example, features 2212*a*, 2212*b*, . . . , 2212*n*. The feature vector 2212 contains the relevant information from the input data 2204, such that events or data value thresholds of interest are identified by the ML model 2216 by using a reduced representation. In some example embodiments, the following dimensionality reduction techniques are used by the feature extraction module 2208: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 2216 performs deep learning (also known as deep structured learning or hierarchical learning) directly on the input data 2204 to learn data representations, as opposed to using task-specific algorithms. In deep learning, no explicit feature extraction is performed; the features 2212 are implicitly extracted by the ML system 2200. For example, the ML model 2216 uses a cascade of multiple layers of nonlinear processing units for implicit feature extraction and transformation. Each successive layer uses the output from the previous layer as input. The ML model 2216 thus learns in supervised (e.g., classification) and/or unsupervised (e.g., pattern analysis) modes. The ML model 2216 learns multiple levels of representations that correspond to different levels of abstraction, wherein the different levels form a hierarchy of concepts. The multiple levels of representation configure the ML model 2216 to differentiate features of interest from background features.

In alternative example embodiments, the ML model 2216, for example, in the form of a CNN generates the output 2224, without the need for feature extraction, directly from the input data 2204. The output 2224 is provided to the computer device 2228, the cloud computing system 220, or the apparatus 100. The computer device 2228 is a server, computer, tablet, smartphone, smart speaker (e.g., the speaker 632 of FIG. 6), etc., implemented using components of the example computer system 2300 illustrated and described in more detail with reference to FIG. 23. In some embodiments, the steps performed by the ML system 2200 are stored in memory on the computer device 2228 for execution. In other embodiments, the output 2224 is displayed on the apparatus 100 or electronic displays of the cloud computing system 220.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field is approximated mathematically by a convolution operation. CNNs are based on biological processes and are variations of multilayer perceptrons designed to use minimal amounts of preprocessing.

In embodiments, the ML model 2216 is a CNN that includes both convolutional layers and max pooling layers. For example, the architecture of the ML model 2216 is "fully convolutional," which means that variable sized sensor data vectors are fed into it. For convolutional layers, the ML model 2216 specifies a kernel size, a stride of the convolution, and an amount of zero padding applied to the input of that layer. For the pooling layers, the model 2216 specifies the kernel size and stride of the pooling.

In some embodiments, the ML system 2200 trains the ML model 2216, based on the training data 2220, to correlate the feature vector 2212 to expected outputs in the training data 2220. As part of the training of the ML model 2216, the ML system 2200 forms a training set of features and training labels by identifying a positive training set of features that have been determined to have a desired property in question, and, in some embodiments, forms a negative training set of features that lack the property in question.

The ML system 2200 applies ML techniques to train the ML model 2216, that when applied to the feature vector 2212, outputs indications of whether the feature vector 2212 has an associated desired property or properties, such as a probability that the feature vector 2212 has a particular Boolean property, or an estimated value of a scalar property. In embodiments, the ML system 2200 further applies dimensionality reduction (e.g., via linear discriminant analysis (LDA), PCA, or the like) to reduce the amount of data in the feature vector 2212 to a smaller, more representative set of data.

In embodiments, the ML system 2200 uses supervised ML to train the ML model 2216, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 2232 is formed of additional features, other than those in the training data 2220, which have already been determined to have or to lack the property in question. The ML system 2200 applies the trained ML model 2216 to the features of the validation set 2232 to quantify the accuracy of the ML model 2216. Common metrics applied in accuracy measurement include Precision and Recall, where Precision refers to a number of results the ML model 2216 correctly predicted out of the total it predicted, and Recall is a number of results the ML model 2216 correctly predicted out of the total number of features that had the desired property in question. In some embodiments, the ML system 2200 iteratively re-trains the ML model 2216 until the occurrence of a stopping condition, such as the accuracy measurement indication that the ML model 2216 is sufficiently accurate, or a number of training rounds having taken place. In embodiments, the validation set 2232 includes data corresponding to confirmed locations, dates, times, activities, or combinations thereof. This allows the detected values to be validated using the validation set 2232. The validation set 2232 is generated based on the analysis to be performed.

Figure 23:
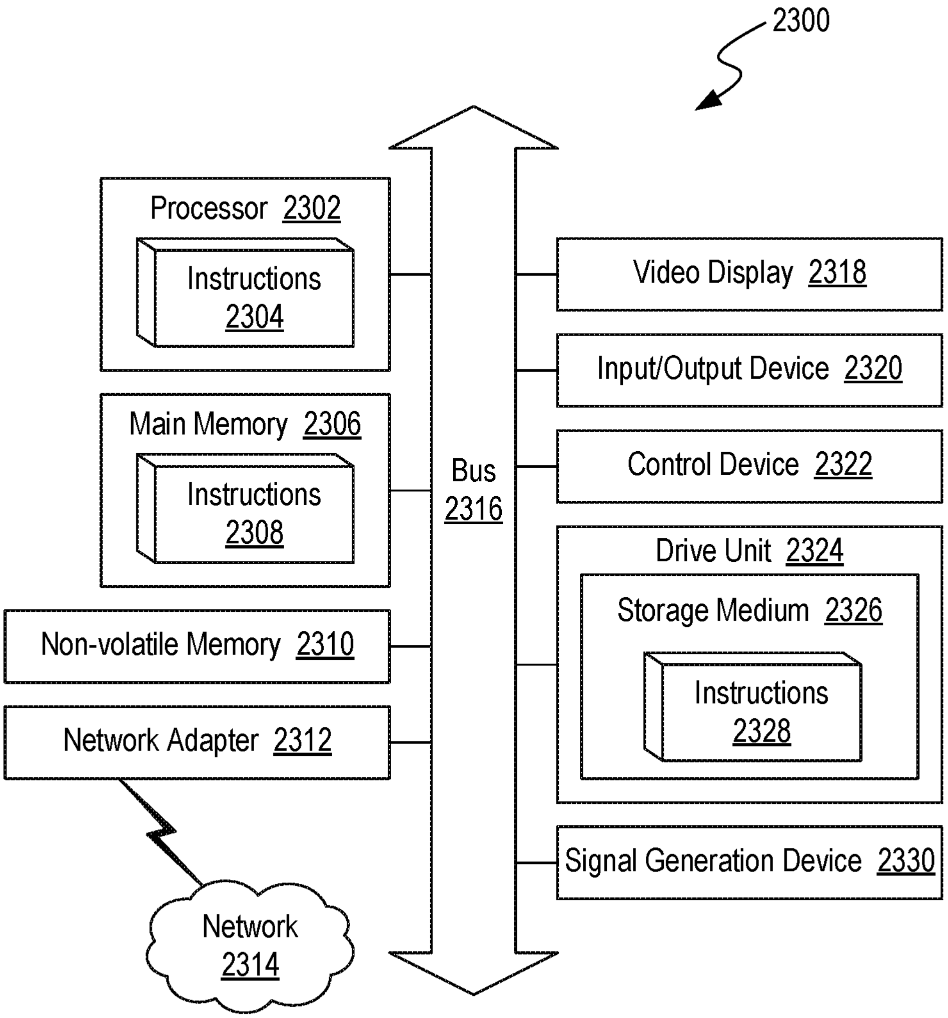
FIG. 23 is a block diagram illustrating an example computer system, in accordance with one or more embodiments.

FIG. 23 is a block diagram illustrating an example computer system, in accordance with one or more embodiments. Components of the example computer system 2300 are used to implement the smart radios 224, the cloud computing system 220, and the smart camera 236 illustrated and described in more detail with reference to FIG. 2A. In some embodiments, components of the example computer system 2300 are used to implement the ML system 2200 illustrated and described in more detail with reference to FIG. 22. At least some operations described herein are implemented on the computer system 2300.

The computer system 2300 includes one or more central processing units ("processors") 2302, main memory 2306, non-volatile memory 2310, network adapters 2312 (e.g., network interface), video displays 2318, input/output devices 2320, control devices 2322 (e.g., keyboard and pointing devices), drive units 2324 including a storage medium 2326, and a signal generation device 2320 that are communicatively connected to a bus 2316. The bus 2316 is illustrated as an abstraction that represents one or more physical buses and/or point-to-point connections that are connected by appropriate bridges, adapters, or controllers. In embodiments, the bus 2316, includes a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

In embodiments, the computer system 2300 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 2300.

While the main memory 2306, non-volatile memory 2310, and storage medium 2326 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2328. The term "machine-readable medium" and "storage medium" shall also be taken to include any medium that is capable of storing, encoding, or carrying a set of instructions for execution by the computer system 2300.

In general, the routines executed to implement the embodiments of the disclosure are implemented as part of an operating system or a specific application, component, program, object, module, or sequence of instructions (collectively referred to as "computer programs"). The computer programs typically include one or more instructions (e.g., instructions 2304, 2308, 2328) set at various times in various memory and storage devices in a computer device. When read and executed by the one or more processors 2302, the instruction(s) cause the computer system 2300 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2310, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2312 enables the computer system 2300 to mediate data in a network 2314 with an entity that is external to the computer system 2300 through any communication protocol supported by the computer system 2300 and the external entity. In embodiments, the network adapter 2312 includes a network adapter card, a wireless network interface card, a router, an access point, a wireless router, a switch, a multilayer switch, a protocol converter, a gateway, a bridge, a bridge router, a hub, a digital media receiver, and/or a repeater.

In embodiments, the network adapter 2312 includes a firewall that governs and/or manages permission to access proxy data in a computer network and tracks varying levels of trust between different machines and/or applications. In embodiments, the firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall additionally manages and/or has access to an access control list that details permissions including the access and operation rights of an object by an individual, a machine, and/or an application, and the circumstances under which the permission rights stand.

In embodiments, the functions performed in the processes and methods are implemented in differing order. Furthermore, the outlined steps and operations are only provided as examples. For example, some of the steps and operations are optional, combined into fewer steps and operations, or expanded into additional steps and operations without detracting from the essence of the disclosed embodiments.

In embodiments, the techniques introduced here are implemented by programmable circuitry (e.g., one or more microprocessors), software and/or firmware, special-purpose hardwired (i.e., non-programmable) circuitry, or a combination of such forms. In embodiments, special-purpose circuitry is in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. It will be appreciated that the same thing can be said in more than one way. One will recognize that "memory" is one form of a "storage" and that the terms are on occasion used interchangeably.

Consequently, alternative language and synonyms are used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

The invention claimed is:

1. A handheld two-way radio transceiver device comprising:

a facility-specific subscriber identity module component (facility-specific SIM component) configured to enable a wireless connection to a local private network for a facility, the local private network enabling communication with one or more other handheld two-way radio transceiver devices currently being operated with certain user identities that are associated with the facility and selected by a cloud computing system;

a non-facility-specific subscriber identity module component (non-facility-specific SIM component) configured to enable a wireless connection to a commercial cellular network that is non-specific to the facility and the certain user identities but is on a same or competing communications band as the local private network, the commercial cellular network enabling communication with the cloud computing system;

a processor; and a memory storing instructions that, when executed by the processor, cause the handheld two-way radio transceiver device to:

obtain facility-specific location data that defines a geofence that is designated for facility-specific activity;

while the handheld two-way radio transceiver device is located within the geofence defined by the facility-specific location data, cause a forced handoff within the same or competing communications band to connect to the local private network for the facility via the facility-specific SIM component; and in response to determining that the handheld two-way radio transceiver device has exited the geofence defined by the facility-specific location data, cause a forced handoff within the same or competing communications band to switch to a connection to the commercial cellular network via the non-facility-specific SIM component.

2. The handheld two-way radio transceiver device of claim 1, wherein switching to the connection to the commercial cellular network comprises preventing a connection to the local private network.

3. The handheld two-way radio transceiver device of claim 1, wherein the geofence corresponds to an approximate polygonal area within the facility, and wherein the geofence is defined within the facility-specific location data via a plurality of circular areas.

4. The handheld two-way radio transceiver device of claim 1, wherein the instructions further cause the handheld two-way radio transceiver device to:

determine a location of the handheld two-way radio transceiver device using a position tracking component within the handheld two-way radio transceiver device.

5. The handheld two-way radio transceiver device of claim 1, wherein the geofence is one of a plurality of geofences that each correspond to a respective set of communication channels, and wherein connecting to the local private network for the facility while the handheld two-way radio transceiver device is located within the geofence comprises:

providing access to the respective set of communication channels associated with the geofence.

6. The handheld two-way radio transceiver device of claim 1, wherein the instructions further cause the handheld two-way radio transceiver device to:

while the handheld two-way radio transceiver device is not connected to the local private network nor the commercial cellular network:

receive a broadcasted radio signal, determine an intended destination indicated within the broadcasted radio signal, and based on the intended destination being different than the handheld two-way radio transceiver device, rebroadcast the broadcasted radio signal.

7. The handheld two-way radio transceiver device of claim 6, wherein the instructions further cause the handheld two-way radio transceiver device to:

based on the handheld two-way radio transceiver device being the intended destination, cause a message included in the broadcasted radio signal to be played by a speaker of the handheld two-way radio transceiver device.

8. A method for a smart walkie-talkie device configured with multiple SIM components for connecting to multiple networks on a same or competing communications band, the method comprising:

obtaining facility-specific location data that defines a geofence that is designated for facility-specific activity;

while the smart walkie-talkie device is located within the geofence defined by the facility-specific location data, causing a forced handoff within the same or competing communications band to connect to a local private network for a facility via a facility-specific SIM component of the multiple SIM components;

determining, via a position tracking component within the smart walkie-talkie device, that the smart walkie-talkie device has exited the geofence; and in response to determining that the smart walkie-talkie device has exited the geofence, causing a forced handoff within the same or competing communications band to switch to a connection to a commercial cellular network via a non-facility-specific SIM component of the multiple SIM components.

9. The method of claim 8, wherein switching to the connection to the commercial cellular network comprises preventing a connection to the local private network for the facility.

10. The method of claim 8, wherein the geofence corresponds to an approximate polygonal area within the facility, and wherein the geofence is defined within the facility-specific location data via a plurality of circular areas.

11. The method of claim 8, wherein the geofence is one of a plurality of geofences that each correspond to a respective set of communication channels, and wherein connecting to the local private network for the facility while the smart walkie-talkie device is located within the geofence comprises:

providing access to the respective set of communication channels associated with the geofence.

12. The method of claim 8, further comprising:

while the handheld two-way radio transceiver device is not connected to the local private network nor the commercial cellular network:

receiving a broadcasted radio signal, determining an intended destination indicated within the broadcasted radio signal, and based on the intended destination being different than the smart walkie-talkie device, re-broadcasting the broadcasted radio signal.

* * * * *